US012634095B2

(12) United States Patent
Kwak et al.

(10) Patent No.: US 12,634,095 B2
(45) Date of Patent: May 19, 2026

(54) METHODS, APPARATUSES AND SYSTEMS DIRECTED TO ENHANCED CONTROL CHANNEL AND SHARED CHANNEL TRANSMISSIONS AT HIGH FREQUENCIES

(71) Applicant: InterDigital Patent Holdings, Inc., Wilmington, DE (US)

(72) Inventors: Young Woo Kwak, Woodbury, NY (US); Moon Il Lee, Melville, NY (US); Paul Marinier, Brossard (CA); Nazli Khan Beigi, Longueuil (CA); Prasanna Herath, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 328 days.

(21) Appl. No.: 18/031,810

(22) PCT Filed: Oct. 14, 2021

(86) PCT No.: PCT/US2021/055113
§ 371 (c)(1),
(2) Date: Apr. 13, 2023

(87) PCT Pub. No.: WO2022/081935
PCT Pub. Date: Apr. 21, 2022

(65) Prior Publication Data
US 2023/0388089 A1 Nov. 30, 2023

Related U.S. Application Data

(60) Provisional application No. 63/229,072, filed on Aug. 3, 2021, provisional application No. 63/170,956, filed
(Continued)

(51) Int. Cl.
| H04L 5/00 | (2006.01) |
| H04L 27/26 | (2006.01) |
| H04W 72/04 | (2023.01) |

(52) U.S. Cl.
CPC ...... H04L 5/0094 (2013.01); H04L 27/26025 (2021.01); H04L 27/2607 (2013.01); H04W 72/04 (2013.01)

(58) Field of Classification Search
CPC ............. H04L 5/0094; H04L 27/26025; H04L 27/2607; H04L 1/0003; H04L 1/0009;
(Continued)

(56) References Cited

U.S. PATENT DOCUMENTS

| 11,937,253 B2 * | 3/2024 | Yang ..................... H04L 5/0044 |
| 2009/0296645 A1 * | 12/2009 | Bui ..................... H04L 27/2627 |
| | | 370/329 |

(Continued)

FOREIGN PATENT DOCUMENTS

CN 108282430 A 7/2018

OTHER PUBLICATIONS

3GPP TR 38.913, V16.0.0 (Jul. 2020), "3rd Generation Partnership Project; Technical Specification Group Radio Access Network; Study on Scenarios and Requirements for Next Generation Access Technologies; (Release 16)", 40 pages.
(Continued)

*Primary Examiner* — Ivan O Latorre
(74) *Attorney, Agent, or Firm* — Majid Albassam

(57) ABSTRACT

Methods, apparatuses and systems directed to enhanced control channel and shared channel transmissions at high frequencies are provided. Among the methods is a method that may include any of receiving downlink control information indicating a modulation and coding scheme (MCS), a time domain resource assignment, and a frequency domain resource assignment; obtaining a subcarrier spacing (SCS) and a cyclic prefix (CP) length based on the MCS; determining the time and frequency domain resource assignments based on the SCS and the CP length; and receiving a
(Continued)

1900

Receive information indicating an MCS threshold, a time threshold, a first SCS, a first CP length, a second SCS and a second CP length — 1902

Receive DCI including information indicating an MCS, a time domain resource assignment, and a frequency domain resource assignment, and a time offset — 1904

Determine the time and frequency domain resource assignments based on (i) the first SCS and the first CP length or (ii) the second SCS and the second CP length — 1906

Receive a downlink transmission at time and frequency resources associated with the time and frequency domain resource assignments. — 1908 downlink transmission at time and frequency resources associated with the time and frequency domain resource assignments.

10 Claims, 17 Drawing Sheets

Related U.S. Application Data on Apr. 5, 2021, provisional application No. 63/091, 402, filed on Oct. 14, 2020.

(58) Field of Classification Search

CPC .......... H04L 1/0025; H04L 1/08; H04L 1/18; H04L 5/001; H04L 5/005; H04L 5/0051; H04L 5/003; H04W 72/04; H04W 72/23; H04W 72/232

See application file for complete search history.

(56) References Cited

U.S. PATENT DOCUMENTS

| | | | | |
|---|---|---|---|---|
| 2017/0331658 | A1* | 11/2017 | Chen | H04W 72/1263 |
| 2018/0183551 | A1* | 6/2018 | Chou | H04L 5/001 |
| 2018/0302906 | A1* | 10/2018 | Baldemair | H04L 1/0015 |
| 2019/0081832 | A1 | 3/2019 | Marinier et al. | |
| 2019/0350024 | A1* | 11/2019 | Abedini | H04W 56/0015 |
| 2020/0008228 | A1* | 1/2020 | Lee | H04L 5/001 |
| 2020/0022172 | A1* | 1/2020 | Sun | H04L 5/0082 |
| 2020/0100273 | A1* | 3/2020 | Gao | H04L 5/0007 |
| 2020/0396760 | A1* | 12/2020 | Yi | H04W 72/23 |
| 2021/0136808 | A1* | 5/2021 | Yang | H04L 5/001 |
| 2021/0266954 | A1* | 8/2021 | Xu | H04L 1/1822 |
| 2021/0385113 | A1* | 12/2021 | Sun | H04L 27/26025 |
| 2022/0085908 | A1* | 3/2022 | Shaked | H04L 27/2646 |
| 2022/0303057 | A1* | 9/2022 | Stern-Berkowitz | H04L 1/1812 |
| 2023/0254069 | A1* | 8/2023 | Lee | H04L 1/0009 370/252 |
| 2023/0388089 | A1* | 11/2023 | Kwak | H04W 72/04 |
| 2024/0314794 | A1* | 9/2024 | Bala | H04L 5/0046 |
| 2024/0422788 | A1* | 12/2024 | Yi | H04L 1/1812 |

OTHER PUBLICATIONS

Ericsson, "5G—Key Component of the Networked Society", 3GPP RWS-150009; 3GPP RAN Workshop on 5G Phoenix, AZ, USA, Sep. 17-18, 2015, 55 pages.

3GPP TR 38.807 V16.0.0 (Dec. 2019), "3rd Generation Partnership Project; Technical Specification Group Radio Access Network; Study on requirements for NR beyond 52.6 GHz (Release 16)", 68 pages.

"New SID: Study on NR beyond 52.6GHz", 3GPP Tdoc RP-181435, 3GPP TSG RAN Meeting #80, La Jolla, USA, Jun. 11-14, 2018, 4 pages.

"New WID on Extending current NR operation to 71 GHz", 3GPP Tdoc RP-193229, 3GPP TSG RAN Meeting #86, Sitges, Spain, Dec. 9-12, 2019, 5 pages.

3GPP TS 38.331 V16.0.0 (Mar. 2020), "3rd Generation Partnership Project; Technical Specification Group Radio Access Network; NR; Radio Resource Control (RRC) protocol specification (Release 16)," 835 pages.

3GPP TS 38.321 V16.0.0 (Mar. 2020), "3rd Generation Partnership Project; Technical Specification Group Radio Access Network; NR; Medium Access Control (MAC) protocol specification (Release 16)," 141 pages.

3GPP TS 36.211 V16.1.0 (Mar. 2020), "3rd Generation Partnership Project; Technical Specification Group Radio Access Network; Evolved Universal Terrestrial Radio Access (E-UTRA); Physical channels and modulation (Release 16)", 247 pages.

"New SID: Study on supporting NR from 52.6GHz to 71 GHz", 3GPP Tdoc RP-193259, 3GPP TSG RAN Meeting #86, Sitges, Spain, Dec. 9-12, 2019, 18 pages.

3GPP TS 38.213 V16.1.0 (Mar. 2020). "3rd Generation Partnership Project; Technical Specification Group Radio Access Network; NR; Physical layer procedures for control (Release 16)," 156 pages.

3GPP TR 38.805 V14.0.0 (Mar. 2017), "3rd Generation Partnership Project; Technical Specification Group Radio Access Network; Study on New Radio access technology; 60 GHz unlicensed spectrum (Release 14)", 17 pages.

International Search Report dated Jan. 21, 2022.

* cited by examiner

Frequency (GHz)

| Region | Country | 52.6-54.25 | 54.25-55.78 | 55.78-56.9 | 56.9-57 | 57-58.2 | 58.2-59 | 59-59.3 | 59.3-64 | 64-65 | 65-66 | 66-71^1) |
|---|---|---|---|---|---|---|---|---|---|---|---|---|
| ITU Region 1 | Europe/CEPT | | | | | U (Mobile) | | | | | | |
| | Israel | | | | | | | | | U (Mobile) | | |
| | South Africa | | | | | U (Mobile) | | | | | | |
| ITU Region 2 | USA | | | | | | U (Mobile) | | | | | |
| | Canada | | | | | | U (Mobile) | | | | | |
| | Brazil | | | | | | U (Mobile) | | | | | |
| | Mexico | | | | | | U (Mobile) | | | | | |
| | China | | | | | | | U (Mobile) | | | | |
| | Japan | | | | | | | U (Mobile) | | | | |
| | Korea | | | | | | | U (Mobile) | | | | |
| ITU Region 3 | India | | | | | | | | | | | |
| | Taiwan | | | | | | | U (Mobile) | | | | |
| | Singapore | | | | | | | U (Mobile) | | | | |
| | Australia | | | | | | | U (Mobile) | | | | |

Note 1: Access Regime Currently Under Discussion in CEPT

FIG. 2

Frequency (GHz)

| Region | Country | 71-74[1] | 74-76[1] | 76-77 | 77-81 | 81-84[1] | 84-86[1] | 86-92 | 92-94 | 94-94.1 | 94.1-95 | 95-100 |
|---|---|---|---|---|---|---|---|---|---|---|---|---|
| ITU Region 1 | Europe/CEPT | L (Fixed) | L (Fixed) | | | L (Fixed) | L (Fixed) | | L (Fixed) | | L (Fixed) | |
| | Israel | L (Fixed) | | | | | L (Fixed) | | | | | |
| | South Africa | L (Fixed) | L (Fixed) | | | L (Fixed) | L (Fixed) | | | | | |
| ITU Region 2 | USA | L (Fixed/Mobile) | L (Fixed/Mobile) | | | L (Fixed/Mobile) | L (Fixed/Mobile) | | L (Fixed/Mobile) | | L (Fixed/Mobile) | |
| | Canada | L (Fixed) | L (Fixed) | | | L (Fixed) | L (Fixed) | | | | | |
| | Brazil | L (Fixed) | L (Fixed) | | | L (Fixed) | L (Fixed) | | | | | |
| | Mexico | L (Fixed) | L (Fixed) | | | L (Fixed) | L (Fixed) | | | | | |
| ITU Region 3 | China | | | | | | | | | | | |
| | Japan | L (Fixed) | L (Fixed) | | | L (Fixed) | L (Fixed) | | | | | |
| | Korea | L (Fixed) | L (Fixed) | | | L (Fixed) | L (Fixed) | | | | | |
| | India | | | | | | | | | | | |
| | Taiwan | L (Fixed) | L (Fixed) | | | L (Fixed) | L (Fixed) | | | | | |
| | Singapore | L (Fixed) | L (Fixed) | | | L (Fixed) | L (Fixed) | | | | | |
| | Australia | | | | | | | | | | | |

Note 1: Candidate Frequency Band for IMT Identification Under WRC-19 AI 1.13

FIG. 3

| μ | $\Delta f = 2^\mu \cdot 15$ [kHz] | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

Figures 18, 19:
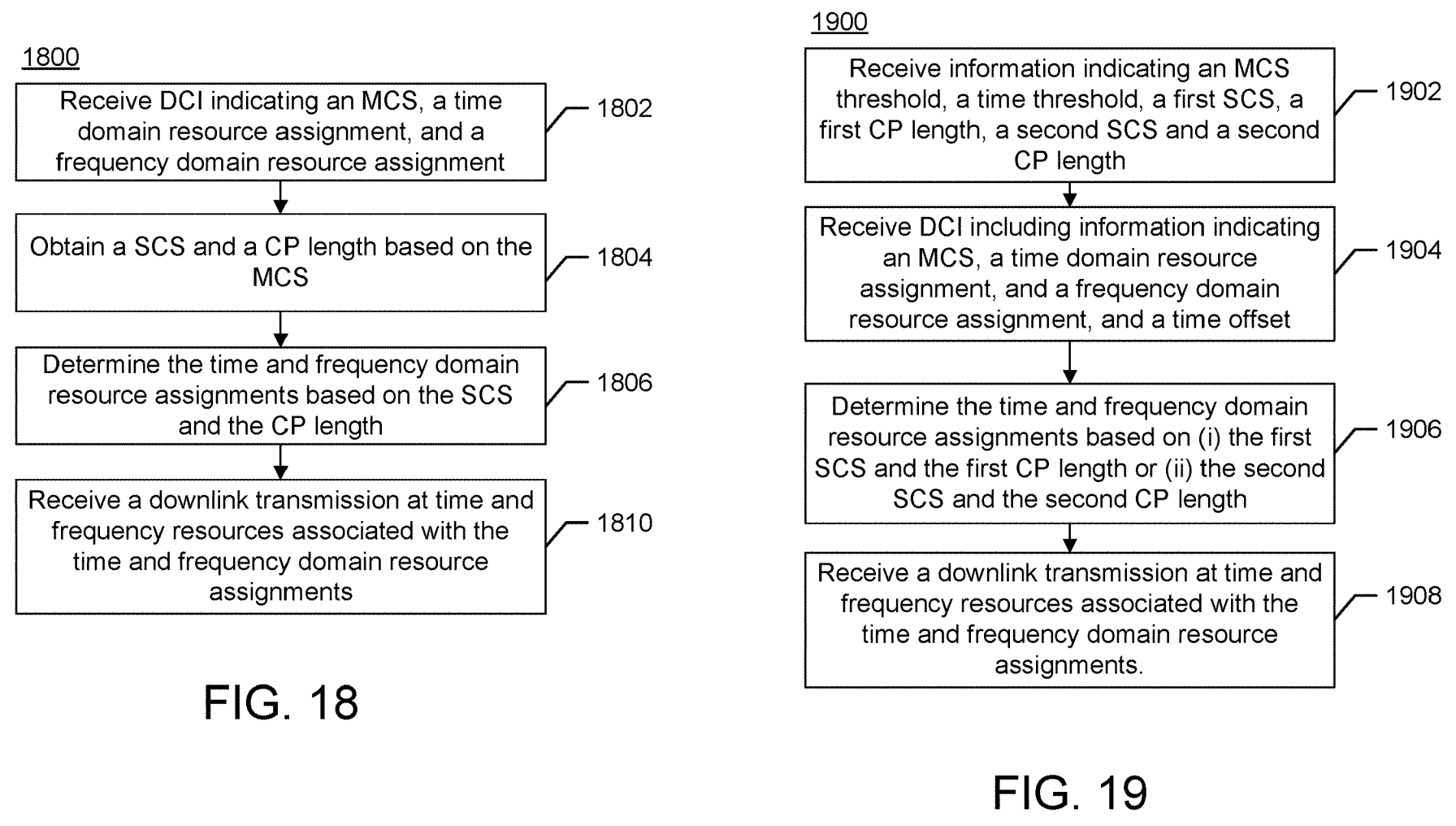

Receive information indicating an MCS threshold, a time threshold, a first SCS, a first CP length, a second SCS and a second CP length — 1902

Receive DCI including information indicating an MCS, a time domain resource assignment, and a frequency domain resource assignment, and a time offset — 1904

Determine the time and frequency domain resource assignments based on (i) the first SCS and the first CP length or (ii) the second SCS and the second CP length — 1906

Receive a downlink transmission at time and frequency resources associated with the time and frequency domain resource assignments. — 1908

Receive DCI indicating an MCS, a time domain resource assignment, and a frequency domain resource assignment — 1802

Obtain a SCS and a CP length based on the MCS — 1804

Determine the time and frequency domain resource assignments based on the SCS and the CP length — 1806

Receive a downlink transmission at time and frequency resources associated with the time and frequency domain resource assignments — 1810

Figures 20, 21:
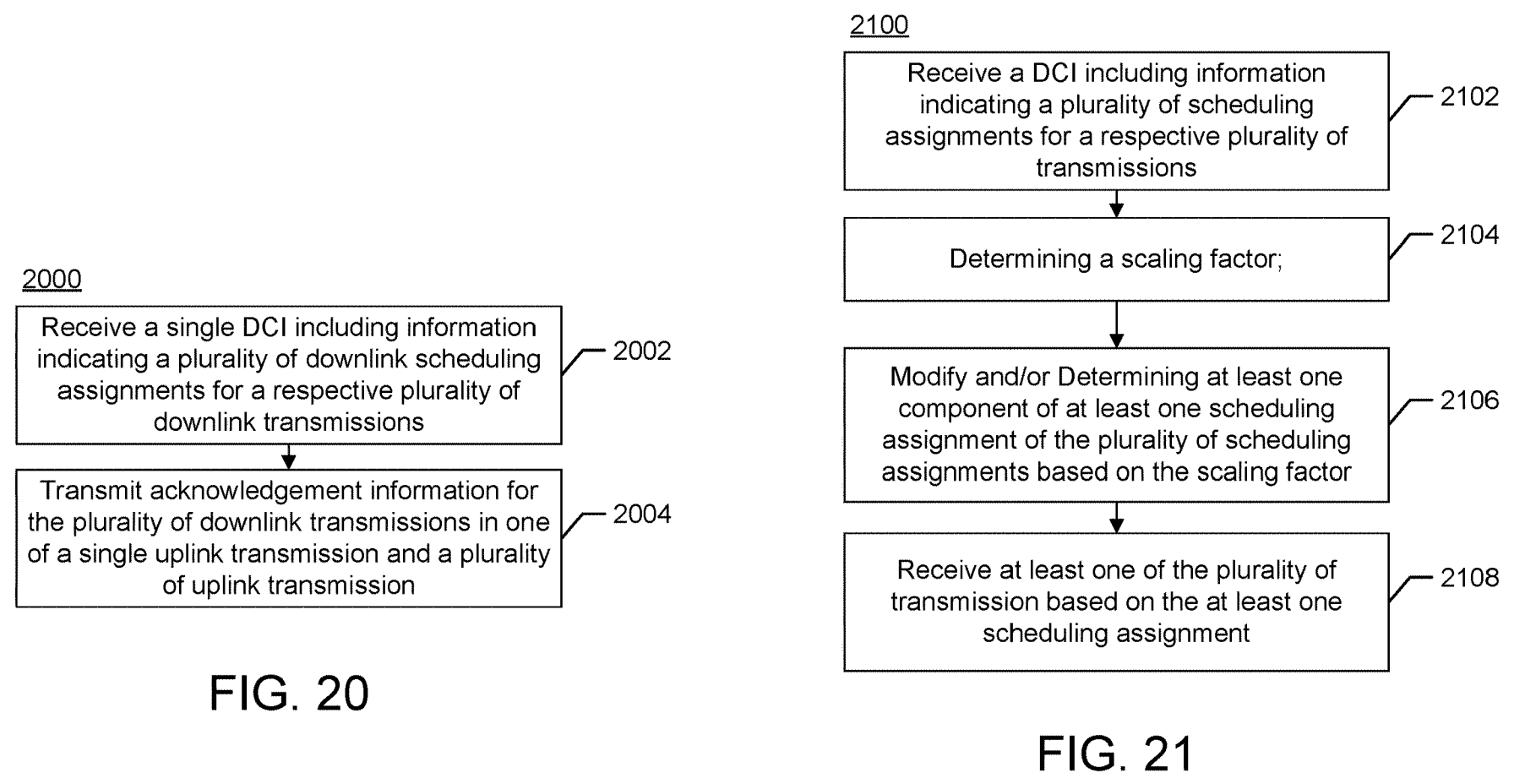

2102 Receive a DCI including information indicating a plurality of scheduling assignments for a respective plurality of transmissions 2104 Determining a scaling factor;

2106 Modify and/or Determining at least one component of at least one scheduling assignment of the plurality of scheduling assignments based on the scaling factor 2108 Receive at least one of the plurality of transmission based on the at least one scheduling assignment

2002 Receive a single DCI including information indicating a plurality of downlink scheduling assignments for a respective plurality of downlink transmissions 2004 Transmit acknowledgement information for the plurality of downlink transmissions in one of a single uplink transmission and a plurality of uplink transmission

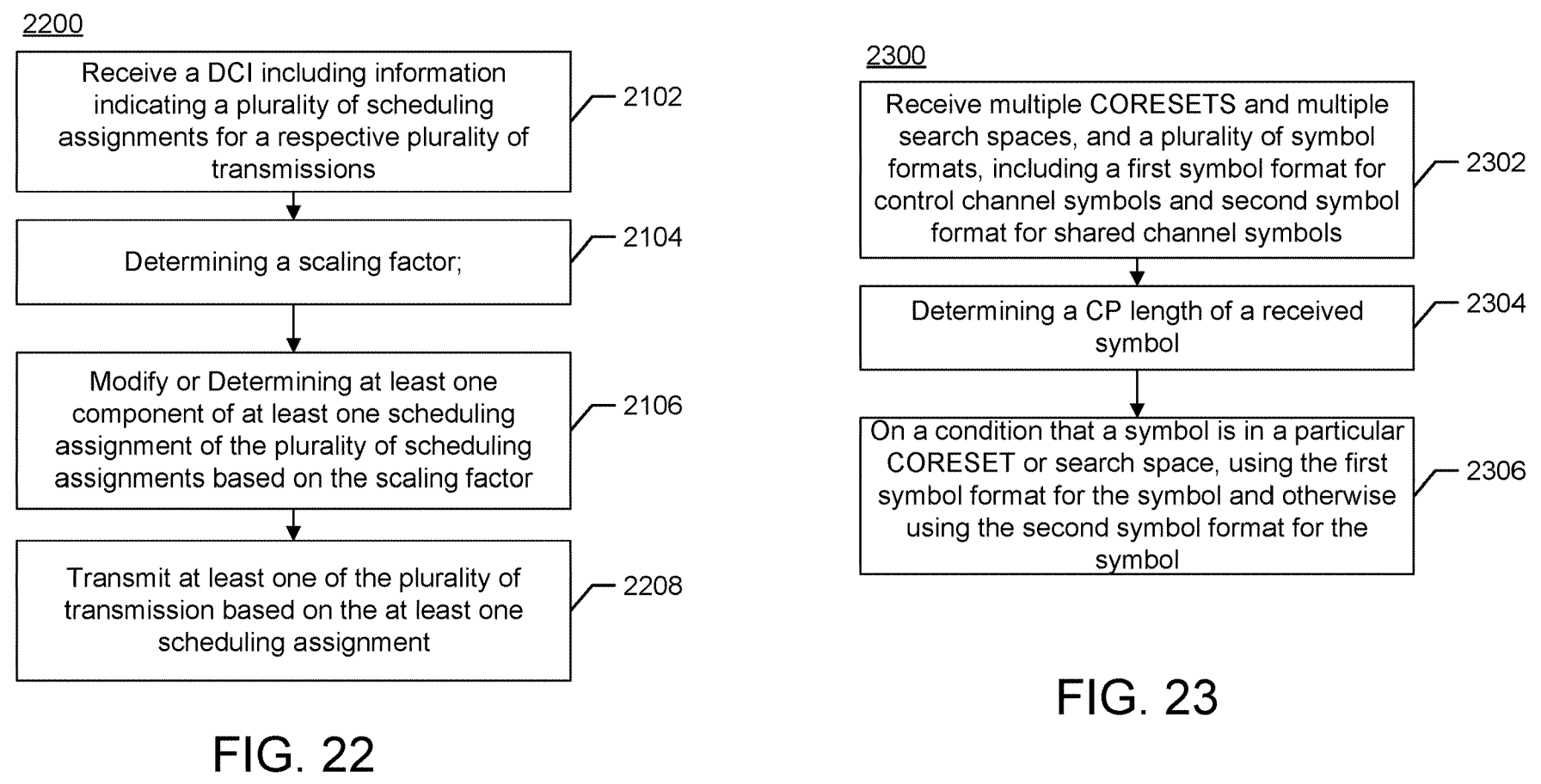

Receive multiple CORESETS and multiple search spaces, and a plurality of symbol formats, including a first symbol format for control channel symbols and second symbol format for shared channel symbols — 2302

Determining a CP length of a received symbol — 2304

On a condition that a symbol is in a particular CORESET or search space, using the first symbol format for the symbol and otherwise using the second symbol format for the symbol — 2306

Receive a DCI including information indicating a plurality of scheduling assignments for a respective plurality of transmissions — 2102

Determining a scaling factor; — 2104

Modify or Determining at least one component of at least one scheduling assignment of the plurality of scheduling assignments based on the scaling factor — 2106

Transmit at least one of the plurality of transmission based on the at least one scheduling assignment — 2208

FIG. 22

METHODS, APPARATUSES AND SYSTEMS DIRECTED TO ENHANCED CONTROL CHANNEL AND SHARED CHANNEL TRANSMISSIONS AT HIGH FREQUENCIES

CROSS REFERENCE TO RELATED APPLICATIONS

This application is a U.S. National Stage Application under 35 U.S.C. 371 of International Patent Application No. PCT/US2021/055113, filed Oct. 14, 2021, which is incorporated herein by reference in its entirety. This application claims the benefit of U.S. Provisional Application No. 63/091,402, filed Oct. 14, 2020; U.S. Provisional Application No. 63/170,956, filed Apr. 5, 2021; and U.S. Provisional Application No. 63/229,072, filed Aug. 3, 2021, which are incorporated herein by reference in their entirety.

BACKGROUND

This application is generally directed to enhancements in wireless communication at higher frequencies to address increased phase noise at such higher frequencies.

BRIEF DESCRIPTION OF THE DRAWINGS

A more detailed understanding may be had from the detailed description below, given by way of example in conjunction with the drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures ("FIGS.") indicate like elements, and wherein:

FIG. 2 is a table showing example spectrum availability between 52.6 GHz and 71 GHz in certain countries;

FIG. 3 is a table showing example spectrum availability between 71 GHz and 100 GHz in certain countries;

FIG. 6 is a table showing numerology information for 5G communication systems (Release 15);

FIG. 18 is a flow chart illustrating an example flow for carrying out dynamic SCS and CP determination according to various embodiments;

FIG. 19 is a flow chart illustrating an example flow for carrying out dynamic SCS and CP determination according to various embodiments;

FIG. 20 is a flow chart illustrating an example flow for providing acknowledgement information for multiple transmission scheduled by a single DCI according to various embodiments;

FIG. 21 is a flow chart illustrating an example flow for carrying multiple reception scheduling based on a scaling factor according to various embodiments;

FIG. 22 is a flow chart illustrating an example flow for carrying multiple transmission scheduling based on a scaling factor according to various embodiments; and FIG. 23 is a flow chart illustrating an example flow for carrying out channel state information (CSI) reporting for indication of SCS according to various embodiments.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Networks for Implementation of the Embodiments

Figure 1A:
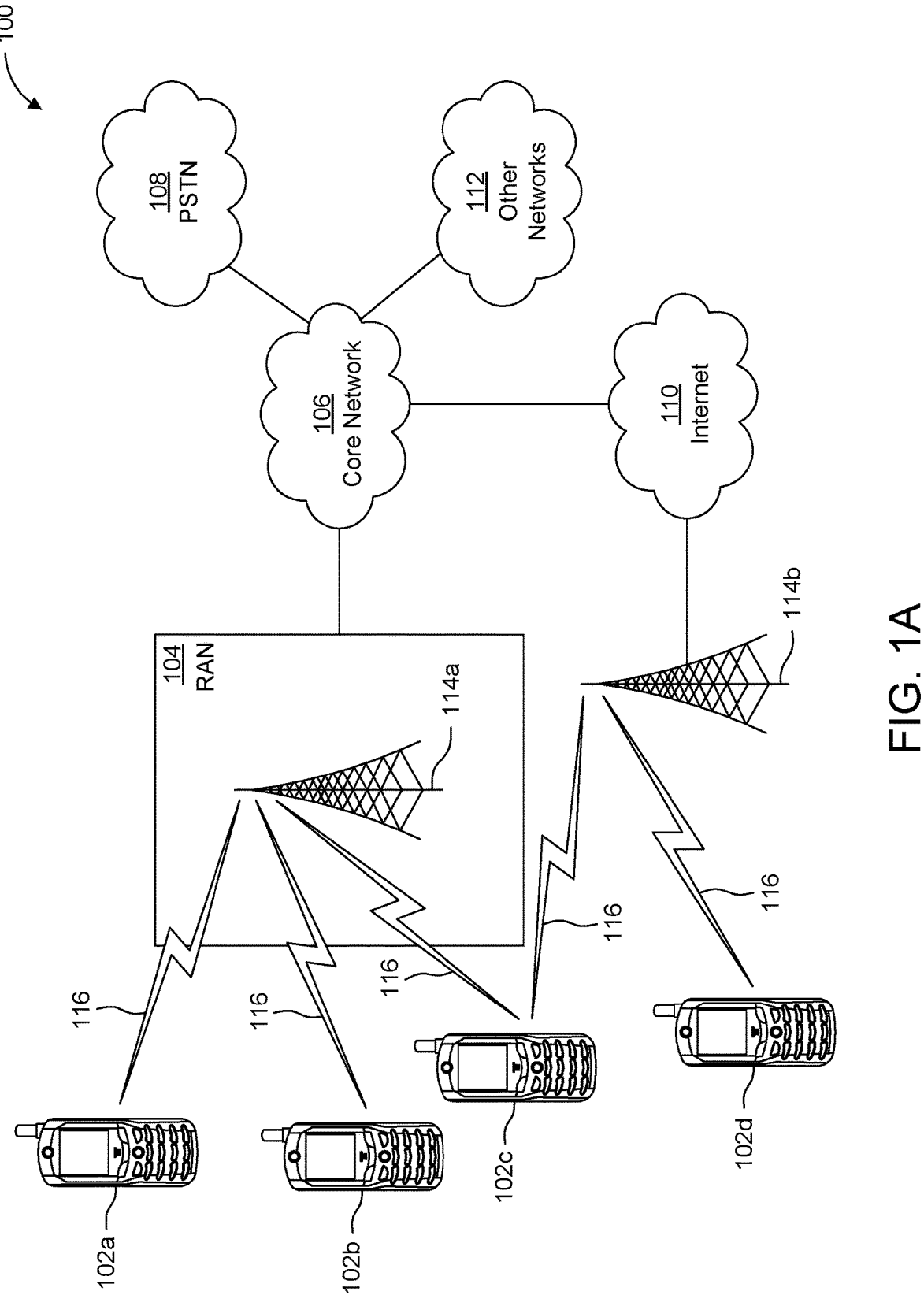
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
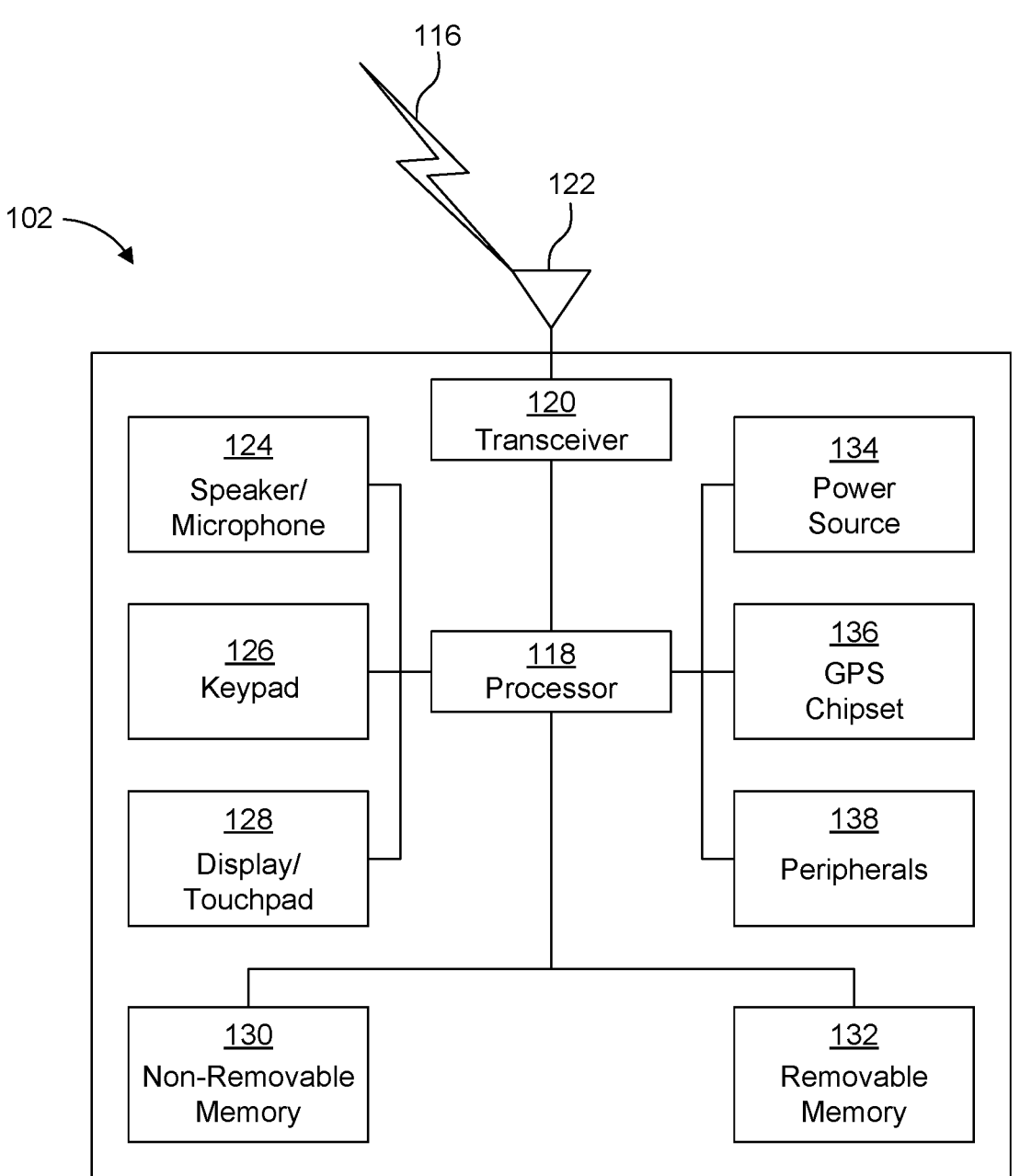
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
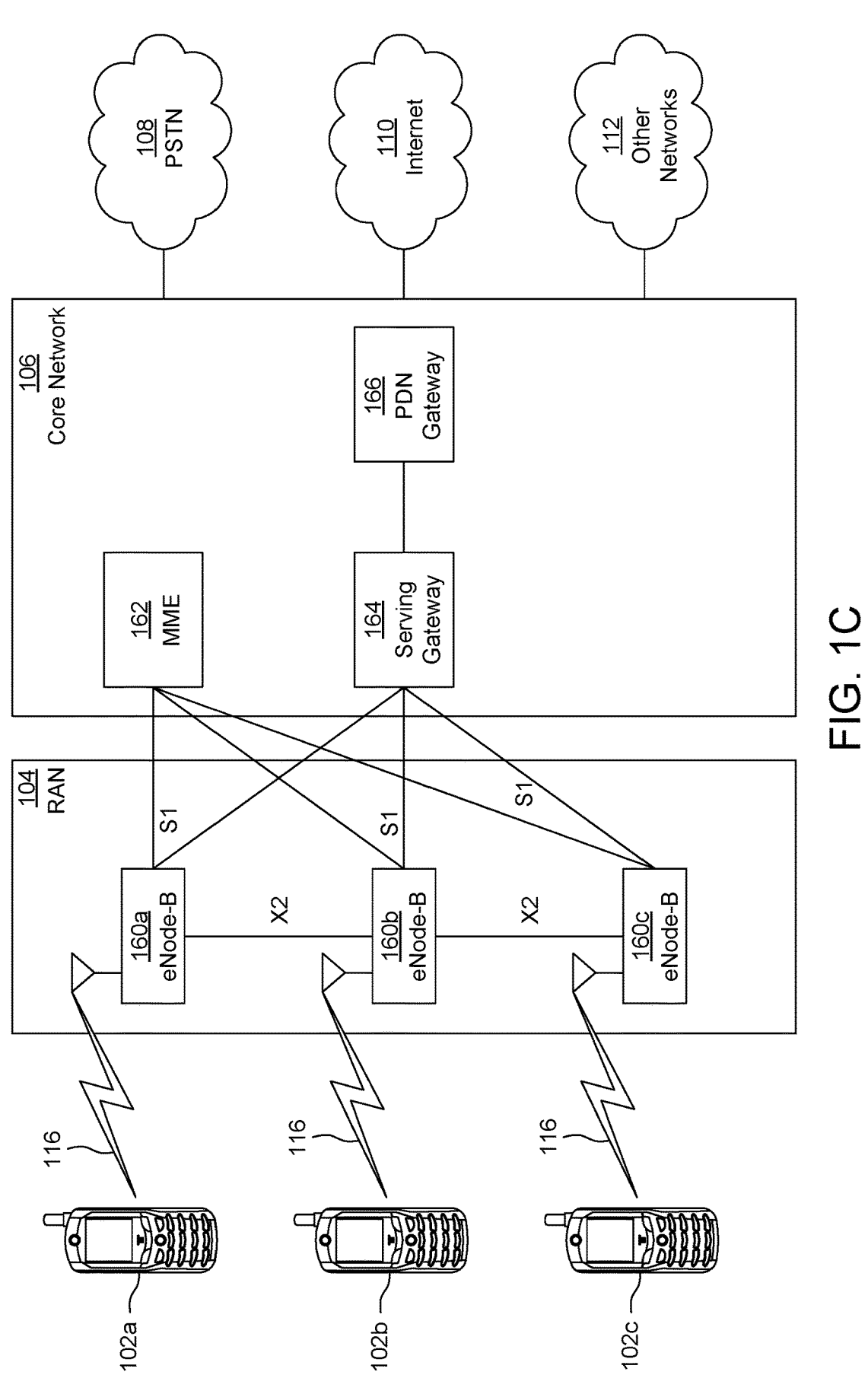
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
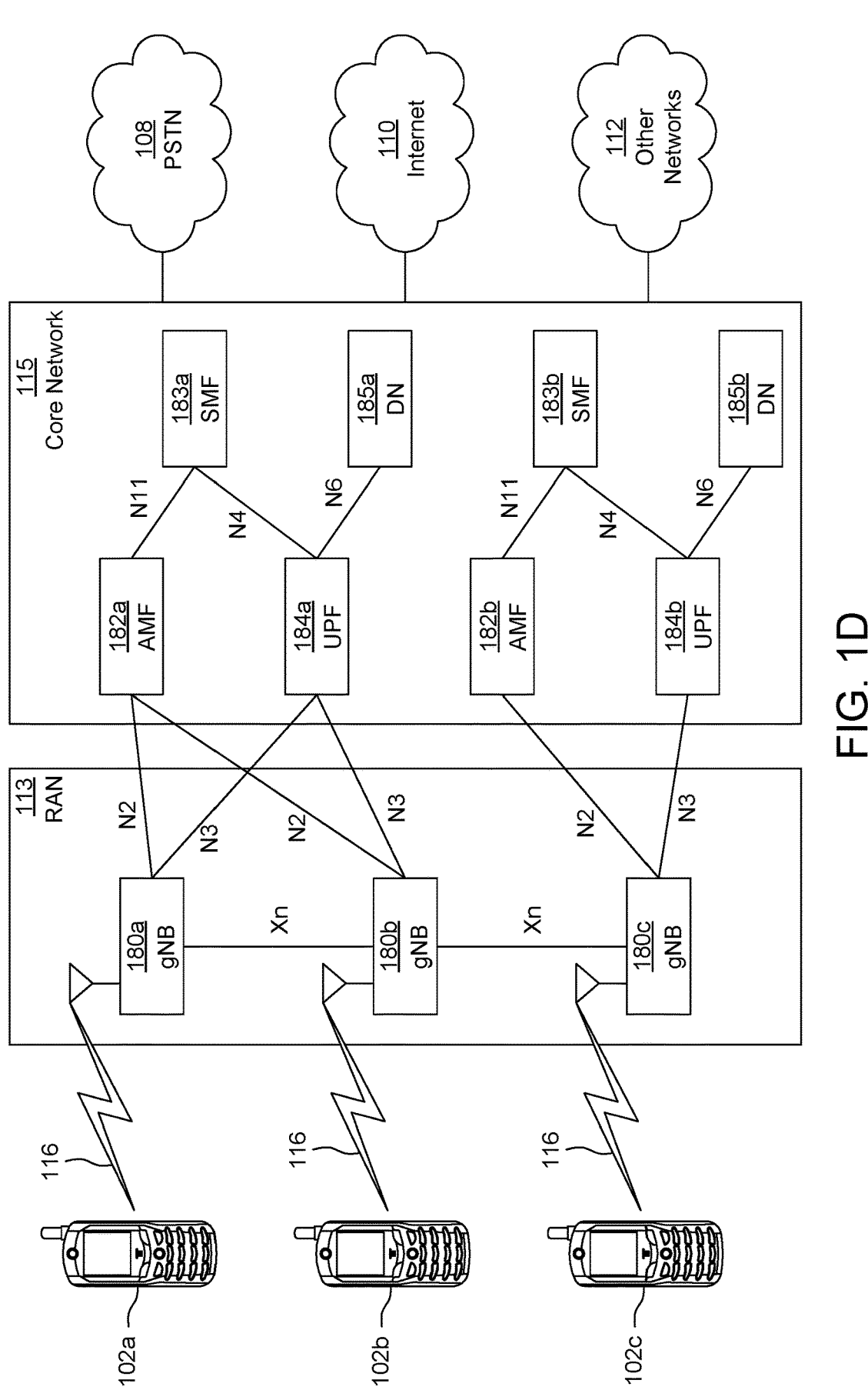
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A wireless communication system experiences relatively higher phase noise at higher frequencies and/or ranges (e.g., frequencies above 50 GHz) than at lower frequencies and/or frequency ranges. The phase noise is a random process and directly impacts up/down conversion between baseband and RF signals due to the temporal instability of the local oscillator(s). When the rate of phase variation is slow with respect to the OFDM symbol duration, the phase noise can be modeled as a constant and can be compensated via estimation. However, when the rate of phase variation is faster with respect to the OFDM symbol duration, the estimation of phase noise and correction thereof becomes difficult. Therefore, the larger the sub-carrier spacing (SCS), the easier it is to compensate for the phase noise. The impact of the phase noise increases as modulation order increases. When the modulation order increases, phase differences between each modulation point decrease, which increases a probability of decoding the modulation incorrectly with the same amount of phase noise.

As the carrier frequency increases, the signal propagation exhibits less multi-path delay spread due to sharp beamforming with a MIMO antenna and the signal propagation characteristics at higher frequencies. Thus, having a longer cyclic prefix (CP) becomes less important at higher carrier frequencies. However, shorter CPs based on large SCSs, such as 480 kHz and 960 kHz, can be problematic even with the decreased multi-path delay spread.

Based on the above observations, transmissions including information associated with any of a control channel and a shared channel would benefit from enhancements. For the transmissions carrying information associated with control channel ("control channel information"), transmission reliability may be more important than transmission efficiency so as to maintain connection of wireless communication system. For example, application of larger SCSs (e.g., 480 kHz and/or 960 kHz) on transmissions carrying control channel information may not provide a performance gain over smaller SCSs due to the types of modulation used for transmissions carrying control channel information being lower order modulations (e.g., quadrature phase shift keying (QPSK) for transmissions carrying information associated with a physical downlink control channel (PDCCH) and binary phase shift keying (BPSK) or QPSK for transmissions carrying information associated with a physical uplink control channel (PUCCH)). Application of CP lengths at larger SCSs shorter than those used at smaller SCSs may limit transmission reliability of transmissions carrying control channel information due to inter-symbol interference.

However, for the transmissions carrying information associated with shared channels ("shared channel information"), transmission efficiency is needed based on the status of the wireless channel. For example, use of larger SCSs may reduce performance degradation from phase noise especially for higher order modulations.

An issue addressed by one or more of the various embodiments herein is how to allow WTRUs (e.g., cellular telephones) to perform reliably on and/or in connection while transmissions carrying control channel information while also operating efficiently on and/or in connection with transmissions carrying shared channel information at higher frequencies.

Solutions described herein may include dynamic SCS indication for a shared channel with a slot format indicator and thresholds. For example, in an embodiment (which may be referred to herein as "the first embodiment"), a WTRU may receive information indicating a plurality of slot format configurations and/or an indication of a particular slot format configuration of the plurality of slot format configurations to use in a given situation. Each slot format configuration may include a plurality of slot formats. Each slot format may indicate a slot type for each slot in a frame. The slot type may be, e.g., fixed or flexible. The WTRU may receive and/or report (e.g., as a WTRU capability) information indicating a time threshold (e.g., expressed as a number of slots or a number of symbols) for dynamic SCS determination. The WTRU may receive information indicating a configuration of SCSs (e.g., a first SCS for lower frequency modulation and coding schemes (MCSs) and a second SCS for higher frequency MCSs), a configuration of an MCS threshold and an indication of an MCS for a shared channel (e.g., a physical downlink shared channel (PDSCH) or a physical uplink shared channel (PUSCH)) via PDCCH. In an embodiment, the WTRU may use the second SCS for one or more transmissions carrying shared channel information if, for example, the following conditions are satisfied: (i) a slot format for the transmissions carrying shared channel information is a flexible slot type, (ii) a time offset (e.g., between reception of PDCCH information (or reception of a transmission carrying the PDCCH information) scheduling the transmissions carrying shared channel information and the transmissions carrying shared channel information) is larger than a time threshold, and (iii) an indicated MCS is larger than the MCS threshold. Otherwise, the WTRU may use the first SCS for the transmissions carrying the shared channel information. The WTRU may receive and/or transmit one or more transmissions carrying the shared channel information based on the determined SCS.

The above-described embodiment is an example. For instance, FIG. 3 is a flowchart illustrating an embodiment in which the only condition for using the second SCS is that the time offset between reception of PDCCH information (or reception of a transmission carrying PDCCH information) scheduling one or more transmissions carrying shared channel information and the transmissions carrying the shared channel information is larger than the time threshold.

In an embodiment of channel state information (CSI) reporting for dynamic indication of SCS, a WTRU may receive information indicating a CSI reporting configuration and an associated CSI reference signal (CSI-RS) resource set configuration with a SCS configuration via one or more transmissions carrying radio resource control (RRC) messages, information elements, etc. ("RRC transmissions"). The WTRU may receive information indicating an activation or a trigger of the CSI report configuration. If a determined SCS (e.g., based on the first embodiment described above) and the SCS configuration of the associated CSI-RS resource set are the same, the WTRU may measure the CSI-RS resource set and/or report, to a gNB, a CSI based on the measurements of the CSI-RS resource set. If the determined SCS and the SCS configuration of the associated CSI-RS resource set are not the same, the WTRU may measure DM-RS ports, report, to the gNB, a CSI based on the measurements of the DM-RS ports, and might not (e.g., does not) rate match the CSI-RS resource set.

In accordance with an embodiment, there may be different CP sizes based on CORESETs and/or search spaces.

For instance, a WTRU may receive a configuration of multiple control resource sets (CORESETs) and multiple search spaces, a first symbol format (e.g., CP length) of control channel symbols, and a second symbol format of shared channels. In an embodiment, the WTRU may determine CP length of symbols as follows. If one or more CORESETs of the multiple CORESETs and/or one or more search spaces of the multiple search spaces are in a symbol, the WTRU determines the first symbol format for the symbol. Otherwise, the WTRU determines the second symbol format for the symbol. The WTRU then receives one or more channels and/or one or more signals based on the determined symbol format.

In an embodiment, a WTRU uses different TTI (Transmission Time Interval) length application based on the SCS. For instance, a WTRU may receive configurations of TTI lengths for SCSs; e.g., a first TTI length for a first SCS and a second TTI length for a second SCS. The WTRU may receive a configuration and/or an indication of a SCS. Based on the configuration and/or the indication, the WTRU determines the SCS for one or more channels and/or one or more signals. If the determined SCS is the first SCS, the WTRU applies the first TTI length, and if the determined SCS is the second SCS, the WTRU applies the second TTI length.

These concepts, embodiments, and configuration are elaborated upon below.

Representative Spectrum Availability

In RAN #80, a new RAN study item on New Radio (NR) beyond 52.6 GHz has been agreed upon. According to a survey of the study item [5], there are a minimum of 5 GHz of spectrum available globally, between 57 to 64 GHz, for unlicensed operation, and, in some countries, up to 14 GHz of spectrum, between 57 and 71 GHz, for unlicensed operation. See FIG. 2 for a review of example spectrum availability between 52.6 GHz and 71 GHz in certain countries.

Additionally, the survey has identified a minimum of 10 GHz of spectrum available globally, between 71 to 76 GHz and 81 to 86 GHz, for licensed operation, and, in some countries, up to 18 GHz of spectrum available, between 71 and 114.25 GHz, for licensed operation. While frequency ranges above 52.6 GHz potentially contain larger spectrum allocations and larger bandwidths that are not available for bands lower than 52.6 GHz, however, physical layer channels of new radio (NR) were designed to be optimized for uses under 52.6 GHz. See FIG. 3 for a review of example spectrum availability between 71 GHz and 100 GHz in certain countries/regions.

Figure 4:
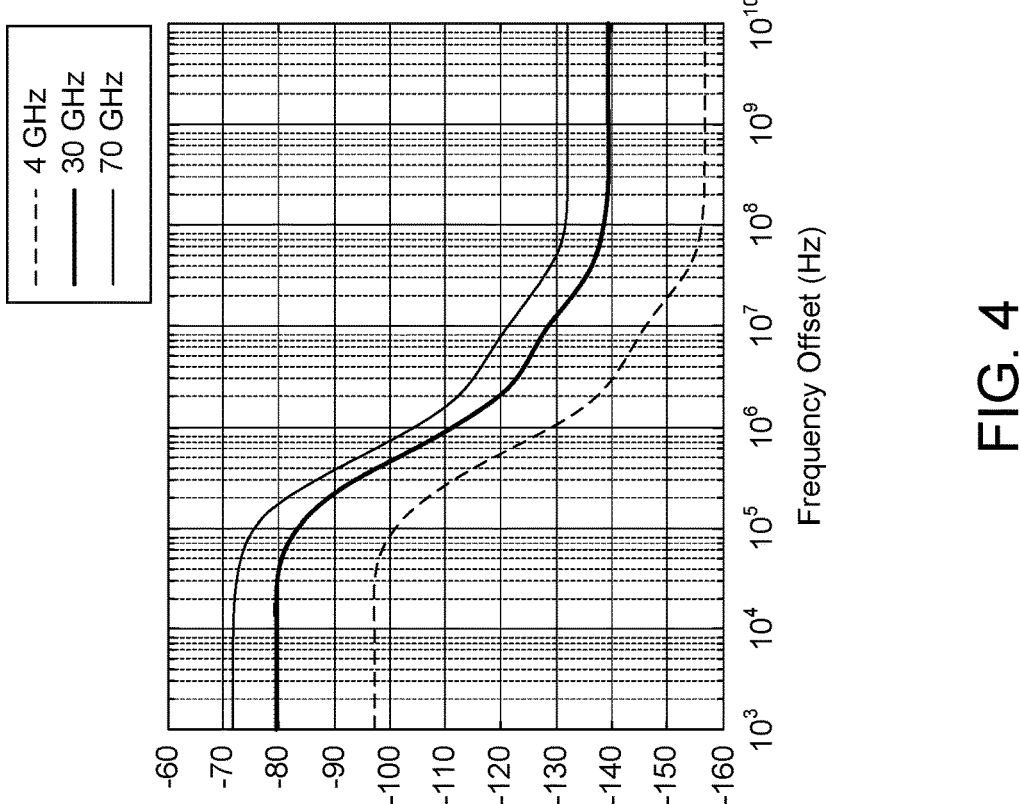
FIG. 4 is a graph showing a comparison of common power spectral density as a function of frequency offset at 4 GHz, 30 GHz, and 70 GHz.

To enable and optimize NR systems, the frequencies above 52.6 GHz present more difficult challenges compared to lower frequency bands, including higher phase noise, extreme propagation loss due to high atmospheric absorption, lower power amplifier efficient, and strong power spectral density regulatory requirements. In particular, because the phase noise increases with carrier frequency, the phase noise in above 52.6 GHz is much more severe and problematic. FIG. 4 is a graph showing a comparison of common Power Spectral Density as a function of frequency offset at 4 GHz (bottom line), 30 GHz (middle line), and 70 GHz (top line).

Figure 5:
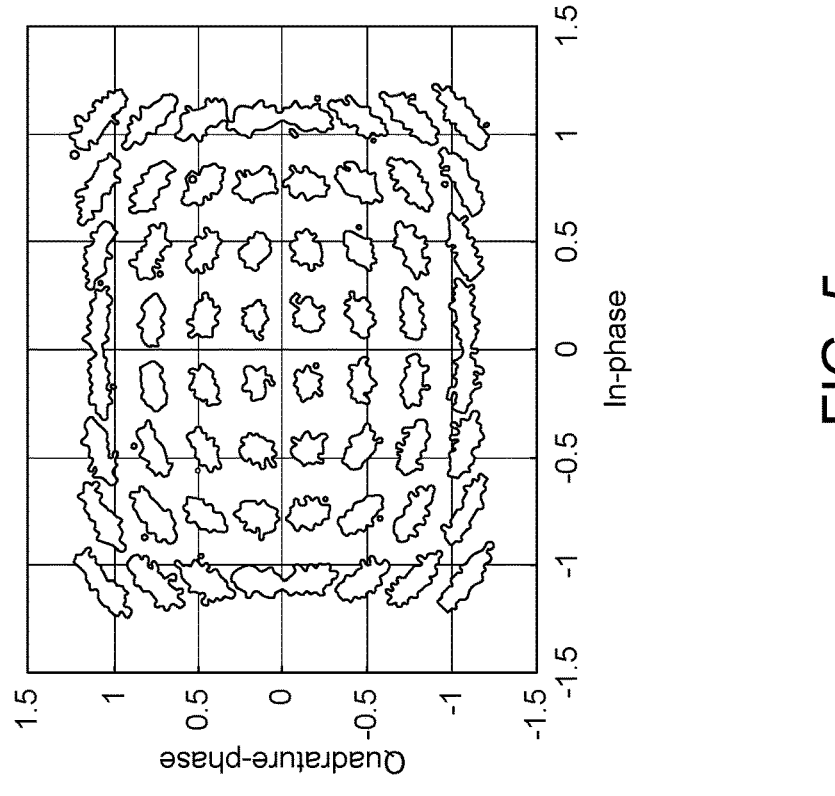
FIG. 5 is a graph showing an example symbol constellation for a received signal at high frequency.

FIG. 5 is a demodulated constellation diagram for an example received signal in a 64-Quadrature Amplitude Modulation (QAM) communication system at a high frequency. As can be seen, there is significant phase noise at this high frequency, which causes significant spread of the symbols in the received signal, particularly around the edges of the constellation.

As can be seen from both FIGS., the higher the frequency, the greater the power spectral density and the phase noise.

In Rel-15, NR has introduced scalable SCS to mitigate phase noise in frequency range 2 (FR2), where FR2 denotes the frequency range of 24.25-52.6 GHz. The scalable SCS is expressed as $f_c = 15 \cdot 2^n$ [kHz], where $f_c$ is a SCS and n is a non-negative integer. With the scalable SCS, CP length and symbol length are inversely proportional and allows the symbol boundary alignment between different SCSs. In NR Rel-15, FR2 supports 120/240 kHz SCS values, while frequency range 1 (FR1) supports 15/30/60 kHz SCS values, where FR1 denotes the frequency range of 450-6000 MHz. This is illustrated in FIG. 6. The increased phase noise at higher frequencies (e.g., as disclosed above is one of the reasons why only 60/120 kHz SCS options are supported in FR2.

Based on these observations, in RAN #86, a new RAN1 study item [8] and a new RAN1 work item [9] on above 52.6 GHz to 71 GHz were agreed upon. The study item and the work item are intended to study and specify changes to NR using existing NR waveform to support operation between 52.6 GHz and 71 GHz as well as channel access mechanism assuming beam based operation for unlicensed spectrum between 52.6 GHz and 71 GHz [8-9].

Figure 7:
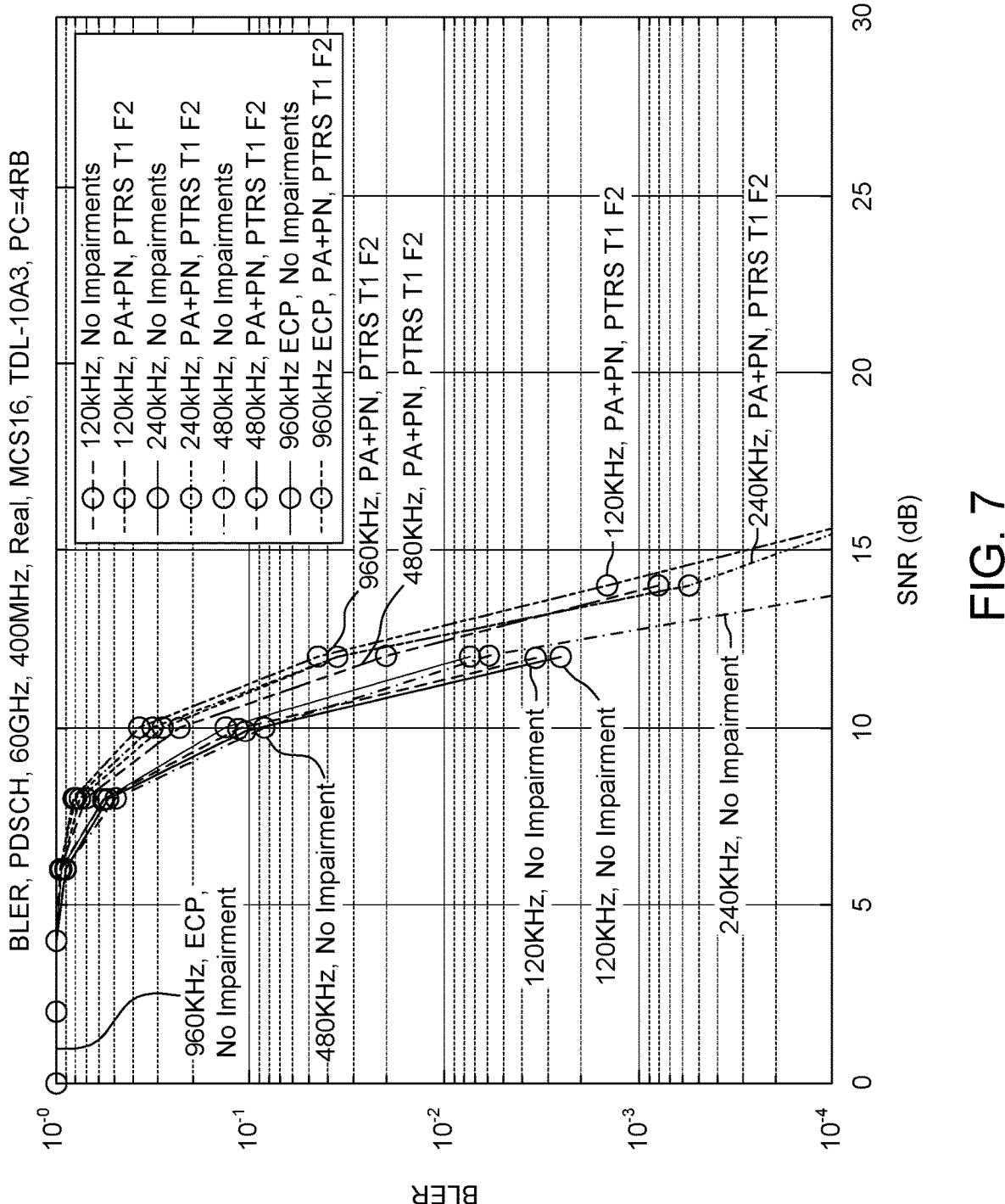
FIGS. 7 and 8 are graphs illustrating block error rate performance as a function of signal-to-noise ratio for various different subcarrier spacings.
Figure 8:
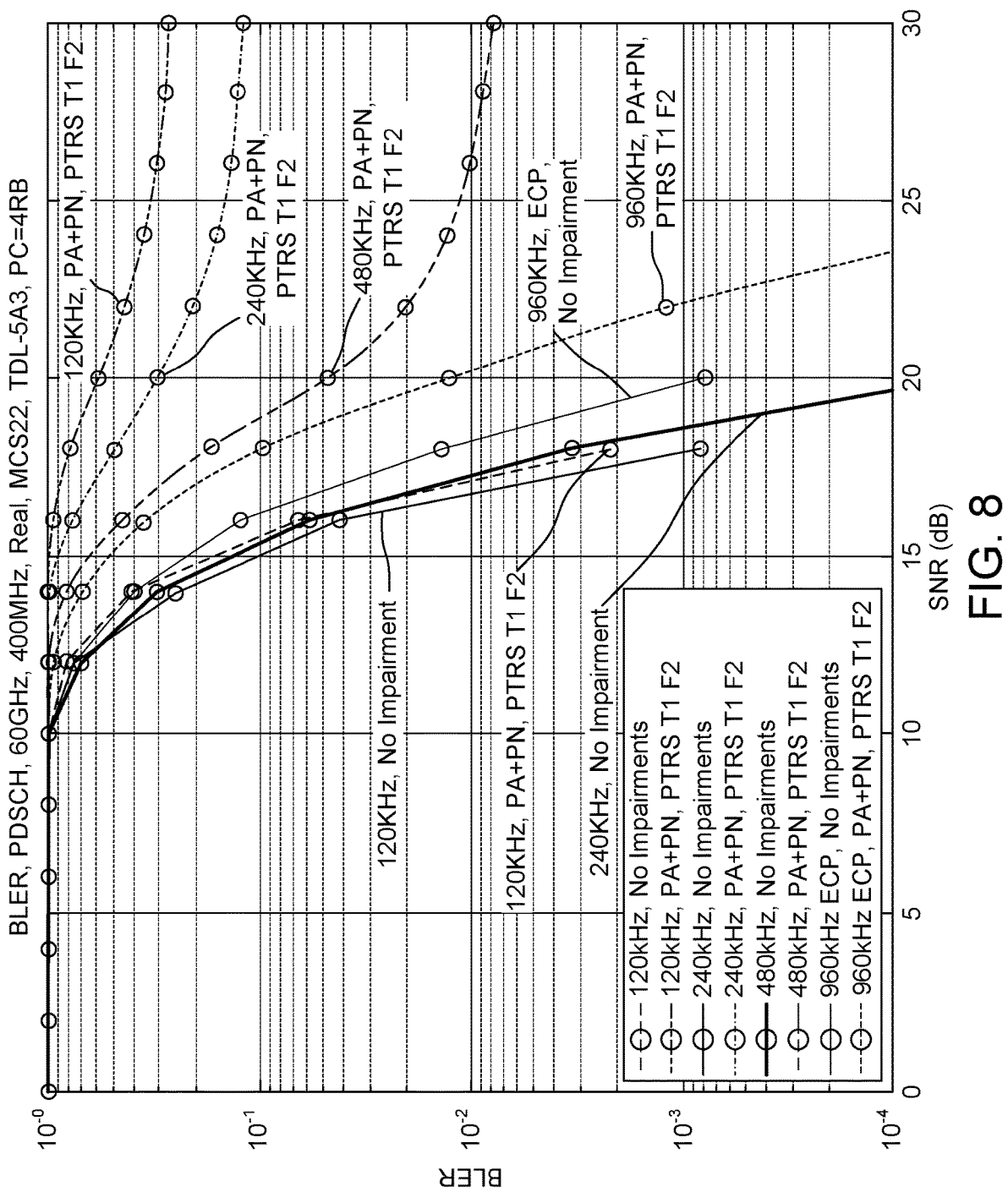

FIGS. 7 and 8 show block error rate (BLER) performance as a function of signal-to-noise ratio (SNR) for various subcarrier spacings with and without the presence of RF impairments using TDL channel model with a 400 MHz bandwidth. As can be seen in the FIGS., the performance loss from RF impairments is mitigated as subcarrier spacing increases, especially when a higher modulation order is used.

In the higher frequency ranges, control channels and shared channels have different concerns and would benefit from different enhancements. For control channels, reliable transmission is more important than efficient transmission to maintain connection of wireless communication systems. For example, application of larger SCSs (e.g., 480 kHz and/or 960 kHz) on control channel may not provide performance gain due to low modulation of control channels (i.e., QPSK for PDCCH and BPSK/QPSK for PUCCH), but reduced CP length of larger SCSs may limit reliability of control channel due to inter-symbol interference.

However, for shared channels, efficient transmission is needed based on the status of the wireless channel. For example, larger SCSs may reduce performance degradation from phase noise especially for higher modulations.

In addition, control channel enhancements should be considered. Such control channel enhancements may include:

Scheduling enhancements
    For time domain resource allocation, increased number of control resources and blind detections to schedule shared channels are desirable in given time duration due to the reduced symbol length of larger SCSs
    For frequency domain resource allocation, increased number of Downlink Control Information (DCI) payload size may be desired due to the wide available bandwidth in higher frequencies
PDCCH monitoring capability
    Due to the reduced slot length of larger SCSs, existing slot-based monitoring capability definition may not be applicable for higher frequencies.

Enhanced monitoring and scheduling capabilities with multiple (e.g., two) level PDCCH monitoring.

Dynamic configuration of monitoring occasion and scheduling granularity can improve resource allocation and scheduling flexibility.

Enhancements for Higher Frequencies

Several types of enhancements are proposed herein. A first type of enhancement may enable more reliable transmission/reception of control channels and efficient transmission/reception of shared channels. A second type of enhancement may enable more efficient and reliable time and frequency domain resource allocation for shared channels. A third type of enhancement may enable more efficient PDCCH monitoring in higher frequencies. A fourth type of enhancement relates to hybrid automatic repeat request (HARQ) acknowledgement (HARQ-ACK) information for multiple PDSCH transmissions scheduled by a single DCI.

In an embodiment, a WTRU may receive a plurality of slot format configurations from a network, the plurality of slot format configurations including a first slot format configuration in which the slot format is flexible. The WTRU may receive from the network an indication of one of the plurality of slot format configurations to be used for communications. The WTRU may receive from the network a configuration of SCSs from the network including at least a first SCS configuration for lower frequency MCSs and a second SCS configuration for higher frequency MCSs. The WTRU may receive from the network an MCS threshold. The WTRU may receive from the network an indication of an MCS to be used for a first communication channel. The WTRU may determine a time threshold for use in determining sub-carrier spacing (SCS) for communications with the network. The WTRU may use the second SCS configuration on condition that (1) the one of the plurality of slot format configurations indicated for use is the a flexible slot format configuration, (2) a time offset between a downlink control channel and a corresponding uplink channel in the network is greater that the time threshold, and (3) the indicated MCS is greater than the MCS threshold, and use the first SCS configuration otherwise.

In an embodiment, the first communication channel may be a data channel. In an embodiment, the first communication channel is at least one of a Physical Downlink Shared Channel (PDSCH) and a Physical Uplink Shared Channel (PUSCH).

In an embodiment, a method may be implemented a WTRU and may include any of receiving a Channel State Information (CSI) report configuration and an associated CSI Reference Signal (CSI-RS) resource set configuration, the CSI-RS resource set configuration including a SCS configuration; receiving an activation of a CSI reporting configuration; and on condition that a sub-carrier spacing (SCS) being used by the WTRU is the same as the SCS in the received CSI-RS resource set configuration, measuring demodulation reference signal (DM-RS) ports and transmitting Channel State Information (CSI).

In an embodiment, a method may be implemented a WTRU and may include any of receiving from a network a configuration of multiple Control Resource Sets (CORESETS) and multiple search spaces, and a plurality of symbol formats, including a first symbol format for control channel symbols and second symbol format for shared channel symbols; determining a cyclic prefix (CP) length of a received symbol; and on a condition that a symbol is in a particular CORESET or search space, using the first symbol format for the symbol and otherwise using the second symbol format for the symbol. In an embodiment, the first symbol format and the second symbol format have different CP lengths.

In an embodiment, a method may be implemented a WTRU and may include any of receiving from a network a plurality of transmission time interval (TTI) length configurations, including at least a first TTI length for a first sub-carrier spacing (SCS) and a second TTI for a second SCS; receiving from the network an indication of a SCS to be used on a communication channel; and selecting the first TTI length for use in association with channels using the first SCS and selecting the second TTI length for use in association with channels using the second SCS.

In an embodiment, a method may be implemented a WTRU and may include any of monitoring for first control information during at least one first slot of a first plurality of slots occurring during a first time period; receiving, during the at least one first slot, the first control information, wherein the first control information indicates a granularity and/or a number of a second plurality of slots occurring during a second time period; and monitoring for second control information during at least one second slot of the second plurality of slots occurring during the second time period.

In an embodiment, a method may be implemented a WTRU and may include any of receiving information indicating a plurality of blind decoding (BD) configuration sets; and determining candidate BD configuration sets from among the BD configuration sets based on an indicated monitoring and/or scheduling granularity.

In an embodiment, a method may be implemented a WTRU and may include any of receiving information indicating a plurality of blind decoding (BD) configuration sets; and determining candidate BD configuration sets from among the BD configuration sets based on an implicit indication. In an embodiment, the method may include receiving information indicating the monitoring and/or scheduling granularity.

A WTRU may transmit and/or receive one or more signals (e.g., signals carrying physical channel information, SSBs, RSs, etc.) according to at least one spatial domain filter. A "beam" may be expressed as a spatial domain filter. The WTRU, for example, may receive RSs (e.g., CSI-RSs, SSBs, etc.) using a spatial domain filter and may transmit signals (physical channel information, RSs, etc.) using the same spatial domain filter as the spatial domain filter. The WTRU transmission may be referred to as "target", and the received RS or SS block may be referred to as "reference" or "source". In such case, the WTRU may be said to transmit the target physical channel information and/or signals according to a spatial relation with a reference to such RSs.

The WTRU may transmit first physical channel information and/or signals according to the same spatial domain filter as a spatial domain filter used for transmitting second physical channel information and/or signals. The first and second transmissions may be referred to as "target" and "reference" (or "source"), respectively. In such case, the WTRU may be said to transmit the first (target) physical channel information and/or signals according to a spatial relation with a reference to the second (reference) physical channel information and/or signals.

A spatial relation may be implicit, configured by RRC, and/or signaled by media access control (MAC) control element (MAC CE) or downlink control information (DCI). A WTRU, for example, may transmit a PUSCH transmission and/or demodulation reference signal (DM-RS) of a PUSCH transmission according to the same spatial domain filter as a sounding reference signal (SRS) indicated by an SRS resource indicator (SRI) indicated in DCI and/or configured by RRC. As another example, a spatial relation may be configured by RRC for an SRI or signaled by MAC CE for a PUCCH transmission. Such spatial relation may also be referred to as a "beam indication".

The WTRU may receive a first (target) downlink channel information and/or signal according to the same spatial domain filter or spatial reception parameter used for receiving second (reference) downlink channel information and/or signals. For example, such association may exist between a physical channel such as PDCCH or PDSCH and its respective DM-RS. At least when the first and second signals are RSs, such association may exist when the WTRU is configured with a quasi-colocation (QCL) type D between corresponding antenna ports. Such association may be configured as a transmission configuration indicator (TCI) state. A WTRU may be informed of an association between a CSI-RS or SS block and a DM-RS by an index to a set of TCI states configured by one or more RRC transmissions and/or signaled by one or more MAC CEs. Such indication may also be referred to as a "beam indication".

Representative Reliable Operation of Control Channel and Efficient Operation of Shared Channel In an embodiment, a WTRU may support reliable operation (e.g., long CP length and/or smaller SCS) for a first channel (e.g., control channel) and/or a first time/frequency resource and efficient operation (e.g., short CP and/or larger SCS) for a second channel (e.g., shared channel) and/or a second time/frequency resource. Determination of the reliable operation and the efficient operation for one or more channels and/or one or more resources may be based on a gNB indication and/or configuration.

Hereafter, one or more operation types (e.g., reliable type or efficient type) may be interchangeably used with one or more of the following:

A reliable operation and an efficient operation for one or more channels

A reliable operation and an efficient operation for one or more time resources

A reliable operation and an efficient operation for one or more frequency resources A reliable operation and an efficient operation for one or more signals (e.g., reference signal and/or SSB)

Threshold Between the Indication and the Application

In an embodiment, a WTRU may determine one or more operation types and/or prioritizations based on one or more thresholds. The determination may be based on one or more of the following:

Determination of Operation Types

For example, if time offset (e.g., time offset between PDCCH indicating the one or more operation types and one or more channels, signals and/or resources) is larger than the threshold, the indicated one or more operation types may be used. If time offset is smaller than (or equal to) the threshold, default operation types may be used Determination of Transmission For example, if time offset (e.g., time offset between PDCCH indicating the one or more operation types and triggering/activating one or more channels, signals and/or resources) is larger than the threshold, the one or more channels, signals and/or resources may be triggered/activated with the indicated one or more operation types. If the time offset is smaller than (or equal to) the threshold, the WTRU may ignore (e.g., no transmission, dropping and/or no reception) the one or more channels, signals and/or resources.

Figure 9:
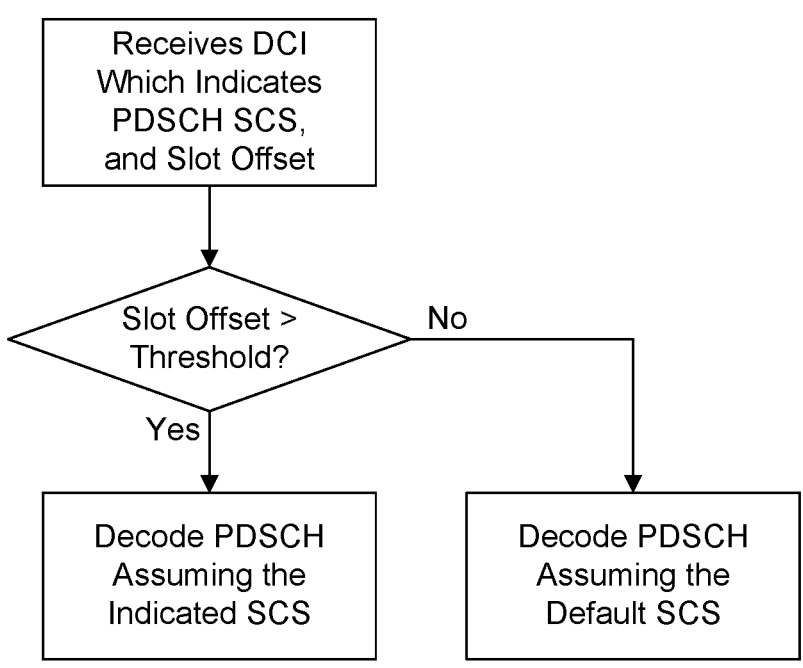
FIG. 9 is a flowchart illustrating subcarrier spacing selection in a WTRU in accordance with an embodiment.
Figure 10:
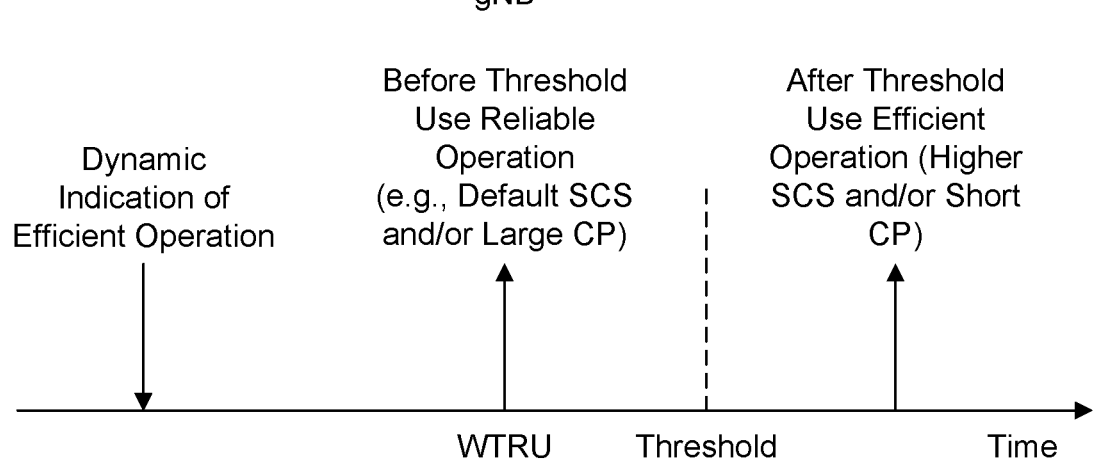
FIG. 10 is a graphical illustration of subcarrier spacing selection in a WTRU in accordance with an embodiment.

Such operation is illustrated by way of flowchart in FIG. 9. FIG. 10 illustrates the same concept graphically.

A WTRU may receive a PDCCH which schedules one or more shared channels (or one or more signals) wherein a threshold is located in the middle of the one or more shared channels. For example, the WTRU may receive a PDCCH which schedules a PDSCH wherein a first part of the PDSCH is before the threshold and a second part of the PDSCH is after the threshold. The first part and the second part may be based on one or more of the following:

A shared channel (including single slot scheduling and multi-slot scheduling)

A first part of a shared channel occurs before the threshold and a second part of a shared channel occurs after the threshold Repetition of the shared channel A first shared channel transmission occurs before the threshold and a second shared channel transmission occurs after the threshold The WTRU may determine one or more operation types based on one or more of the following:

Keep reliable operation for the first part and second part

For example, the WTRU may keep the reliable operation (e.g., long CP and/or default SCS) for the first part and the second part Mixed MCS order for the first part and second part For example, the WTRU may apply a first MCS (e.g., default MCS and/or lower MCS) for the first part and a second MCS (e.g., dynamically indicated MCS and/or larger MCS) for the second part The default MCS and/or lower MCS may be predefined or pre-configured Mixed operation types for the first part (default) and second part (the indicated)

For example, the WTRU may apply reliable operation for the first part and efficient operation for the second part Introduce a time gap (e.g., symbol, slot, us and/or ns) between first part and second part For example, the WTRU may apply a gap between the first part and the second part. The gap may be based on one or more of the following:

A time gap before the threshold

A time gap after the threshold

A time gap in the middle of the threshold

The time gap may be determined based on one or more of the following:

A pre-defined value

A pre-configured value

Multi slot scheduling case

Configured grant (multiplexing) (deactivate if SCS is different)

Resource Type Indication for Dynamic Determination

In an embodiment, a WTRU may receive an indication for a resource type indication (e.g., slot and/or symbol). The indication may be based on one or more of the following:

RRC configuration

MAC CE

DCI (UE-specific DCI and/or group DCI)

The resource type indication may comprise one or more of the following information:

Fixed type (or default type)

When the WTRU receives an indication of one or more operation types, the WTRU may not apply the one or more operation types for one or more resources (and/or one or more channels) with the fixed type. For example, when the WTRU receives a first type indication (e.g., efficient operation) for a first resource, the WTRU may transmit/receive channels and/or signals with a second type (e.g., reliable operation) for the first resource The WTRU may determine downlink slots or uplink slots as fixed type slots Flexible Type When the WTRU receives an indication of one or more operation types, the WTRU may apply the one or more operation types for one or more resources (and/or one or more channels) with the fixed type. For example, when the WTRU receives a first type indication (e.g., efficient operation) for a first resource, the WTRU may transmit/receive channels and/or signals with the first type (e.g., efficient operation) for the first resource The resource type indication may be based on one or more of the following:

Bitmap

Figure 11:
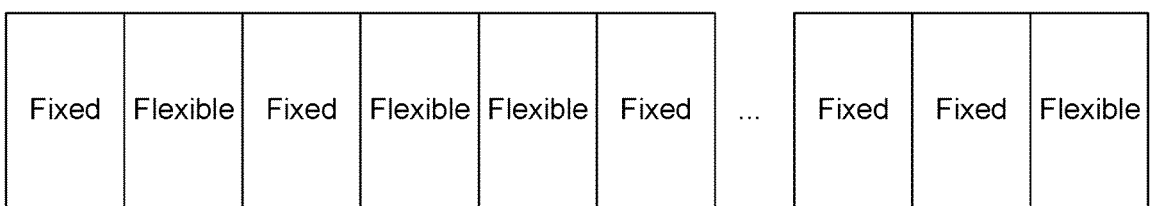
FIG. 11 illustrates an example slot format indication in accordance with an embodiment.

The WTRU may receive an indication of one or more resource types with bitmap. For example, each 0 or 1 may indicate a first type or a second type for each resource Indication of preconfigured resource types The WTRU may be configured with one or more groups of resource types for multiple resources. Based on the one or more groups, the WTRU may receive an indication of a group of the one or more groups FIG. 11 shows an example slot type indication for an allocation of reliable operation versus efficient operation.

Different Symbol Structure for Control Channel and Shared Channel

A CP length of one or more OFDM symbols for a slot may be determined based on SCS and/or CP type configured or determined for the SCS, wherein the CP type may include at least a normal CP and an extended CP. The number of symbols in a time window (e.g., slot) may be determined based on the CP length (or type). For a given CP type, a CP length of each OFDM symbol in a slot may be different based on the OFDM symbol location. A first CP length may be used for a first subset of OFDM symbols within a slot and a second CP length may be used for a second subset of OFDM symbols.

Herein, CP length may be interchangeably referred to as CP type, CP duration, CP time, and CP structure. In addition, PDCCH may be interchangeably referred to as PDCCH search space, search space, common search space, WTRU-specific search space, and CORESET.

CP Length Determination for OFDM Symbols

One or more CP lengths may be used for an OFDM symbol. The CP length of an OFDM symbol may be determined based on the CP length of another time unit or the time duration associated with the OFDM symbol. In an embodiment, the CP length of an OFDM symbol may be determined based on the CP length of a time location in which the OFDM symbol is located, wherein the time location may be at least one of a slot, a subframe, a radio frame, and a set of configured OFDM symbols. In an embodiment, the CP length of an OFDM symbol may be determined based on one or more CP lengths of one or more symbols in the frequency range in which a WTRU may expect to receive or transmit a signal. For example, a first CP length may be determined or used if a WTRU expects to receive/transmit a signal in a first frequency location and a second CP length may be determined or used if the WTRU expects to receive/transmit a signal in a second frequency location, and so on, wherein each frequency location may be at least one of a carrier, a bandwidth part, a sub-band, and a resource block.

In an embodiment, a CP length of an OFDM symbol may be determined based on which physical channel and/or signal is associated with the OFDM symbol. For example, if the OFDM symbol is configured for one or more of a first set of physical channels and/or signals, a first CP length may be used for the OFDM symbol; otherwise, a second CP length may be used for the OFDM symbol. For instance, one or more of the following may apply:

A first CP length may be used for an OFDM symbol configured for a broadcasting channel and/or signal (e.g., common search spaces, SS/PBCH block) and a second CP length may be used for an OFDM symbol configured for dedicated channel (e.g., WTRU-specific search spaces)

The first CP length may be longer than the second CP length. For example, the first CP length may be an extended CP and the second CP length may be a normal CP.

Alternately, the first CP length may be configured or determined for the bandwidth part and not dynamically changed while the second CP length may be configured or determined for a physical channel and/or signal and semi-statically or dynamically changed.

A longer CP length may be used or determined for an OFDM symbol which may be configured for both physical channel/signal for a first CP length and physical channel/signal for a second CP length. When there are multiple, different possible CP lengths based on the multiple rules (e.g., a first rule based on the PDCCH config and a second rule based on the PDSCH config dictate different CP lengths), a prioritization rule may be applied to select one. In one embodiment, the gNB selects the longest CP length In another solution, a CP length of an OFDM symbol may be configured for a physical channel or a signal. For example, a CP length may be configured for a CORESET or a search space. When a WTRU monitors a search space, the CP length of an OFDM symbol that may include the search space may be determined based on the CP length configured for the search space. One or more of following may apply:

A CP length may be configured, indicated, or determined for a search space. For example, the search space configuration may include the CP length A CP length may be configured, indicated, or determined for a search space type. For example, a first CP length may be configured for a first search space type (e.g., common search space type) and a second CP length may be configured for a second search space type (e.g., WTRU-specific search space type).

A CP length of a search space may be determined based on the CP length configured for the associated CORESET.

In an embodiment, a CP length of OFDM symbols used or determined for PDSCH may be indicated in the associated PDCCH. In an example, a CP length for PDSCH may be explicitly indicated in the scheduling DCI. One or more of following may apply:

The number of OFDM symbols for the PDSCH scheduled may be determined based on the CP length indicated in the associated DCI.

If the PDSCH scheduling offset is less than a threshold, the CP length of the PDSCH may be determined based on the CP length of the PDCCH in which the WTRU received scheduling DCI. Otherwise, the CP length of the PDSCH may be indicated from the scheduling DCI.

CP Length Determination for Slots

In an embodiment, a CP length (or type) may be determined as a function of at least one of slot number, identity of bandwidth part (e.g., BWP-id), subframe number, radio frame number, and carrier index. For example, a first CP length may be used for a first set of slots and a second CP length may be used for a second set of slots. One or more of following configurations may be applied:

A CP length of a subset of slots may be configured or determined. For example, a first subset of slots may be associated with a first CP length (e.g., normal CP) and a second subset of slots may be associated with a second CP length (e.g., extended CP). In an embodiment, a WTRU may be configured, indicated, or determined to receive/transmit signals in a subset of slots associated with a CP length. For example, when a WTRU experiences large delay spread, the WTRU may be configured or indicated to receive/transmit signals in a first subset of slots that may be associated with a first CP type (e.g., extended CP). Alternatively, the WTRU may be configured or indicated to receive/transmit signals in a second subset of slots.

In an embodiment, a WTRU may report a preferred CP length (or type) and/or a preferred subset of slots that may be associated with a certain CP length. The WTRU may receive a confirmation (e.g., by receiving a PDCCH in a dedicated CORESET/search space) or a configuration to use a modified CP length in response to such report.

In an embodiment, a WTRU may report information related to inter-symbol interference (ISI) level due to the CP length. For example, if an ISI level is higher than a threshold, the WTRU may report the information related to the ISI level. The network may configure the WTRU to use a modified CP length in response to such report. Based on the report, the WTRU may receive a confirmation (e.g., by receiving a PDCCH in a dedicated CORESET/search space) or a configuration to use a modified CP length in response to such report from a gNB.

In an embodiment, a first set of slots and a second set of slots may be determined based on any of a higher layer configuration (e.g., bitmap indication for the first set of slots and/or the second set of slots); and whether the slot includes broadcasting signals or not. For example, the first set of slots may be the slots which include at least one of synchronization signal/physical broadcast channel (SS/PBCH) block, common search spaces, group-common PDCCH, and TRS.

Representative Multiple Activated BWPs

A BWP may be one of multiple possible states, including active, inactive, and dormant states. One or more BWPs may be active (or dormant) in a carrier. A WTRU may perform any of the following in an active BWP: (i) receiving a synchronization signal (e.g., synchronization signal block (SSB)); (ii) monitor one or more search spaces (e.g., common and WTRU-specific search spaces); (iii) carry out measurements of reference signals (e.g., radio resource management (RRM), radio link monitoring (RLM), and CSI); and (iv) report measurement results in the BWP. In an embodiment, the WTRU may measure one or more reference signals configured when the associated BWP is in an active state.

Herein, features described in association with active BWPs also can be applied to other types of BWPs, including dormant BWP, channel-specific BWP, scheduling BWP, normal BWP, and scheduled BWP while remaining consistent with this disclosure.

Representative Activation/Deactivation of Multiple BWPs

One or more BWPs may be used in a carrier. A subset of BWPs may be activated simultaneously for the same direction (e.g., uplink, downlink, or both).

In an embodiment, one or more BWP groups may be (pre-)configured, determined, defined, or used in a carrier, and activation/deactivation may be performed per a BWP group level, wherein each BWP group may include one or more BWPs. One or more of following may apply: (i) each BWP group may have an associated BWP group identity (e.g., BWP-group-Id); and (ii) a BWP-group-Id may be indicated (e.g., via higher layer or DCI) to a WTRU. The BWPs associated with a BWP-group-Id may be activated or de-activated.

In an embodiment, two types of BWP switching gaps may be used. The first type of BWP switching gap may be used when BWP switching occurs between two BWPs in different BWP groups. The second type of BWP switching gap may be used when BWP switching occurs between two BWPs in the same BWP group.

In an embodiment, a WTRU is not permitted to perform transmission/reception during the BWP switching gap. For example, a WTRU may not monitor PDCCH and/or measure reference signal during a BWP switching gap. In an embodiment, the first BWP switching gap may be larger than the second BWP switching gap. In an embodiment, the first BWP switching gap may be N OFDM symbols (e.g., N>=1) and the second BWP switching gap may be M OFDM symbol(s) (e.g., M=0).

In an embodiment, a first set of PDSCH scheduling offsets (e.g., k1 values) may be used when a PDSCH is scheduled in a second BWP and its scheduling PDCCH is in a first BWP, and the first BWP and the second BWP are not in the same BWP group; otherwise a second set of PDSCH scheduling offset may be used.

In an embodiment, the PDSCH scheduling offset k1 may be the gap between the slot of the associated PDCCH and the slot of the scheduled PDSCH. For example, the same slot scheduling (e.g., k1=0) may be prohibited when the first BWP and the second BWP are not in the same BWP group. Alternatively, the same slot scheduling (e.g., k1=0) may be allowed or used when the first BWP and the second BWP are in the same BWP group.

In an embodiment, a primary BWP and a secondary BWP may be configured, determined, or used. The primary BWP may be a BWP wherein a WTRU monitors one or more search spaces. The second BWP may be a BWP wherein the WTRU receives a scheduled PDSCH. One or more of the following may apply:

The primary BWP may be associated with a first subcarrier spacing and the second BWP may be associated with a second subcarrier spacing, wherein the first subcarrier spacing may be different from the second subcarrier spacing.

The primary BWP may be active unless a WTRU may be configured or indicated to switch (e.g., via MAC-CE or DCI). The second BWP may be activated only when SCSs are different between PDCCH and PDSCH. For example, a WTRU may be configured with a primary BWP and a secondary BWP in a carrier. The second BWP is activated when the SCS of the second BWP is determined as a different value from the SCS of the first BWP.

In an embodiment, a WTRU may be configured with an
SCS for PDSCH in the associated PDCCH. The sec-
ondary BWP may be activated when the SCS of the
PDSCH is different from that of the associated
PDCCH.

In an embodiment, an activation/de-activation indication
may be signaled in the primary BWP for the secondary
BWP.

Physical Channel Association with Active BWP

One or more BWPs may be activated (or active) and each
active BWP may be used for one or more physical channels.
A WTRU may be configured to perform (e.g., receive/
transmit) a subset of physical channels and/or signals of the
same direction (e.g., uplink or downlink).

In an embodiment, a first active BWP may be configured,
used, or determined for a control channel (e.g., PDCCH) and
a second active BWP may be configured, used, or deter-
mined for a data channel (e.g., PDSCH). One or more of
following may apply:

An active BWP may be configured for at least one of the
following: control channel reception only (referred to
as control BWP); all downlink channels and signals
(referred to as normal BWP); data channel reception
only (referred to as data BWP); and (v) measurement
only (referred to as measurement BWP).

Different subcarrier spacings (SCSs) may be used for the
activated BWPs. In an embodiment, a first SCS may be
configured, used, or determined for a first active BWP
and a second SCS may be configured, used, or deter-
mined for a second active BWP. In an embodiment, a
set of SCS candidates may be different based on which
physical channel is transmitted/received in the active
BWP. For example, a first set of SCSs may be used or
determined as candidate SCSs when a first physical
channel (e.g., PDCCH) is transmitted/received in the
active BWP, and a second set of SCSs may be used or
determined as candidate SCSs when a second physical
channel (e.g., PDSCH) is transmitted/received in the
active BWP. For example, SCS={120, 240, 480} kHz
may be a set of candidate SCSs for a BWP wherein
PDCCH is monitored, whereas SCS={120, 240, 480,
960} kHz may be a set of candidate SCSs for a BWP
wherein PDSCH is received. A SCS used, configured,
or determined for a BWP configured for a control
channel may be equal to or smaller than a SCS used,
configured, or determined for a BWP configured for a
data channel.

A WTRU may monitor/receive/attempt to decode a
PDCCH in a first BWP configured for a control channel
and the WTRU may receive its associated PDSCH in a
second BWP configured for a data channel, wherein the
first BWP and the second BWP may be different (or
may have a different BWP-id).

In an embodiment, one or more BWPs may be configured
for a control channel and one or more BWPs may be
configured for a data channel. Hereafter, a BWP con-
figured for a control channel may be referred to as
control BWP and a BWP configured for a data channel
may be referred to as data BWP. In an embodiment, an
association between a control BWP and a data BWP
may be used. For example, for a control BWP, an
associated data BWP information may be provided to a
WTRU (e.g., higher layer configuration or dynamic
indication via a DCI).

When a single data BWP is associated with a control
BWP, a BWP-Id may be omitted in the DCI scheduling
PDSCH or PUSCH. When more than one data BWPs are associated with a control BWP, a BWP-Id may be
provided in DCI scheduling PDSCH or PUSCH.

In an embodiment, a WTRU may buffer the PDSCH
resources in all associated data BWPs when the WTRU
monitors a corresponding PDCCH.

In an embodiment, a slot in a control BWP with smaller
SCS may be associated with multiple slots in a data
BWP with larger SCS. For example, a PDCCH
received in a slot in a control BWP may schedule
PDSCH over N (N>=1) slots in a data BWP when the
SCS for a data BWP is larger than that for the associ-
ated control BWP. The N value may be determined
based on at least one of the SCS pair of control BWP
and data BWP, a TDD subframe configuration and the
N value may be configured In an embodiment, a first active BWP may be configured,
used, or determined for both control and data channels and
a second active BWP may be configured, used, or deter-
mined for a data channel only. One or more of following
may apply:

A WTRU may monitor/receive/attempt to decode a
PDCCH in a first BWP and the WTRU may receive its
associated PDSCH in either the first BWP or a second
BWP, wherein the SCS for the first BWP and the
second BWP may be different.

BWP-id indication for PDSCH scheduling may be used as
an implicit determination of the SCS for the scheduled
PDSCH The scheduling offset in the scheduling DCI may be
interpreted differently based on whether the scheduled
PDSCH is in the same BWP as the associated PDCCH.
In an embodiment, k1=0 (i.e., PDSCH scheduling
offset) may be interpreted as the same slot scheduling
where the PDSCH is located in the same slot with the
associated PDCCH when the PDSCH is scheduled in
the first BWP (e.g., same BWP for PDCCH and
PDSCH). In an embodiment, k1=0 may be interpreted
as the closest slot to the last symbol of the PDCCH,
wherein the closest slot may be the first symbol of the
slot in the second BWP that has the smallest non-
negative gap from the last symbol of the scheduling
PDCCH.

In an embodiment, a first active BWP may be configured,
used, or determined for uplink control channel (e.g.,
PUCCH) and a second active BWP may be configured, used,
or determined for uplink data channel (e.g., PUSCH). One or
more of following may apply:

A WTRU may determine a BWP-id (or an active BWP)
based on the uplink channel or signal the WTRU has to
transmit. For example, if a WTRU has to send a
PUCCH, the WTRU may determine the first active
BWP for PUCCH transmission; if the WTRU has to
send a PUSCH, the WTRU may determine the second
active BWP for PUSCH transmission.

The first active BWP may be configured with a first SCS
and the second active BWP may be configured with a
second SCS. In an embodiment, the SCS for the first
BWP may be smaller than that for the second BWP. In
an embodiment, the CP length for the first BWP may be
longer than the CP length for the second BWP.

When a WTRU is indicated or granted to send both
PUCCH and PUSCH, the WTRU may send uplink
control information (UCI) on PUSCH (e.g., PUCCH+
PUSCH) in one of the BWPs. The WTRU may deter-
mine the BWP for UCI on PUSCH based on the SCS
associated with BWP. For example, the WTRU may
determine a BWP with a larger SCS (or smaller SCS).

Alternatively, or additionally, The WTRU may determine the BWP for UCI on PUSCH based on the CP length associated with BWP. For example, the WTRU may determine a BWP with a longer CP length (or smaller CP length).

When a WTRU is indicated or granted permission to send both PUCCH and PUSCH, the WTRU may drop one of the uplink channels. For example, the WTRU may drop the PUSCH transmission.

Representative Dynamic Indication of Shared Channel SCS with Default SCS

Herein, using a SCS and/or dynamic determination of a SCS may be used interchangeably with one or more of the following: (i) receiving and/or decoding PDSCH information with the SCS; (ii) encoding and/or transmitting PUSCH information with the SCS; (iii) receiving and/or decoding PSSCH information with the SCS; and (iv) encoding and/or transmitting PSSCH information with the SCS.

Herein, dynamic determination of a SCS for one or more shared channels may be used interchangeably with one or more of the following: (i) dynamic determination of a SCS for one or more slots; (ii) dynamic determination of a SCS for one or more symbols; (iii) dynamic determination of a SCS for one or more time resources; and (iv) dynamic determination of a SCS for one or more frequency resources.

Representative Dynamic Determination of Shared Channel SCS

In an embodiment, a WTRU may receive a dynamic determination of a SCS for one or more shared channels (e.g., downlink, uplink, and/or sidelink). Based on the dynamic determination, the WTRU may determine a SCS among multiple candidate SCSs. Based on the determined SCS, the WTRU may receive the one or more shared channels.

Figure 12:
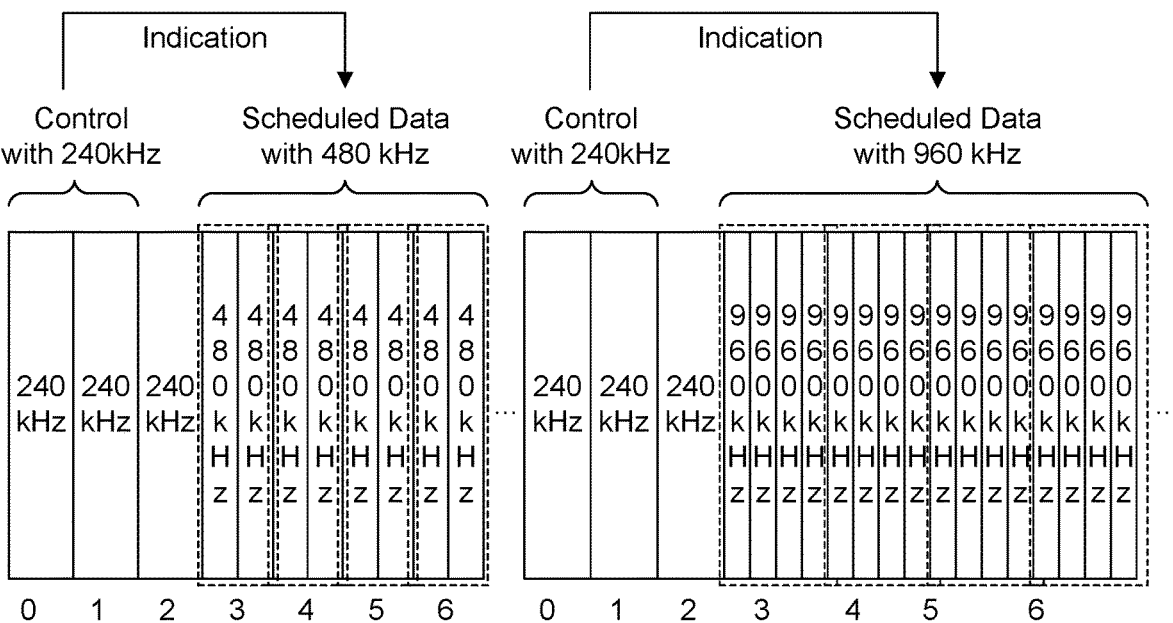
FIG. 12 is a diagram illustrating an example set of slots comprising symbols having different cyclic prefix lengths in accordance with an embodiment.
Figure 13:
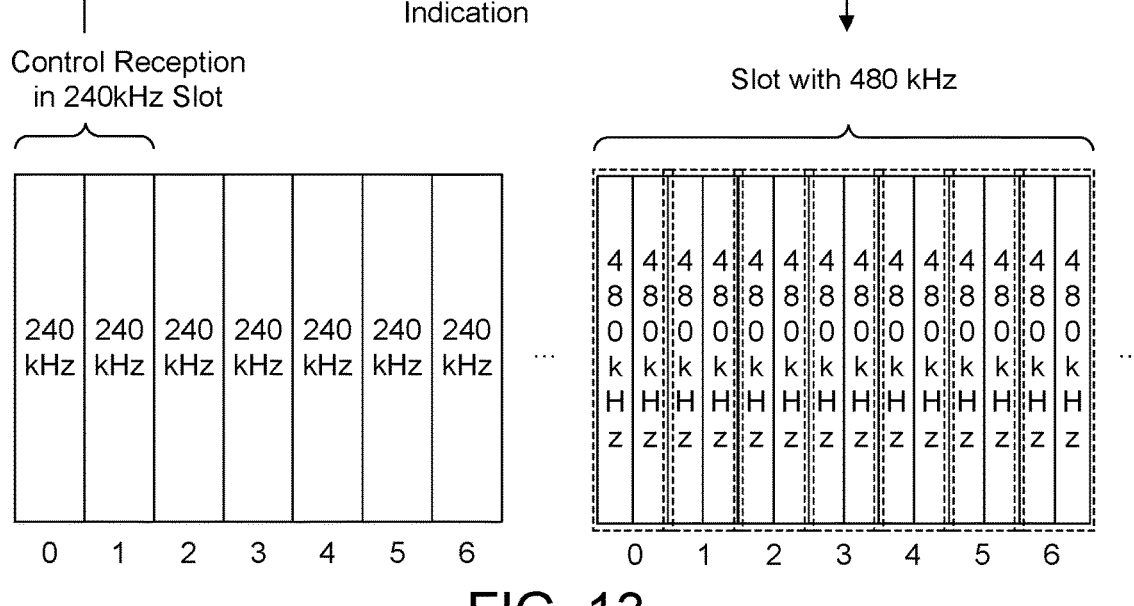
FIG. 13 is a diagram illustrating an example set of slots comprising symbols having different cyclic prefix lengths in accordance with an embodiment.

FIGS. 12 and 13 illustrate respective example sets of slots. The sets of slots 1200, 1300 may include respective pluralities of slots, including, e.g., respective first slots 1201, 1301 and second slots 1203, 1303. FIGS. 12 and 13 show only 7 symbol locations per slot for purposes of simplicity (avoidance of detail unnecessary to the illustrative purpose of the drawing). However, it will be understood by those of skill in the related arts that a slot typically comprises more than 7 symbol locations, e.g., 14 symbol locations.

All 7 symbol locations of each of the first and second slots 1201, 1203 may have the same duration and that duration may be based on an SCS of 240 KHz (e.g., an SCS that results in the combined durations of the symbol locations equaling the slot duration). In the first slot 1201, the SCS for the first three symbol locations (locations 0, 1, and 2) may be 240 KHz; allowing for transmission or reception of one symbol per symbol locations 0, 1, and 3. The SCS for the next 4 symbol locations in the slot 1201 (locations 3, 4, 5, and 6) may be 480 KHz; allowing for transmission or reception of two symbols per symbol locations 3, 4, 5, and 6). For instance, the first 3 symbol locations (e.g., based on a configuration of CORESETs and/or search spaces) may be used for transmission of: and reception of transmissions carrying, control channel information, such as PDCCH information, e.g., to maximize transmission reliability for the control channel information. The next 4 symbol locations in the slot may be used for transmission and reception of transmission carrying shared channel information/data (e.g., PDSCH information/data and/or PUSCH information/data), e.g., to maximize resource efficiency. The SCS for one or more of the symbol locations of any of the plurality of slots may be changed dynamically (e.g., at any time up until a leading edge of a boundary of the each of the concerned symbol locations). For example, in the second slot 1203, the SCSs may be changed dynamically such that SCSs for the first three symbol locations (e.g., based on a configuration of CORESETs and/or search spaces) may be 240 KHz; allowing for transmission or reception of one symbol per symbol locations 0, 1, and 3. and SCS for the 4 symbol locations that follow (locations 3, 4, 5, and 6) may be 960 KHz; allowing for transmission or reception of four symbols per symbol locations 3, 4, 5, and 6.

Referring now to FIG. 13, all 7 symbol locations of each of the first and second slots 1301, 1303 may have the same duration and that duration may be based on an SCS of 240 KHz (e.g., an SCS that results in the combined durations of the symbol locations equaling the slot duration). The SCSs for the entirety of the first slot 1301 may be 240 KHz; allowing for transmission or reception of one symbol per symbol location. The SCS for the entirety of the second slot 1303 may be 960 KHz; allowing for transmission or reception of four symbols per symbol location. The first slot may be used for transmission of, and reception of transmissions carrying, control channel information, such as PDCCH information, e.g., to maximize transmission reliability for the control channel information. The second slot may be used for transmission of, and reception of transmissions carrying, shared channel information/data (e.g., PDSCH information/data and/or PUSCH information/data), e.g., to maximize resource efficiency.

Representative Mode of Operation with Dynamic Determination and Semi-Static Determination One or more modes of operation may be used for SCS determination. The modes of operation may include, e.g., dynamic determination mode and a semi-static determination mode. The number (or the maximum number) of configured SCS values may be determined based on a mode of operation determined, used, or configured. One or more of the following may apply:

A mode of operation may be determined based on the number of SCS values configured pursuant to an RRC configuration (e.g., BWP configuration). For example, if a WTRU is configured with one SCS value, the WTRU may determine to receive, and/or receive, one or more transmissions carrying shared channel information with semi-static determination. If the WTRU is configured with two or more SCS values, the WTRU may determine to receive, and/or receive, one or more transmissions carrying shared channels information with dynamic determination A mode of operation may be determined based on the number of SCS values reported as a WTRU capability. A WTRU may determine a mode of operation based on the number of SCS values configured/indicated as a WTRU capability. For example, if the WTRU is configured with one processing time value, the WTRU may determine to use, and/or use, the semi-static determination mode. If the WTRU is configured with more than one processing time value, the WTRU may determine to use, and/or use, the dynamic determination mode.

A mode of operation may be determined based on a WTRU capability and a gNB configuration based on the WTRU capability reported to the gNB.

A WTRU may request its preferred mode of operation for SCS determination. For example, if a WTRU is capable of supporting both modes of operation, the WTRU may indicate to the gNB a preferred mode of operation. The WTRU may determine the preferred mode of operation based its measurement result (e.g., delay spread) of a wireless channel between the WTRU and a gNB, for example.

Representative Indication Methods for Dynamic Determination

A WTRU may receive one or more of the following indications for dynamic determination via signaling, such as, e.g., any of layer 1 (L1), layer 2 (L2), layer 2 (L3) and other layer signaling, including one or more of RRC, MAC CE and DCI signaling:

SCS Values

The WTRU may receive explicit SCS values for SCSs for one or more shared channels. In an embodiment, the indication may be based on predefined SCS values. For example, a value of 0 in a control signal may indicate 120 kHz, a value of 1 may indicate 240 kHz, a value of 2 may indicate 480 kHz, and a value of 3 may indicate 960 kHz, and so on. In an embodiment, the indication may be based on configured values. The WTRU may be configured with more than one SCS value via an RRC signaling and the SCS values may correspond to values and/or a bitmap of one or more bits of a DCI. For example, the WTRU may be configured with two SCS values ("first and second SCS values") for SCSs of 120 kHz and 480 kHz, respectively, and first and second SCS values may correspond to respective values of a bit of a DCI (i.e., the first SCS value may correspond to a first value of the bit (e.g., a "0") and the second SCS value may correspond to a second value of the bit (e.g., a:"1")). The bits of the DCI may be in a field of the DCI. Based on the configured SCS values, the WTRU may receive an indication for dynamic determination.

Activation (e.g., via a MAC CE) of candidate SCS values configured via RRC signaling may be applied. For example, the WTRU may be configured with SCS values for SCSs of 120 kHz, 240 kHz, 480 kHz and 960 kHz. The WTRU may receive activation signaling (e.g., via a MAC CE and a corresponding index to the bitmap) that activates the SCS values for the SCSs of 120 kHz and 960 kHz. Based on the activated SCS values, the WTRU may dynamically determine that the SCS of 120 kHz corresponds to first value of the bit (e.g., a "0") of a DCI and the SCS of 960 kHz corresponds to second value of the bit (e.g., a "1") of a DCI.

Ratio Between Default SCS and Shared Channel SCS

The WTRU may receive information indicating a ratio between a default SCS and an SCS for a shared channel. The indication may be based on predefined ratios and/or configured ratios. The configuration may be based on RRC and/or MAC CE. The default SCS may be one or more of the following: (i) an SCS semi-statically configured via RRC (e.g., a configured SCS of BWP); and (ii) an SCS configured for a control channel (e.g., one or more of PDCCH, PUCCH and PSCCH).

Implicit Indication

The WTRU may receive one or more implicit indications for dynamic determination. The WTRU may be configured with one or more thresholds for dynamic determination. The one or more thresholds may be predefined or configured via an RRC configuration (e.g., in an RRC configuration message). For simplicity of exposition herein, the terms "RRC configuration" are used to refer to any of an RRC configuration and an RRC reconfiguration.

The WTRU may dynamically determine SCS for one or more shared channels based on one or more parameters indicated by the one or more implicit indications. For example, when the one or more parameters is less than (or equal to) the one or more thresholds, the WTRU may determine a first SCS (e.g., default SCS). When the one or more parameters is larger than the one or more thresholds, the WTRU may determine a second SCS (e.g., 480 kHz or 960 kHz). Based on the number of the one or more thresholds, the number of candidate SCSs may be different. For example, when the WTRU is configured/predefined with two thresholds, three candidate SCSs (e.g., a first SCS, a second SCS and a third SCS) may be used The one or more parameters for implicit indications may be based on one or more of the following:

MCS

For example, when the WTRU receives a PDCCH scheduling a PDSCH with a first MCS which is lower than (or equal to) a threshold, the WTRU may determine a first SCS (e.g., default SCS). When the WTRU receives a PDCCH scheduling a PDSCH with a second MCS which is higher than the threshold, the WTRU may determine a second SCS (e.g., 480 kHz or 960 kHz)

Transport Block (e.g., Transport Block Size)

For example, when the WTRU receives a PDCCH scheduling a PDSCH with a first transport block (TB) (e.g., based on explicit/implicit TB size indication) which is lower than (or equal to) a threshold, the WTRU may determine a first SCS (e.g., default SCS). When the WTRU receives a PDCCH scheduling a PDSCH with a second TB which is higher than the threshold, the WTRU may determine a second SCS (e.g., 480 kHz or 960 kHz).

Scheduled Time Resource (e.g., Slots and/or Symbols)

For example, when the WTRU receives a PDCCH scheduling a PDSCH in a first time resource (e.g., via time resource allocation field in DCI) which is smaller than (or equal to) a threshold, the WTRU may determine a first SCS (e.g., default SCS). When the WTRU receives a PDCCH scheduling a PDSCH in a second time resource which is larger than the threshold, the WTRU may determine a second SCS (e.g., 480 kHz or 960 kHz).

Scheduled Frequency Resource (e.g., Number of Resource Block Groups)

For example, when the WTRU receives a PDCCH scheduling a PDSCH in a first frequency resource (e.g., via time resource allocation field in DCI) which is smaller than (or equal to) a threshold, the WTRU may determine a first SCS (e.g., default SCS). When the WTRU receives a PDCCH scheduling a PDSCH in a second frequency resource which is larger than the threshold, the WTRU may determine a second SCS (e.g., 480 kHz or 960 kHz).

BWP Size (e.g., PRBs)

For example, when the WTRU receives a PDCCH scheduling a PDSCH in a first BWP which is smaller than (or equal to) a threshold, the WTRU may determine a first SCS (e.g., default SCS). When the WTRU receives a PDCCH scheduling a PDSCH in a second BWP which is larger than the threshold, the WTRU may determine a second SCS (e.g., 480 kHz or 960 kHz).

Priority Indication

For example, when the WTRU receives a PDCCH scheduling a PDSCH with a first priority (e.g., high priority or low priority via priority indication field in DCI), the WTRU may determine a first SCS (e.g., default SCS). When the WTRU receives a PDCCH scheduling a PDSCH with a second priority (e.g., low priority or high priority), the WTRU may determine a second SCS (e.g., 480 kHz or 960 kHz)

On/Off

The WTRU may be configured with one or more SCSs in addition to BWP SCS (e.g., via an RRC configuration). Based on the configuration, the WTRU may receive an indication of dynamic SCS change (i.e., use the one more SCSs for one or more shared channels). For example, when the WTRU receives an indication for OFF, the WTRU may use BWP SCS for one or more shared channels. When the WTRU receives an indication for ON, the WTRU may use the one more SCSs for one or more shared channels.

Representative Resource Indication for Dynamic Determination

A WTRU may determine one or more resources (e.g., shared channels and/or signals) for dynamic SCS determination based on an explicit indication. For example, the WTRU may receive an indication of time and/or frequency resources for dynamic SCS determination from a gNB (e.g., via one or more of RRC, MAC CE and DCI). In an embodiment, the frequency resource indication may be based on one or more of subband, resource block group (RBG), and precoding resource block group (PRG). In an embodiment, the time domain resource indication may be based on one or more of slot, symbol, us and ns.

Alternatively, and/or additionally, a WTRU may determine one or more resources (e.g., shared channels and/or signals) for dynamic SCS determination based on an implicit indication. The implicit indication may be based on any of scheduled time resources and Scheduled frequency resources. In an embodiment, the WTRU may apply the determined operation types to the time resources scheduled by a PDCCH. For example, when the WTRU receives a PDCCH that schedules a PDSCH with an indication of SCSs, the WTRU may determine and apply the indicated SCSs to the time resources of the PDSCH (e.g., via time domain resource allocation field in DCI). In an embodiment, the WTRU may apply the determined operation types to the frequency resources scheduled by a PDCCH. For example, when the WTRU receives a PDCCH that schedules a PDSCH with an indication of SCSs, the WTRU may determine and apply the indicated SCSs to the frequency resources of the PDSCH (e.g., via frequency domain resource allocation field).

The time/frequency resource determination may be based on resource allocation types. The determination may be based on any of a frequency domain resource allocation type and a time domain resource allocation type. The WTRU may use semi-statically configured and/or predefined frequency resources when the WTRU receives a control channel with resource allocation type 0 (e.g., RBG based). The WTRU may use dynamically indicated frequency resources (e.g., explicitly indicated frequency resources and/or scheduled frequency resources) when the WTRU receives a control channel with resource allocation type 1 (e.g., consecutive resource allocation with starting RB and length of RBs). The WTRU may use predefined/preconfigured time resource for a first time domain resource allocation type (e.g., based on a predefined time domain resource allocation table) and dynamically indicated time resources (e.g., explicitly indicated time resources and/or scheduled time resources) for a second time domain resource allocation type (e.g., based on a RRC configured time domain resource allocation table).

Representative Channel State Information Measurement and Reporting for Different Sub-Carrier Spacings In an embodiment, one or more CSI-RS report configurations (e.g., CSI-ReportConfigs) may be used for the same BWP. Each CSI report configuration may include or be configured with one or more of the following: (i) CSI-RS resources and/or CSI-RS resource sets for channel and interference measurement; (ii) CSI-RS transmission periodicity for periodic and semi-persistent CSI reports; (iii) CSI-RS transmission slot offset for periodic, semi-persistent and aperiodic CSI reports; (iv) CSI-RS transmission slot offset list for semi-persistent and aperiodic CSI reports; (v) time restrictions for channel and interference measurements; (vi) the thresholds and modes of calculations for the reporting quantities (channel quality indicator (CQI), reference signal received power (RSRP), signal to interference and noise ratio (SINR), layer indicator (LI), rank indicator (RI), etc.); and the resource mapping corresponding to the symbol and subcarrier location within a slot for CSI-RS resources associated with channel and interference measurements.

One or more CSI report configurations may be used, and one or more CSI-RS measurements may be performed independently when configured. In an embodiment, a WTRU may be configured with CSI report configurations for the default and the dynamic SCS; and the WTRU may perform channel and/or interference measurement for both CSI report configurations.

In an embodiment, a WTRU may be configured with CSI-RS configurations (e.g., CSI-RS resource and/or CSI-RS resource set with a SCS configuration) for the default and the dynamic SCS; and the WTRU may perform channel and/or interference measurement for both CSI-RS configurations.

In an embodiment, a WTRU may be configured with aperiodic/semi-persistent CSI trigger states wherein each state is configured with the default or the dynamic SCS; and the WTRU may perform channel and/or interference measurement based on the indicated SCS of the triggered state.

Based on the channel and/or interference measurement, a WTRU may report one or more of the following information to a gNB (e.g., via CSI report):

Report on preferred SCS (e.g., one of one or more dynamic SCSs and default SCS). For example, the WTRU may indicate its preferred SCS for PDSCH reception. The indication may be based on an explicit indication. For example, the WTRU may report its preferred SCS value as a part of the CSI report. Alternatively, the indication may be based on Implicit indication A WTRU may report its preferred SCS value implicitly. The implicit indication may be based on one or more of the following:

CSI-RS Resource/Resource Set Indicator

For example, the WTRU may report a CSI-RS resource/resource set, which includes an SCS parameter, and the gNB may consider that same SCS to be the preferred SCS for the WTRU BWP indicator For example, the WTRU may report a BWP ID with its preferred SCS PUCCH resource For example, the WTRU may be configured with dedicated PUCCH resource for each SCS (e.g., a first PUCCH resource for a first SCS and a second PUCCH resource for a second SCS). Based on the configuration, the WTRU may indicate its preferred SCS. For example, if the WTRU prefers the first SCS, the WTRU may report its CSI via the first PUCCH resource. If the WTRU prefers the second SCS, the WTRU may report its CSI via the second PUCCH resource Report on both SCSs For example, the WTRU may indicate CSI for both SCSs based on one or more of the following:

RI

For example, the WTRU may indicate a first RI for a first SCS (e.g., default SCS) and a second RI for a second SCS (e.g., dynamic SCS). The second RI may be a delta RI (e.g., an indication of RI difference based on the first RI)

PMI (Precoding Matrix Indicator)

For example, the WTRU may indicate a first PMI fora first SCS (e.g., default SCS) and a second PMI for a second SCS (e.g., dynamic SCS). The second PMI may be a delta PMI (e.g., an indication of PMI difference based on the first PMI)

The WTRU may indicate a common PMI for wideband information for both SCSs and separate PMIs for subband information. For example, the WTRU may indicate a first PMI (e.g., for beam group selection) for both (i.e., a first SCS and a second SCS) and the second PMI for a first SCS and a third PMI for the second SCS

CQI

For example, the WTRU may indicate a first CQI for a first SCS (e.g., default SCS) and a second CQI for a second SCS (e.g., dynamic SCS). The second CQI may be a delta CQI (e.g., an indication of CQI difference based on the first CQI)

Other quality information (e.g., one or more of L1-RSRP, L1-SINR and etc.)

LI

For example, the WTRU may indicate a LI only for a SCS (e.g., default SCS or a dynamic SCS)

For example, the WTRU may indicate a first LI for a first SCS (e.g., default SCS) and a second LI for a second SCS (e.g., dynamic SCS).

Alternatively, one or more CSI report configurations may be used, configured, or determined in association with the default SCS, and an event of CSI measurement may trigger a procedure, operation, or WTRU behavior relating to the dynamically configured SCS. In an example, a WTRU may be configured or triggered to monitor a CSI-RS associated with the default SCS in a slot which is associated with the dynamic SCS at the time of the measurement. The monitoring may be based on the resource type indication (e.g., fixed type or flexible type). For example, the WTRU may monitor a CSI-RS in a fixed type resource, but the WTRU may not monitor the CSI-RS in a flexible type resource.

In an embodiment, one or more sets of default CSI report configurations may be used, configured, or selected that are associated with the default SCS and will be measured and reported while being adapted to the SCS at the time of measurement. In such cases, a WTRU may need to perform one or more procedures, operations and/or WTRU behaviors to convert or interpret the resource mapping of the default SCS in the dynamic SCS. In an example, the WTRU may be configured with a CSI-RS resource configured as periodic or semi-persistent by higher layer parameters in the context of default SCS, wherein the monitored CSI-RS may be received in the dynamic SCS at the time of measurement. The WTRU may be expected to apply compensating measures as a function of default and dynamic SCS, wherein the WTRU may assume the CSI-RS is transmitted in slots satisfying $$\left(N_{slot}^{frame,\mu_{dynamic}} n_f + n_{s,f}^{\mu_{dynamic}} - \left\lfloor \frac{T_{offset,default}}{2^{\mu_{default}}} \cdot 2^{\mu_{dynamic}} \right\rfloor \right)$$

$$\mod \left( \left\lfloor \frac{T_{CSI-RS,default}}{2^{\mu_{default}}} \cdot 2^{\mu_{dynamic}} \right\rfloor \right) = 0$$

where $$N_{slot}^{frame,\mu}$$

is the number of slots within a frame, $n_f$ is the frame index, and $$n_{s,f}^{\mu}$$

is the slot index within the frame. The $T_{offset}$ and $T_{CSI-RS}$ are the slot offset and the periodicity configured or determined in association with the default SCS (e.g., higher layer parameter CSI-ResourcePeriodicityAndOffset).

Alternatively, one or more CSI report configurations may be used, configured, or determined, and an event of dynamic SCS mode may trigger a procedure, operation, or WTRU behavior for another CSI report configuration. In an example, if a WTRU is triggered with a dynamic SCS, the WTRU may hold the measurement on the CSI-RS associated with the default SCS, and the WTRU may measure only the CSI-RS associated with the dynamic SCS. In another example, if the WTRU is triggered with a dynamic SCS, the WTRU may hold the measurement on the CSI-RS associated with the default SCS, and the WTRU may measure DM-RS associated with the dynamic SCS and report CSI reports associated with the dynamic SCS. For example, the WTRU may receive a CSI report configuration and an associated CSI-RS resource set configuration with a SCS configuration (e.g., via RRC). The WTRU may receive an activation (e.g., for semi-persistent CSI with PUCCH) or a trigger (e.g., semi-persistent/aperiodic CSI with PUSCH) of the CSI report configuration. If a determined SCS is equal to the SCS configuration of the associated CSI-RS resource/resource set, the WTRU may measure the CSI-RS resource/resource set and report CSI to a gNB. If the determined SCS is not equal to the SCS configuration of the associated CSI-RS resource set, the WTRU may measure DM-RS ports and report CSI to the gNB. In this case, the WTRU may not rate match the CSI-RS resource/resource set with the different SCS.

In a solution, different CQI tables may be used based on the determined SCS. A WTRU may be configured/indicated with a first CQI table for a first SCS and a second CQI table for a second SCS (e.g., for a CSI report configuration and/or a CSI-RS resource/resource set). When the WTRU determines the first SCS, the WTRU may report CSI based on the first CQI table. When the WTRU determines the second SCS, the WTRU may report CSI based on the second CQI table.

In an embodiment, different CSI-RS resources/resource sets may be used based on the determined SCS. A WTRU may be configured/indicated with a first CSI-RS resource/resource set for a first SCS and a second resource/resource set for a second SCS (e.g., for a CSI report configuration). When the WTRU determines the first SCS, the WTRU may report CSI based on measurement of the first CSI-RS resource/resource set. When the WTRU determines the second SCS, the WTRU may report CSI based on measurement of the second CSI-RS resource/resource set.

In an embodiment, different SCSs for CSI report may be used based on a priority indication (e.g., via DCI). A WTRU may be configured/indicated with a first CSI report configuration with a first SCS for a first priority (e.g., low priority) and a second CSI report configuration with a second SCS for a second priority (e.g., high priority). When the WTRU receives an indication of the first priority (e.g., via DCI), the WTRU may report CSI based on the first CSI report configuration with the first SCS. When the WTRU receives an indication of the second priority, the WTRU may report CSI based on the second CSI report configuration with the second SCS. CSI-RS resource/resource set configuration may be used instead of CSI report configuration.

Representative Scheduling Enhancements in Time and/or Frequency Domain in Higher Frequencies The WTRU may employ at least one of the following solutions for more efficient scheduling in a bandwidth part in which very large subcarrier spacings (e.g. larger than 480 kHz) are employed.

Representative Scheduling Parameters

The WTRU may determine at least one of the following parameters for the scheduling of at least PDSCH, PUSCH or PUCCH: (i) a minimum unit for allocation in time domain (e.g., one or more symbols); (ii) a number of symbols per slot; (iii) a maximum number of slots for a single PDSCH or PUSCH (may also be referred to as a transmission time interval); (iv) a minimum unit for allocation in frequency domain (e.g. resource block group); (v) a number of sub-carriers of a resource block; (vi) a number of time symbols of a resource block; (vii) a set of resource elements for reference signals such as DM-RS, CSI-RS, SRS; (viii) a set of resource elements for the multiplexing of uplink control information in PUSCH; (ix) a unit for parameters K0 (offset between PDCCH and PDSCH), K1 (offset between PDCCH and HARQ-ACK information), K2 (offset between PDCCH and PUSCH); and (x) a frequency offset and hopping duration when frequency hopping is applied.

Representative Scheduling Parameters May be Function of Scaling Factor

At least one of the above quantities may be a function of at least one scaling factor, F. For example: (i) a minimum unit for allocation in time domain may be F symbols; (ii) a number of symbols per slot may be 14×F symbols; (iii) a maximum number of slots (or transmission time interval) for a single PDSCH or PUSCH may be F slots; (iv) a minimum unit for allocation in frequency domain may be inversely proportional to F; (v) a number of subcarriers of a resource block may be 12/F subcarriers; (vi) a number of time symbols in a resource block may be 14×F symbols; (vii) a set of symbols or resource elements in which DM-RS is mapped for PDSCH, PUSCH or PUCCH may be a function of a scaling factor for a given DM-RS mapping type (e.g., the number of symbols in such set of symbols may be proportional to F); (viii) a set of symbols or resource elements in which UCI may be multiplexed in PUSCH may be a function of a scaling factor (e.g., such set of symbols may be relative to the set of symbols used for DM-RS); and (ix) a unit for parameters K0, K1, K2 may be F slots (e.g., in case F=2 a value of K0=3 may correspond to 6 slots).

The WTRU may determine the values of at least one of the above scheduling parameters, possibly including a scaling factor, F, based on at least one of the following embodiments. A first and second scaling factors may be used for scheduling parameters in time and frequency domains, respectively.

Representative Scheduling Parameter May Depend on SCS

At least one scheduling parameter may be determined from a sub-carrier spacing (SCS) applicable to a bandwidth part or to the physical channel (PDCCH, PUSCH or PDSCH). The relationship may be pre-defined or configured by higher layers. For example, the WTRU may determine that a scaling factor, F, is 1 if SCS is 480 kHz or less, and 2 if SCS is 960 kHz or more.

Representative Scheduling Parameter May be Explicitly Signaled

At least one scheduling parameter may be explicitly signaled by RRC, MAC or DCI signaling. For example, a scaling factor may be configured as an information element of a PDSCH, PUSCH, semi-persistent schedule (SPS) or configured grant configuration, or of a bandwidth part (BWP) configuration. A scaling factor may be included in a MAC control element. A scaling factor may be indicated by a new field or existing field of a DCI scheduling PDSCH or PUSCH. For example, a scaling factor may be configured by RRC for each value of a time domain resource allocation field (TDRA), and the WTRU applies the scaling factor corresponding to the TDRA value received in DCI. In another example, a scaling factor may be indicated by a TCI field or by a PRB bundling size indicator field.

Representative Scheduling Parameter May be Implicitly Determined from PDCCH Property At least one scheduling parameter may be implicitly determined from a property of the scheduling PDCCH, such as a CORESET, a search space, a radio network temporary identifier (RNTI) used for decoding the PDCCH, an aggregation level, an index of first control channel element, or a DCI size or format.

Representative Scheduling Parameter May be Implicitly Determined from Property of Grant or Assignment At least one scheduling parameter may be implicitly determined from a property of a grant or assignment, including at least one of the following: (i) a frequency allocation; (ii) an aspect of time allocation, such as a duration; (iii) a priority; (iv) an MCS; (v) a transport block size; (vii) a number of spatial layers; (viii) a number of transport blocks; (ix) a TCI state; (x) a CSI-RS resource indicator (CRI); (xi) an SRI; (xii) a number of repetitions; (xiii) whether the repetition scheme is Type A or Type B; (xiv) whether the grant is a configured grant type 1, type 2, or a dynamic grant; (xv) whether the assignment is a dynamic assignment or a semi-persistent scheduling (configured) assignment; (xvi) a configured grant index or a semi-persistent assignment index; (xvii) a periodicity of a configured grant or assignment; (xviii) a channel access priority class (CAPC); and (xix) any parameter provided in a DCI, by MAC or by RRC for the scheduling the grant or assignment.

Representative TDRA and/or FDRA (Frequency Domain Resource Allocation) Field Interpretation May Depend on SCS A TDRA field and/or FDRA field interpretation may depend on a sub-carrier spacing (SCS) applicable to a bandwidth part or to the physical channel (PDCCH, PUSCH or PDSCH). For example, RRC may configure a first set of parameters for each value of a TDRA field when the SCS is from a first set of SCSs (e.g., SCSs equal or less than 480 kHz) and a second set of parameters for each value of a TDRA field when the SCS is from a second set of SCSs (e.g., SCSs larger than 480 kHz). In another example, the relationship between a resource indication value (RIV) and a set of scheduled resource blocks may be a function of the SCS.

Representative DCI May Indicate Multiple TDRA and/or FDRA Fields Applicable to More than One Slot The WTRU may receive, from a single DCI, at least one TDRA field and/or at least one FDRA field applicable to resource allocation in more than one slot. For example, the WTRU may receive a first TDRA (and/or FDRA) field applicable to a first slot and a second TDRA (and/or FDRA) field applicable to a second slot. A WTRU may also receive a single TDRA (and/or FDRA) field applicable to more than one slot. The WTRU may receive separate PDSCH or PUSCH from each slot, or a single PDSCH or PUSCH from resources of both slots.

Representative UE Request on Scheduling Granularity

In a solution, a WTRU may request a scheduling granularity of one or more granularities. For example, the WTRU may be configured with one or more candidate granularities for scheduling. Based on the configuration, the WTRU may measure one or more parameters (e.g., traffic (downlink, uplink, and/or sidelink), wireless channel characteristics (e.g., SINR, Doppler spread, Doppler frequency, delay spread, average delay and etc.). Based on the measurement, the WTRU may determine a scheduling granularity and request it to a gNB. The WTRU request may be based on one or more of the following:

Explicit indication

UCI in PUCCH

The WTRU may request the scheduling granularity via UCI in PUCCH. The information may be multiplexed with other uplink control information (e.g., CSI, SR and/or HARQ-ACK/NACK)

PUSCH

Implicit indication

DM-RS bundling

The WTRU may request the scheduling granularity as a DM-RS bundling granularity. For example, the WTRU may report required DM-RS bundling granularity as a CSI report (e.g., via PUCCH and/or PUSCH)

PUCCH resource

The WTRU may request the scheduling granularity by transmitting a PUCCH in a dedicated PUCCH resource for the scheduling granularity physical random access channel (PRACH) resource The WTRU may request the scheduling granularity by transmitting a PRACH in a dedicated PUCCH resource for the scheduling granularity Representative PDCCH Monitoring Capability Enhancements In an embodiment, based on multiple PDCCH monitoring capability values, a WTRU may determine a PDCCH monitoring capability value of the PDCCH monitoring capability values for one or more of the following parameters:

Maximum number of monitored PDCCH candidates with SCS (e.g., for a single serving cell)

Maximum number of non-overlapped control channel elements (CCEs) with SCS (e.g., for a single serving cell)

The monitoring capability values may be applied for one or more of the following resources:

One or more slots

One or more spans, wherein, a span may be defined as (X, Y) wherein X may indicate minimum time separation of X OFDM symbols between the start of two spans and Y may indicate Y consecutive OFDM symbols in a span In an embodiment, a WTRU may determine a PDCCH monitoring capability value of multiple PDCCH monitoring capability values based on one or more of the following:

Frequency range

For example, if monitoring CORESETs and/or search spaces are configured in a first frequency range (e.g., FR1 or FR2), the WTRU may determine a first PDCCH monitoring capability value. If the monitoring CORESETs and/or search spaces are configured in a second frequency range (e.g., frequency range 3 (FR3) or frequency range 4 (FR4)), the WTRU may determine a second PDCCH monitoring capability value Subcarrier spacing For example, if subcarrier spacing of CORESETs, search spaces and/or BWPs for PDCCH monitoring is smaller than (or equal to) a threshold, the WTRU may determine a first PDCCH monitoring capability value. If the subcarrier spacing of the CORESETs, search spaces and/or BWPs for PDCCH monitoring is larger than a threshold, the WTRU may determine a second PDCCH monitoring capability value PDCCH configuration REG bundle size (number of REGs in a REG bundle)

In an embodiment, the WTRU may determine a PDCCH monitoring capability value of multiple PDCCH monitoring capability values based on a REG bundle size of monitoring PDCCH For example, if the REG bundle size of monitoring CORESETs and/or search spaces is smaller than (or equal to) a threshold, the WTRU may determine a first PDCCH monitoring capability value. If the REG bundle size of monitoring CORESETs and/or search spaces is above the threshold, the WTRU may determine a second PDCCH monitoring capability value The REG bundle size may be a maximum value or a minimum value of one or more CORESETs and/or search spaces which are configured to the WTRU Aggregation level (number of CCEs)

In an embodiment, the WTRU may determine a PDCCH monitoring capability value of multiple PDCCH monitoring capability values based on an aggregation level of monitoring PDCCH For example, if the aggregation level of monitoring CORESETs and/or search spaces is smaller than (or equal to) a threshold, the WTRU may determine a first PDCCH monitoring capability value. If the aggregation level of the monitoring CORESETs and/or search spaces is above the threshold, the WTRU may determine a second PDCCH monitoring capability value The aggregation level may be a maximum value or a minimum value of one or more CORESETs and/or search spaces which are configured to the WTRU Number of CORESETs/search spaces In an embodiment, the WTRU may determine a PDCCH monitoring capability value of multiple PDCCH monitoring capability values based on number of CORESETs and/or search spaces In an embodiment, multiple CORESETs and/or search spaces may be used to schedule one or more of PDSCHs/PUSCHs to provide better reliability of downlink control information (DCI)

For example, if the number of CORESETs and/or search spaces of one or more scheduling PDCCHs is smaller than (or equal to) a threshold, the WTRU may determine a first PDCCH monitoring capability value. If the number of CORESETs and/or search spaces of the one or more scheduling PDCCHs is larger than the threshold, the WTRU may determine a second PDCCH monitoring capability value In an embodiment, multiple CORESETs and/or search spaces may be monitored by a WTRU if a gNB schedules one or more of PDSCHs/PUSCHs. Based on a number of monitoring CORESETs and/or search spaces, the WTRU may determine a PDCCH monitoring capability value of multiple PDCCH monitoring values For example, if the number of monitoring CORESETs and/or search spaces is smaller than (or equal to) a threshold, the WTRU may determine a first PDCCH monitoring capability value. If the number of monitoring CORESETs and/or search spaces is larger than the threshold, the WTRU may determine a second PDCCH monitoring capability value CORESET/search space location Time location In a solution, the WTRU may determine a PDCCH monitoring capability value of multiple PDCCH monitoring capability values based on one or more of time locations of CORESET/search space For example, starting symbol of the CORESET/search space in which the WTRU monitors may be used for determination. The scheduling CORESET/search space may start from nth symbol. If the starting symbol is smaller than (or equal to) a threshold, the WTRU may determine a first PDCCH monitoring capability value. If the starting symbol is larger than the threshold, the WTRU may determine a second PDCCH monitoring capability value For example, ending symbol of the CORESET/search space in which the WTRU monitors may be used for determination. If the ending symbol is smaller than (or equal to) a threshold, the WTRU may determine a first PDCCH monitoring capability value. If the ending symbol is larger than the threshold, the WTRU may determine a second PDCCH monitoring capability value Frequency location In an embodiment, the WTRU may determine a PDCCH monitoring capability value of multiple PDCCH monitoring capability values based on one or more of frequency locations of CORESET/search space of a scheduling PDCCH For example, frequency distance between center frequency and the CORESET/search space may be used. If the frequency distance is smaller than (or equal to) a threshold, the WTRU may determine a first PDCCH monitoring capability value. If the distance is larger than a threshold, the WTRU may determine a second PDCCH monitoring capability value Search space type In an embodiment, the WTRU may determine a PDCCH monitoring capability value from the set of PDCCH monitoring capability values based on search space type configuration of a scheduling PDCCH For example, if the search space type is common, the WTRU may determine a first PDCCH monitoring capability value. If the search space type is WTRU-specific, the WTRU may determine a second PDCCH monitoring capability value Determination may be based on configured DCI formats. For example, if DCI format 0_0 and/or 1_0 are configured, the WTRU may determine a first PDCCH monitoring capability value. If one or more of DCI format 0_1, 0_2, 1_1, and 1_2 are configured, the WTRU may determine a second PDCCH monitoring capability value Duration In an embodiment, the WTRU may determine a PDCCH monitoring capability value of multiple PDCCH monitoring capability values based on number of consecutive slots of a search space to be monitored For example, if the duration is smaller than (or equal to) a threshold, the WTRU may determine a first PDCCH monitoring capability value. If the duration is larger than a threshold, the WTRU may determine a second PDCCH monitoring capability value Data combining type/repetition In an embodiment, the WTRU may determine a PDCCH monitoring capability value based on data combining type (e.g., no data combining/soft combining and chase combining/incremental redundancy) of a scheduling PDCCH For example, the WTRU may support PDCCH repetition to provide more reliability for one or more of CORESETs/search spaces. If the WTRU does not support PDCCH repetition for monitoring CORESET/search space, the WTRU may determine a first PDCCH monitoring capability value. If the WTRU supports PDCCH repetition for the monitoring CORESET/search space, the WTRU may determine a second PDCCH monitoring capability value Number of configured/activated panels/TRPs/beams (e.g., TCI states)

In an embodiment, the WTRU may determine a PDCCH monitoring capability value based on one or more of the following:

Number of configured/activated WTRU panels

The WTRU may be configured with multiple WTRU panels and each of the multiple panels may have a unique panel ID. Based on the panel ID, a gNB may activate/deactivate one or more of the multiple panels.

Based on the number of configured/activated panels, the WTRU may determine a PDCCH monitoring capability value of multiple PDCCH monitoring capability values. For example, if the number of configured/activated panels is smaller than (or equal to) a threshold, the WTRU may determine a first PDCCH monitoring capability value. If the number of configured/activated panels is equal to the threshold, the WTRU may determine a second PDCCH monitoring capability value Number of configured/activated SRS resources/ resource sets for UL transmission The WTRU may be configured with multiple SRS resources/resource sets for UL transmission. Based on the SRS resources/resource sets, a gNB may activate/deactivate one or more of the multiple SRS resources/resource sets. Based on the configured/activated SRS resources/resources sets, the gNB may indicate one or more beams and/or one or more WTRU panels for UL transmission. For example, SRS resource indicator (SRI) and/or SRS resource set indicator may be provided to the WTRU via PDCCH Based on the number of configured/activated SRS resources/resource sets, the WTRU may determine a PDCCH monitoring capability value of multiple PDCCH monitoring capability values. For example, if the number of configured/activated SRS resources/resource sets is smaller than (or equal to) a threshold, the WTRU may determine a first PDCCH monitoring capability value. If the configured/activated SRS resource/resource sets is equal to the threshold, the WTRU may determine a second PDCCH monitoring capability value Number of configured/activated transmission/reception points (TRPs)

The WTRU may be configured with multiple TRPs. Based on the multiple TRPs, a gNB may activate/deactivate one or more of the multiple TRPs. Based on the configured/activated multiple TRPs, the gNB may schedule PDSCH transmission based on multiple TRPs Based on the number of configured/activated multiple TRPs, the WTRU may determine a PDCCH monitoring capability value of multiple PDCCH monitoring capability values. For example, if the number of configured/activated multiple TRPs is smaller than (or equal to) a threshold, the WTRU may determine a first PDCCH monitoring capability value. If the number of configured/activated multiple TRPs is larger than the threshold, the WTRU may determine a second PDCCH monitoring capability value Number of configured/activated TCI states Based on the number of configured/activated TCI states, the WTRU may determine a PDCCH monitoring capability value of multiple PDCCH monitoring capability values. For example, if the number of configured/activated TCI states is smaller than (or equal to) a threshold, the WTRU may determine a first PDCCH monitoring capability value. If the number of configured/activated TCI states is larger than the threshold, the WTRU may determine a second PDCCH monitoring capability value Carrier aggregation In an embodiment, the WTRU may determine a PDCCH monitoring capability value based on one or more of the following:

Number of configured/active cells

The WTRU may be provided multiple serving cells. Based on the multiple serving cells, a gNB may activate/deactivate one or more of the multiple serving cells (e.g., via MAC CE).

Based on the number of configured/activated cells, the WTRU may determine a PDCCH monitoring capability value of multiple PDCCH monitoring capability values. For example, if the number of configured/activated cells is smaller than (or equal to) a threshold, the WTRU may determine a first PDCCH monitoring capability value. If the number of configured/activated cells is larger than the threshold, the WTRU may determine a second PDCCH monitoring capability value Channel coding type of channels In an embodiment, the WTRU may determine a PDCCH monitoring capability value based on channel coding type of one or more of channels (e.g., PDCCH/PDSCH/PUCCH/PUSCH and so on)

For example, if one or more PDCCHs WTRU monitors are encoded by a first type of channel coding, the WTRU may determine a first PDCCH monitoring capability value. If the one or more PDCCHs are encoded by a second type of channel coding, the WTRU may determine a second PDCCH monitoring capability value The type of channel coding may comprise one or more of Repetition code, Simplex code, Polar code, Low-density parity-check code, Reed Muller code, Turbo code and Convolutional code Scheduling types and/or DM-RS channel estimation types In an embodiment, the WTRU may determine a PDCCH monitoring capability value based on DM-RS channel estimation type of one or more of channels (e.g., PDCCH/PDSCH/PUCCH/PUSCH and so on).

For example, if DM-RS of the one or more of channels supports a first type of DM-RS channel estimation, the WTRU may determine a first PDCCH monitoring capability value. If DM-RS of the one or more of channels supports a second type of DM-RS channel estimation, the WTRU may determine a second PDCCH monitoring capability value. DM-RS channel estimation type may comprise one or more of the following:

Indication type

For example, DM-RS channel estimation may be semi-statically configured (e.g., by RRC) or dynamically indicated (e.g., by DCI or MAC CE)

For example, if semi-static configuration is used for DM-RS channel estimation type indication, the WTRU may determine a first PDCCH monitoring capability value. If dynamic indication is used for DM-RS channel estimation type indication, the WTRU may determine a second PDCCH monitoring capability value One or more of frequency domain bundling type (i.e., PRG/PRB bundling type), frequency domain scheduling granularity (e.g., RBG size) or frequency domain resource allocation type For example, if the frequency domain scheduling granularity is smaller than (or equal to) a threshold, the WTRU may determine a first PDCCH monitoring capability value. If the frequency domain scheduling granularity is larger than or equal to the threshold, the WTRU may determine a second PDCCH monitoring capability value Time domain bundling type (e.g., slot aggregation and/or slot bundling) and/or time domain resource allocation type For example, if the number of bundled slots in the time domain is smaller than (or equal to) a threshold, the WTRU may determine a first PDCCH monitoring capability value. If the number of bundled slots in the time domain is larger than the threshold, the WTRU may determine a second PDCCH monitoring capability value Usage of one or more of PT-RS and additional DM-RS For example, one or more of additional reference signals such as PT-RS and/or additional DM-RS may be used to enhance DM-RS channel estimation performance.

For example, if the one or more of additional reference signals are not used, the WTRU may determine a first PDCCH monitoring capability value. If the one or more of additional reference signals are used, the WTRU may determine a second PDCCH monitoring capability value Waveform (e.g., transform precoding enabled or disabled)

In an embodiment, a WTRU may determine a PDCCH monitoring capability value based on the waveform used, determined, indicated, or configured for a channel or a signal. For example, if a first waveform (e.g., transform precoding enabled) is used for a channel, a WTRU may determine or use a first PDCCH monitoring capability value; if a second waveform (e.g., transform precoding disabled), the WTRU may determine or use a second PDCCH monitoring capability value.

In another embodiment, a WTRU may determine a PDCCH monitoring capability value based on the combination of waveforms (e.g., CP-OFDM, DFT-S OFDM and single carrier) used for downlink and uplink. For example, when the same waveform is used for both downlink and uplink, a first PDCCH monitoring capability value may be used or determined; when a different waveform is used for uplink and downlink, a second PDCCH monitoring capability value may be used or determined Scheduling restriction In an embodiment, a WTRU may determine a PDCCH monitoring capability value based on scheduling restriction value/level, wherein the scheduling restriction may include the restriction of maximum TBS, maximum modulation order, maximum transmission rank, maximum number of RBs scheduled, etc. Herein, the scheduling restriction may imply that a WTRU is not expected to receive or be scheduled with a scheduling parameter which is restricted For example, a first PDCCH monitoring capability value may be used for a first scheduling restriction level (e.g., use full range of scheduling parameters) and a second PDCCH monitoring capability value may be used for a second scheduling restriction level (e.g., use a subset of scheduling parameters)

HARQ-ACK Information for Multiple PDSCHs Scheduled by Single DCI

A WTRU may employ one or more of the following configurations for HARQ-ACK information transmission when multiple PDSCH transmissions are scheduled by a single DCI. For example, eight PDSCHs are scheduled by a single DCI in the example shown in FIG. 14. Each scheduled PDSCH may occupy resources of a single slot, multiple slots, or a set of sub-slots in time.

Figures 14, 15, 16:
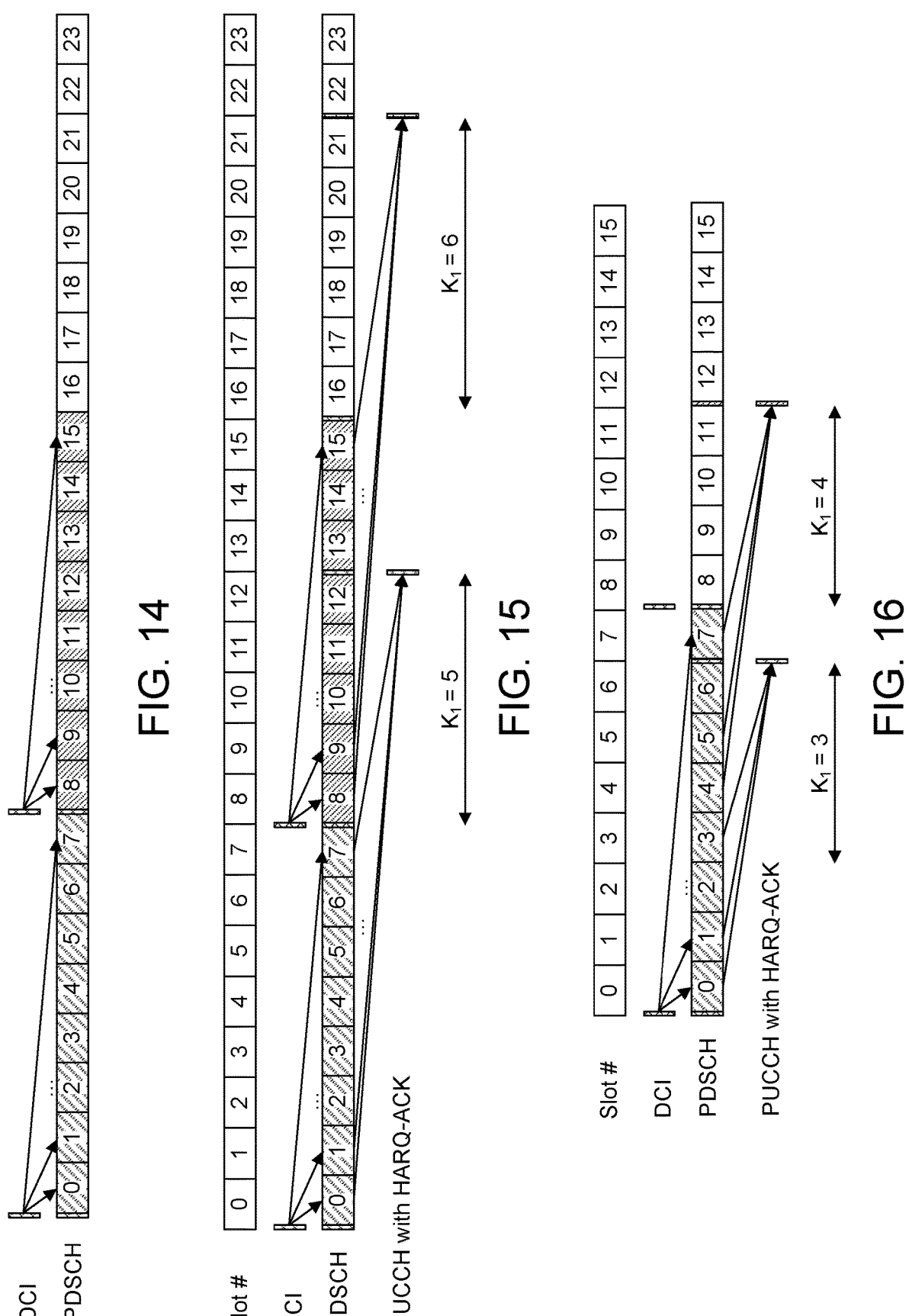
FIG. 14 is a diagram illustrating eight physical downlink shared channel (PDSCH) transmissions scheduled by a single downlink control information (DCI)
FIG. 15 is diagram illustrating a single physical uplink control channel (PUCCH) transmission with HARQ-ACK information for multiple PDSCH transmissions configured by a single DCI.
FIG. 16 is a is diagram illustrating a plurality of PUCCH transmissions with HARQ-ACK information for multiple PDSCH transmissions configured by a single DCI.

For transmitting HARQ-ACK information corresponding to the multiple PDSCHs scheduled by a single DCI, a WTRU may follow one of the following options:

A single PUCCH transmission with HARQ-ACK information, as illustrated by FIG. 15

Multiple PUCCH transmissions with HARQ-ACK information as illustrated by FIG. 16

A WTRU may be semi-statically configured to transmit HARQ-ACK information of multiple PDSCHs in a single or multiple PUCCH occasion. Alternatively, a WTRU may be configured to dynamically determine to use one of the two options.

Representative Dynamic Determination of PUCCH Transmission for HARQ-ACK Information With respect to dynamically determining single PUCCH/multiple PUCCH transmission for HARQ-ACK information, in an embodiment, a WTRU may determine to use, and/or use, either a single PUCCH transmission or multiple PUCCH transmissions for HARQ-ACK information of multiple PDSCH transmissions based on an explicit indication receive via signaling, such as, e.g., any of L1, L2, L3 and other layer signaling, including one or more of RRC, DCI, and MAC-CE signaling.

In another solution, a WTRU may determine single or multi PUCCH transmission with HARQ-ACK information based on implicit indication by one more of the following:

DCI indicates multiple slot timing values for PUCCH transmission with HARQ-ACK information ($K_1$ values) and/or PUCCH resource indication fields. In this case, having multiple $K_1$ values or PUCCH resource indication fields may be interpreted as indication for having multiple PUCCH transmissions with HARQ-ACK information. The number of $K_1$ values and/or PUCCH resource indication fields may be used to indicate the number of PUCCH transmissions with HARQ-ACK information Comparing $K_1$ values against pre-configured/dynamically indicated thresholds. For example, when M PDSCHs are scheduled by a single DCI, a WTRU may compare indicated $K_1$ against M or a threshold $K_T$. If $K_1 \geq M$ and/or $K_1 \geq K_T$, the WTRU determines that multiple PUCCH transmissions for HARQ-ACK information is configured. Otherwise, the WTRU determines that single PUCCH transmission for HARQ-ACK information is configured.

$K_T$ may be based on one or more of a predefined value, a configured value (e.g., via RRC), and an indicated value (e.g., via DCI and/or MAC CE).

For example, M may be used to determine the threshold for multiple PUCCH occasions. For example, the threshold may be determined as a function of M (e.g., $K_T = M/2$).

Based on the DCI format

For example, if the WTRU receives a DCI with a first DCI format, the WTRU may determine to use a first mode (e.g., single PUCCH transmission). If the WTRU receives a DCI with a second DCI format, the WTRU may determine to use a second mode (e.g., multi PUCCH transmission)

Based on a RNTI

For example, if the WTRU receives a DCI scrambled with a first RNTI, the WTRU may determine to use a first mode (e.g., single PUCCH transmission). If the WTRU receives a DCI scrambled with a second RNTI, the WTRU may determine to use a second mode (e.g., multi PUCCH transmission)

The number of slot offsets ($K_0$ values)

Based on TDRA field

For example, if the WTRU receives a DCI scheduling based on a first TDRA table (e.g., TDRA table for a single slot scheduling), the WTRU may determine to use a first mode (e.g., single PUCCH transmission). If the WTRU receives a DCI scrambled with a second TDRA table (e.g., TDRA table for multi slot scheduling), the WTRU may determine to use a second mode (e.g., multi PUCCH transmission)

Based on indicated single slot offset value $K_0$. For example, when a DCI schedule M PDSCHs and configure a $K_0$ value (>M), the WTRU may dynamically determine to transmit HARQ-ACK information in multiple PUCCHs.

DCI indicates multiple slot timing values for multi PDSCH reception ($K_0$ values). In this case, having multiple $K_0$ values may be interpreted as an indication of having multiple PUCCH transmissions with HARQ-ACK information. The number of $K_0$ values could be used to indicate the number of PUCCH transmissions with HARQ-ACK information.

Based on the time domain bundling size of HARQ-ACK feedback. The bundling size may be RRC configured or indicated by MAC CE and/or DCI. For example, a WTRU may determine to have two PUCCH transmissions with HARQ-ACK information when eight PDSCHs are scheduled by a single DCI and the WTRU indicated/configured time domain HARQ-ACK feedback bundling size is 4.

Based on the subcarrier spacing

For example, if the WTRU receives a DCI with a first subcarrier spacing (e.g., 120 kHz), the WTRU may determine to use a first mode (e.g., single PUCCH transmission). If the WTRU receives a DCI with a second subcarrier spacing (e.g., 480 kHz and/or 960 kHz), the WTRU may determine to use a second mode (e.g., multi PUCCH transmission)

Based on the number of PDSCHs scheduled by a single DCI and/or based on the configured maximum number of PDSCHs that can be scheduled by a single DCI.

Representative Determining HARQ-ACK Information of how Many PDSCHs and Which PDSCHs Each PUCCH should Include With respect to determining the HARQ-ACK information of how many PDSCHs and which PDSCHs each PUCCH should include, in a first embodiment, a WTRU may determine the HARQ-ACK information of how many PDSCHs and which PDSCHs each PUCCH should include based on explicit indication from one or more of DCI, MAC CE, and RRC signaling. For example, a WTRU may make the determination based on bitmaps indicated by one or more of DCI, MAC CE, and RRC signaling. In another example, a WTRU may make the determination based on a set of possible assignment patterns configured by RRC signaling and dynamically indicated by MAC CE and/or DCI.

In another embodiment, a WTRU may determine the HARQ-ACK information of how many PDSCHs and which PDSCHs each PUCCH should include based on an implicit indication.

In one such implicit indication embodiment, a WTRU may determine the HARQ-ACK information of how many PDSCHs and which PDSCHs each PUCCH should include based on the number of PDSCHs scheduled and how many PUCCHs occasions are configured. For example, if a WTRU determines that N PUCCHs are configured to transmit with HARQ-ACK information of M PDSCHs (indexed {0, 1, . . . , M−1}, M≥N), and if M is divisible by N, PDSCHs could be evenly distributed among N PUCCHs. That is, the HARQ-ACK information of PDSCHs $$\left\{0, 1, \ldots, \frac{M}{N} - 1\right\}$$

are included in the PUCCH scheduled to transmit first, and HARQ-ACK information of $$\left\{\frac{M}{N}, \frac{M}{N} + 1, \ldots, \frac{2M}{N} - 1\right\} PDSCHs$$

are included in the PUCCH scheduled to be transmitted subsequently. This assignment may continue until all M PDSCHs are completed.

In another example, if M is not divisible by N, each of the first N−1 PUCCH transmissions may provide HARQ-ACK information of equal number of PDSCHs while the last PUCCH may provide HARQ-ACK information of the remaining PDSCHs. For example the first N−1 PUCCH may provide HARQ-ACK information of $$\left\{0, 1, \ldots, \left\lceil\frac{M}{N}\right\rceil - 1\right\}, \left\{\left\lceil\frac{M}{N}\right\rceil, \left\lceil\frac{M}{N}\right\rceil + 1, \ldots, 2\left\lceil\frac{M}{N}\right\rceil - 1\right\},$$
$$\ldots, \left\{(k-1)\left\lceil\frac{M}{N}\right\rceil, (k-1)\left\lceil\frac{M}{N}\right\rceil + 1, \ldots, k\left\lceil\frac{M}{N}\right\rceil - 1\right\},$$
$$\ldots \left\{(N-2)\left\lceil\frac{M}{N}\right\rceil, (N-2)\left\lceil\frac{M}{N}\right\rceil + 1, \ldots, (N-1)\left\lceil\frac{M}{N}\right\rceil - 1\right\},$$
$$k \in \{1, 2, \ldots, N-1\} PDSCHs.$$

Here, $\lceil . \rceil$ is the ceiling function. The Nth PUCCH may include the HARQ-ACK information of the remaining PDSCHs.

In another example, if M is not divisible by N, each of the last N−1 PUCCH transmissions may provide HARQ-ACK information of equal number of PDSCHs while the first PUCCH may provide HARQ-ACK information of the remaining PDSCHs. For example, the first PUCCH transmission may provide HARQ-ACK information of $$\left\{0, 1, , , , , M - (N-1)\left\lceil\frac{M}{N}\right\rceil - 1\right\}$$

PDSCHs. The remaining PDSCHs, i.e., $$\left\{M - (N-1)\left\lceil\frac{M}{N}\right\rceil, M - (N-1)\left\lceil\frac{M}{N}\right\rceil + 1, \ldots, M - 1\right\}$$

are evenly distributed among the last N−1 PUCCH transmissions.

In another implicit indication embodiment, a WTRU may determine HARQ-ACK information of which PDSCHs each PUCCH transmission should be included based on the number of PDSCHs configured by slot/sub-slot offset values ($K_0$ values) when multiple values are indicated. For example, when the number of PDSCHs scheduled is eight, number of PUCCHs configured is two, and two $K_0$ values, 0 and 4, are indicated, the WTRU determines that all PDSCHs transmitted from slot/mini-slot 0 to 3 are assigned to the first PUCCH scheduled and the remaining PDSCHs are assigned the second PUCCH scheduled.

In another implicit indication embodiment, a WTRU may determine PDSCHs assignment to each PUCCH based on the format of PUCCHs scheduled for HARQ-ACK information and the time-frequency resource configured for each PUCCH.

Representative Determining the Number of PUCCH Occasions for the PDSCHs Scheduled by the Same DCI With respect to determining the number of PUCCH occasions for the PDSCHs scheduled by the same DCI, in a first embodiment, a WTRU may determine the number of PUCCH occasions for HARQ-ACK information based on explicit indication by DCI and/or RRC and/or MAC-CE.

In another embodiment, a WTRU may select either RRC configured or fixed set of values based on DCI or MAC-CE signaling.

In another embodiment, a WTRU may determine how many PUCCH occasions are assigned for the HARQ-ACK information transmission based on the number of $K_1$ values indicated.

In another embodiment, a WTRU may determine the number of PUCCH occasions based on the subcarrier spacing. For example, when a WTRU is configured with SCS of 960 kHz, the WTRU may determine that it is configured with two PUCCH occasions for HARQ-ACK information.

In another embodiment, a WTRU may determine the number of PUCCH occasions for the HARQ-ACK information transmission based on the number of PDSCHs scheduled by a single DCI. For example, based on the number of PDSCHs scheduled by a single DCI, the WTRU may select the number of PUCCH occasions from an RRC configured or a fixed set of values.

In another embodiment, a WTRU may determine how may PUCCH occasions based on the number of $K_0$ values indicated.

Representative Determining Multiple $K_1$ Values for Multiple HARQ-ACK Feedbacks when Multiple PDSCHs are Configured by a Single DCI With respect to determining multiple $K_1$ values for multiple HARQ-ACK feedbacks when multiple PDSCHs are configured by a single DCI, in a first embodiment, a WTRU may determine multiple $K_1$ values based on a RRC configured or fixed set of series of values. The series chosen could be selected based on one or more of the following parameters:

DCI signaling (e.g., explicit indication of multiple $K_1$ values)

the number of PUCCHs configured (e.g., via RRC) and/or indicated (e.g., via DCI)

the number of PDSCHs configured (e.g., via RRC) and/or indicated (e.g., via DCI)

the number of $K_0$ values configured subcarrier spacing

MAC-CE indication (e.g., explicit indication of multiple $K_1$ values)

For example, a WTRU may determine a set of $K_1$ values based on DCI indication similar to Rel-16 HARQ-ACK timing indication. For example, to define the relationship between timing indicator value indicated by DCI and the number of slots/sub-slots, the table defined in Rel-16 specifications could be extended to indicated multiple $K_1$ values for each entry, such as illustrated in Table 1 below showing mapping of PDSCHs-to-HARQ_feedback timing indicator field values to number of slots/sub-slots. Based on the number of PUCCHs for HARQ-ACK information, multiple $K_1$ values be determined based on the timing indicator value.

TABLE 1

| PDSCH-to-HARQ_feedback timing indicator | | | Set of $K_1$ values in number of slots/sub-slots |
|---|---|---|---|
| 1 bit | 2 bits | 3 bits | $(K_1^{(1)}, K_1^{(2)}, \ldots, K_1^{(N)})$ |
| '0' | '00' | '000' | 1st set of values for $(K_1^{(1)}, K_1^{(2)}, \ldots, K_1^{(N)})$ RRC configured |
| '1' | '01' | '001' | 2nd set of values for $(K_1^{(1)}, K_1^{(2)}, \ldots, K_1^{(N)})$ RRC configured |
| | '10' | '010' | 3rd set of values for $(K_1^{(1)}, K_1^{(2)}, \ldots, K_1^{(N)})$ RRC configured |
| | '11' | '011' | 4th set of values for $(K_1^{(1)}, K_1^{(2)}, \ldots, K_1^{(N)})$ RRC configured |
| | | '100' | 5th set of values for $(K_1^{(1)}, K_1^{(2)}, \ldots, K_1^{(N)})$ RRC configured |
| | | '101' | 6th set of values for $(K_1^{(1)}, K_1^{(2)}, \ldots, K_1^{(N)})$ RRC configured |
| | | 110' | 7th set of values for $(K_1^{(1)}, K_1^{(2)}, \ldots, K_1^{(N)})$ RRC configured |
| | | '111' | 8th set of values for $(K_1^{(1)}, K_1^{(2)}, \ldots, K_1^{(N)})$ RRC configured |

In another embodiment, a WTRU may determine multiple $K_1$ values based on a combination of the existing HARQ-ACK timing indicator functionality and a set of relative time offset values. The relative time offsets may be semi-statically configured based on configured PUCCH resources and/or DCI indication and/or MAC-CE signaling. For example, the WTRU may receive a first $K_1$ value based on a scheduling DCI and a second $K_1$ value (e.g., relative offset) based on a PUCCH resource configuration. Based on the first $K_1$ value and the second $K_1$ value, the WTRU may determine the actual PUCCH resource location (e.g., the first $K_1$+the second $K_1$). The second $K_1$ value for a first PUCCH resource may not exist or may be equal to 0 (i.e., no relative offset).

Representative Determining PUCCH Resources for Multiple HARQ-ACK Feedbacks

With respect to determining PUCCH resources for multiple HARQ-ACK feedbacks, in an embodiment, a WTRU may determine PUCCH resources for multiple PUCCH occasions by using multiple PUCCH resource indicator values indicated by DCI.

In another embodiment, a WTRU may determine PUCCH resources for multiple PUCCH occasions using the Rel-16 configuration, i.e., using one PUCCH resource for all the PUCCH occasions.

In yet another embodiment, a WTRU may determine PUCCH resource for multiple PUCCH occasions by extending the Rel-16 configuration by adding multiple PUCCH resources for each entry on PUCCH resource indicator, such as illustrated in Table 2 below showing mapping of PUCCH resource indication field values to PUCCH resource sets.

TABLE 2

| PUCCH resource indicator | PUCCH resource |
|---|---|
| '000' | 1$^{st}$ set of PUCCH resource {1st PUCCH resource, 2$^{nd}$ PUCCH resource, . . . , Nth PUCCH resource} configured by RRC |
| '001' | 2$^{nd}$ set of PUCCH resource {1st PUCCH resource, 2$^{nd}$ PUCCH resource, . . . , Nth PUCCH resource} configured by RRC |
| '010' | 3$^{rd}$ set of PUCCH resource {1st PUCCH resource, 2$^{nd}$ PUCCH resource, . . . , Nth PUCCH resource} configured by RRC |
| '011' | 4$^{th}$ set of PUCCH resource {1st PUCCH resource, 2$^{nd}$ PUCCH resource, . . . , Nth PUCCH resource} configured by RRC |
| '100' | 5$^{th}$ set of PUCCH resource {1st PUCCH resource, 2$^{nd}$ PUCCH resource, . . . , Nth PUCCH resource} configured by RRC |
| '101' | 6$^{th}$ set of PUCCH resource {1st PUCCH resource, 2$^{nd}$ PUCCH resource, . . . , Nth PUCCH resource} configured by RRC |
| '110' | 7$^{th}$ set of PUCCH resource {1st PUCCH resource, 2$^{nd}$ PUCCH resource, . . . , Nth PUCCH resource} configured by RRC |
| '111' | 8$^{th}$ set of PUCCH resource {1st PUCCH resource, 2$^{nd}$ PUCCH resource, . . . , Nth PUCCH resource} configured by RRC |

In another embodiment, a WTRU may determine PUCCH resources for a sub-set of PUCCH occasions based on a semi-statically or independently configured set of PUCCH resources; and PUCCH resource for the remaining sub-set of PUCCH occasions are determined based on dynamically indicated PUCCH resource indicator values. For example, for a WTRU configured with two PUCCH occasions, the first PUCCH resource of the first PUCCH occasion may be semi-statically or independently configured and the second PUCCH resource may be dynamically indicated by PUCCH resource indicator.

In a first example, the first PUCCH occasion may be for a first set of the multiple PDSCHs and the second PUCCH occasion may be for a second set of the multiple PDSCHs.

In another example, first PUCCH occasion may be for a set of the multiple PDSCHs and the second PUCCH occasion may be for all of the remaining PDSCHs.

For example, the first PUCCH occasion may be for all of the multiple PDSCHs and the second PUCCH occasion may be for a subset of the multiple PDSCHs.

In another embodiment, a WTRU may determine PUCCH resources for multiple PUCCH occasions based on explicit configuration by RRC signaling. For example, each PUCCH occasion may be configured with a PUCCH resource for transmission.

Representative Multiplexing HARQ-ACK Information of Multiple PDSCHs Scheduled by a Single DCI With respect to multiplexing HARQ-ACK information of multiple PDSCHs scheduled by a single DCI, in one embodiment, a WTRU may multiplex HARQ-ACK information of multiple PDSCHs independently in each PUCCH occasion. The WTRU may multiplex HARQ-ACK information of a first set of PDSCHs of the multiple PDSCHs in a first PUCCH occasion and HARQ-ACK information of a second set of PDSCHs of the multiple PDSCHs in a second PUCCH occasion. For example, HARQ-ACK information of 4 PDSCHs schedule by two HARQ-ACK occasions may be multiplexed as:

1$^{st}$ PUCCH occasion: HARQ-ACK of 1$^{st}$ PDSCH, HARQ-ACK of 2$^{nd}$ PDSCH

2$^{nd}$ PUCCH occasion: HARQ-ACK of 3$^{rd}$ PDSCH, HARQ-ACK of 4$^{th}$ PDSCH.

In another embodiment, a WTRU may multiplex HARQ-ACK information of multiple PDSCHs by duplicating HARQ-ACK information of different PDSCHs across PUCCH occasions. The WTRU may multiplex HARQ-ACK information of a set of PDSCHs of the multiple PDSCHs in a first PUCCH occasion and HARQ-ACK information of all of the multiple PDSCHs in a second PUCCH occasion. For example, HARQ-ACK information of four PDSCHs schedule by two HARQ-ACK occasions may be multiplexed as:

first PUCCH occasion: HARQ-ACK information of 1$^{st}$ PDSCH, HARQ-ACK information of 2$^{nd}$ PDSCH second PUCCH occasion: HARQ-ACK information of first PDSCH, HARQ-ACK information of second PDSCH, HARQ-ACK information of third PDSCH, HARQ-ACK information of fourth PDSCH In another embodiment, a WTRU may use independent ACK/NACKs, e.g.:

first PUCCH occasion: first PDSCH, second PDSCH, second PUCCH occasion: third PDSCH, fourth PDSCH In yet another embodiment, a WTRU may use duplicated ACK/NACKs, e.g.:

first PUCCH occasion: first PDSCH, second PDSCH,

Second PUCCH occasion: first PDSCH . . . fourth PDSCH the first PUCCH resource of the first PUCCH occasion may be semi-statically/independently configured and the second PUCCH resource may be dynamically indicated by the PUCCH resource indicator.

Representative Multiple Level Control Information Transmission Monitoring

Herein, control information, a transmission including control information, and/or a control information transmission may be interchangeably used with PDCCH information, a transmission including PDCCH information, a PDCCH transmission and/or the like, but still consistent with this disclosure. Herein, control information, PDCCH information, a transmission including control information, a transmission including PDCCH information, a control information transmission, a PDCCH transmission and/or the like may be interchangeably used with DCI, a transmission including DCI, a DCI transmission and/or the like, but still consistent with this disclosure.

Herein, level 1 PDCCH information and/or a level 1 PDCCH transmission may be interchangeably used with a MAC CE and/or a transmission including a MAC CE, but still consistent with this disclosure.

Herein, a blind decoding (BD) configuration set, a transmission including a BD configuration set, a BD configuration set transmission and/or the like may be interchangeably used with BD information, a transmission including BD information, a BD information transmission and/or the like, but still consistent with this disclosure. Herein, a BD configuration set, BD information, a transmission including a BD configuration set, a BD transmission, a transmission including BD information, a BD information transmission and/or the like may be interchangeably used with CORESET and search space, a transmission including CORESET and search space and/or the like, but still consistent with this disclosure.

Multi-slot PDCCH transmission monitoring ("multi-slot PDCCH Tx monitoring"), where a WTRU may monitor (e.g., receive and/or attempt to decode) one or more PDCCH transmissions for/during a number, X ($>$1), slots (or other time interval), may be carried out on a regular basis, e.g., in higher frequency communications in view of the slots having short durations due to use of larger SCS. For multi-slot PDCCH Tx monitoring, any of the following methods may be used:

A WTRU may use slot groups (e.g., a fixed pattern of slot groups) as a baseline to define the new capability, where, e.g.: each slot group may include X slots; the slot groups may be consecutive and/or non-overlapping; and/or the capability may indicate a BD and/or a CCE budget (e.g., a maximum number of BDs/CCEs) within a number, Y, of consecutive symbols and/or slots in each slot group separately.

A WTRU may use an (X, Y) span as a baseline to define the new capability, where, e.g.: X may be the minimum time separation between the start of two consecutive spans; the capability may indicate the BD/CCE budget (e.g., a maximum number of BDs/CCEs) within a span of at most Y consecutive symbols or slots; and/or Y<=X A WTRU may use a sliding window of a number of (e.g., X) slots as a baseline to define the new capability, where, e.g.: the capability may indicate the BD/CCE budget (e.g., a maximum number of BDs/CCEs) within the sliding window; and/or the sliding unit of the sliding window may be 1 slot.

For multi-slot PDCCH monitoring, monitoring (e.g., receiving and/or attempting to decode) one or more PDCCH transmissions at multiple levels ("multi-level PDCCH Tx monitoring") may be supported and/or carried out. Multi-level PDCCH Tx monitoring may be suitable, and desirable, for flexible scheduling, for example. Multi-level PDCCH Tx monitoring may be carried out, e.g., to overcome/minimize/attend to loss of scheduling and resource allocation flexibility due to the multi-slot PDCCH Tx monitoring.

Figure 17:
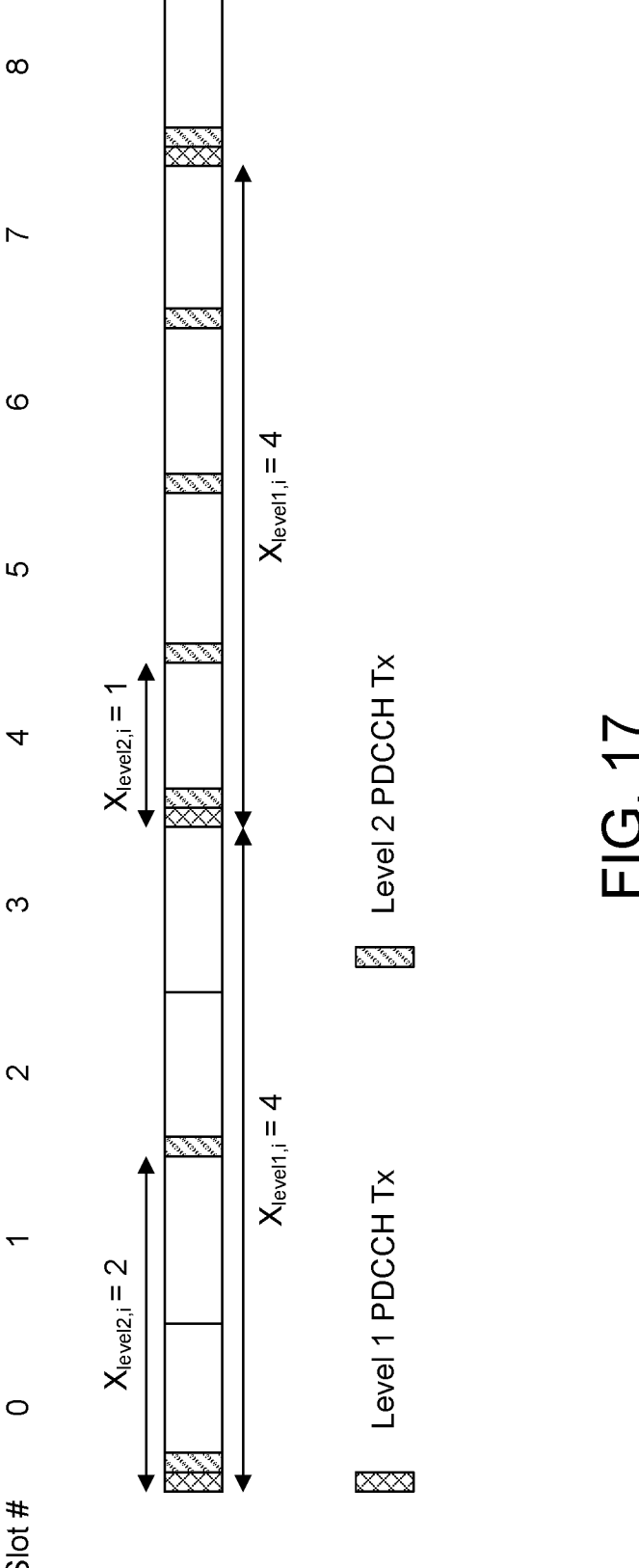
FIG. 17 is a is diagram illustrating an example a multi-level control-information transmission monitoring.

FIG. 17 is a diagram illustrating an example of multi-level PDCCH Tx monitoring. As shown in FIG. 17, the multi-level PDCCH Tx monitoring may include two levels of monitoring, namely, a first level of the multi-slot PDCCH Tx monitoring with a first slot granularity ("level 1 PDCCH Tx monitoring") and a second level of the multi-slot PDCCH Tx monitoring with a second slot granularity ("level 2 PDCCH Tx monitoring"). Both of the level 1 PDCCH Tx monitoring and the level 2 PDCCH Tx monitoring may have respective granularities of X (>1) slots. As shown, the slots in which the level 1 PDCCH Tx monitoring is carried out may be less frequent than the slots in which level 2 PDCCH Tx monitoring carried out. For example, the level 1 PDCCH Tx monitoring may have a granularity of 4 slots (X=4), and the level 2 PDCCH Tx monitoring may have respective granularity of 2 slots (X=2) at a first interval/time period, and a granularity of 1 slot (X=1) at a second interval/time period A level 1 DCI may be a group DCI or a WTRU specific DCI. Performing a level 2 PDCCH Tx monitoring may include monitoring one or more PDCCH transmissions within X slots. Based on a blindly detected level 2 DCI, the WTRU may transmit one or more transmissions (e.g., one or more uplink transmissions, such as one or more scheduled PUSCH transmissions) and/or receive one or more transmissions (e.g., one or more downlink transmission, such as one or more one or more scheduled PDSCH transmissions.

Separate capabilities of a WTRU ("WTRU capabilities") may be defined and/or reported by the WTRU for the level 1 PDCCH Tx monitoring and the level 2 PDCCH Tx monitoring. The WTRU capabilities for the level 1 PDCCH Tx monitoring and/or the level 2 PDCCH Tx monitoring may include one or more of (i) a maximum number of monitored PDCCH transmissions candidates per X slots, (ii) a maximum number of monitored PDCCH transmissions candidates in a span for combination (X, Y), (iii) a maximum number of CCEs (e.g., non-overlapped CCEs) per X slots, and (iv) a maximum number of CCEs (e.g., non-overlapped CCEs) in a span. Table ("WTRU capability table") 3 below lists, for each of a plurality of SCSs, μ, information indicating a maximum number of PDCCH candidates to be monitored for per X slots for the level 1 PDCCH Tx monitoring. WTRU capability table 4 below lists for each of a plurality of SCSs, μ, information indicating a maximum number of PDCCH candidates to be monitored for per X slots for the level 2 PDCCH Tx monitoring. WTRU capability table 5 lists, for each of a plurality of SCSs, μ, information indicating a maximum number of PDCCH candidates to be monitored for in a span for the level 1 PDCCH Tx monitoring. WTRU capability table 6 lists, for each of a plurality of SCSs, μ, information indicating a maximum number of PDCCH candidates to be monitored for in a span for the level 2 PDCCH Tx monitoring.

TABLE 3

Maximum number of monitored PDCCH candidates per X slots for a DL BWP for a single serving cell for a level 1 PDCCH

| μ | Maximum number of monitored PDCCH candidates per X slots for level 1 PDCCH |
|---|---|
| 0 | a |
| 1 | b |
| 2 | c |
| 3 | d |
| 5 | e |
| 6 | f |

TABLE 4

Maximum number of monitored PDCCH candidates per X slots for a DL BWP for a single serving cell for a level 2 PDCCH

| μ | Maximum number of monitored PDCCH candidates per X slots for level 2 PDCCH |
|---|---|
| 0 | g |
| 1 | h |
| 2 | i |
| 3 | j |
| 5 | k |
| 6 | l |

TABLE 5

Maximum number of monitored PDCCH candidates in a span for combination (X, Y) for a DL BWP for a single serving cell for level 1 PDCCH

| μ | Maximum number $M_{PDCCH}^{max, (X, Y), \mu}$ of monitored PDCCH candidates per span for a combination (X, Y) and per serving cell | | |
|---|---|---|---|
| | (2, 2) | (4, 3) | (7, 3) |
| 0 | a | b | c |
| 1 | d | e | f |
| 2 | g | h | i |
| 3 | j | k | l |
| 5 | m | n | o |
| 6 | p | q | r |

TABLE 6

| Maximum number of monitored PDCCH candidates in a span for a combination (X, Y) for a DL BWP for a single serving cell for level 2 PDCCH | | | |
|---|---|---|---|
| Maximum number $M_{PDCCH}^{max, (X, Y), \mu}$ of monitored PDCCH candidates per span for a combination (X, Y) and per serving cell | | | |
| $\mu$ | (2, 2) | (4, 3) | (7, 3) |
| 0 | s | t | u |
| 1 | v | w | x |
| 2 | y | z | aa |
| 3 | bb | cc | dd |
| 5 | ee | ff | gg |
| 6 | hh | ii | jj |

In an embodiment, a WTRU may monitor for one or more level 1 PDCCH transmissions (which may be referred to herein as performing level 1 PDCCH Tx monitoring), e.g., if the WTRU receives any of the following information/configurations in a configuration (e.g., information indicating a configuration) of a CORESET/search space:

CORESET/search space type

For example, the WTRU may receive a configuration (e.g., information indicating a configuration) of CORESET/search space with a CORESET/search space type. Based on the CORESET/search space type, the WTRU may determine to, and/or may, monitor for one or more level 1 PDCCH transmissions. The WTRU may determine to, and/or may, monitor for one or more level 1 PDCCH transmissions based on the information/configuration.

DCI format

For example, the WTRU may receive a configuration of (e.g., information indicating) one or more DCI formats for level 1 PDCCH. Based on the DCI formats, the WTRU may determine to, and/or may, monitor for one or more level 1 PDCCH transmissions. The WTRU may determine to, and/or may, monitor for one or more level 1 PDCCH transmissions based on the information/configuration.

RNTI

For example, the WTRU may receive a configuration of one or more RNTIs to scramble level 1 PDCCH. Based on the configured RNTI, the WTRU may determine to, and/or may, monitor for one or more level 1 PDCCH transmissions. The WTRU may determine to, and/or may, monitor for one or more level 1 PDCCH transmissions based on the information/configuration.

Monitoring periodicity/offset

For example, the WTRU may receive a configuration (e.g., information indicating a configuration) of a monitoring periodicity and/or an offset (e.g., periodicity and/or offset of a search space). Based on the information/configuration, the WTRU may determine to, and/or may, perform level 1 PDCCH Tx monitoring. For example, if the periodicity/offset satisfies (e.g., is greater) than a threshold, the WTRU may determine to, and/or may, monitor for one or more level 1 PDCCH transmissions. If the periodicity/offset fails to satisfy (e.g., is less than or equal to) the threshold, the WTRU may determine to, and/or may, monitor for one or more level 2 PDCCH transmissions.

The monitoring periodicity/offset of, and/or for use with performing, the level 1 PDCCH Tx monitoring may be based on a monitoring periodicity/offset (e.g., a configured monitoring periodicity/offset) of a configuration of, and/or for performing, an associated level 2 PDCCH Tx monitoring. For example, a scaling factor (e.g., multiplying N to periodicity and/or offset of, and/or for use with performing, a level 2 PDCCH Tx monitoring and/or a difference (e.g., M slots) may be configured and/or used. Based on the scaling factor and/or the difference, the WTRU may determine the actual monitoring periodicity/offset of, and/or for use with performing, the level 1 PDCCH Tx monitoring. For example, if the configured periodicity is K slots and offset is L slots for, and/or for use with performing, the level 1 PDCCH Tx monitoring, the actual monitoring periodicity and offset of, and/or for use with performing, the level 1 PDCCH Tx monitoring may be K*N and L+M.

Aggregation level (number of CCEs in a PDCCH)/REG bundle size

For example, the WTRU may receive a configuration (e.g., information indicating a configuration) of aggregation level (number of CCEs in a PDCCH) and/or REG bundle size. Based on the information/configuration, the WTRU may determine to, and/or may, perform a level 1 PDCCH Tx monitoring. For example, if the configured aggregation level/REG bundle size is larger than a threshold, the WTRU may determine to, and may, perform a level 1 PDCCH Tx monitoring. If the configured aggregation level/REG bundle size is smaller than (or equal to) the threshold, the WTRU may determine to, and/or may, perform a level 2 PDCCH Tx monitoring.

The aggregation level/REG bundle size of, and/or for use with performing, the level 1 PDCCH Tx monitoring may be based on a configured aggregation level/REG bundle size of an associated configuration of, and/or for use with performing, a level 2 PDCCH Tx monitoring. For example, a scaling factor (e.g., multiplying A to aggregation level and/or REG bundle size of, and/or for use with performing, a level 2 PDCCH Tx monitoring) and/or a difference (e.g., B slots) may be configured. Based on the scaling factor and/or the difference, the WTRU may determine an aggregation level/REG bundle size of, and/or for use with performing, a level 1 PDCCH Tx monitoring.

Associated CORESET IDs/search space IDs for monitoring for level 2 PDCCH transmissions For example, the WTRU may receive a configuration (e.g., information indicating a configuration) of associated CORESET IDs/search space IDs for monitoring for level 2 PDCCH transmissions. Based on the information/configuration, the WTRU may determine to, and/or may, monitor for one or more level 1 PDCCH transmissions. The WTRU may determine to, and may, monitor for one or more level 1 PDCCH transmissions based on the information/configuration.

Otherwise, the WTRU may monitor for one or more level 2 PDCCH transmissions based on the information/configuration of the CORESET/search space.

In an embodiment, a WTRU may monitor for one or more level 2 PDCCH transmission if the WTRU receives any of the following information/configurations in a configuration (e.g., information indicating a configuration) of a CORE-SET/search space:

Monitoring periodicity/offset

For example, the WTRU may receive a configuration (e.g., information indicating a configuration) of monitoring periodicity/offset (e.g., periodicity and/or offset of a search space). Based on the information/configuration, the WTRU may determine to, and/or may, perform a level 2 PDCCH Tx monitoring. For example, if the configured periodicity/offset satisfies (e.g., is smaller than or equal to) a threshold, the WTRU may determine to, and/or may, monitor for one or more level 2 PDCCH transmissions. If the configured periodicity/offset fails to satisfy (e.g., is larger than) the threshold, the WTRU may determine to, and/or may, monitor for one or more level 2 PDCCH transmissions.

The monitoring periodicity/offset of, and/or for use with performing, a level 2 PDCCH Tx monitoring may be based on a (e.g., a configured monitoring periodicity/offset) of a configuration of, and/or for performing, an associated level 1 PDCCH Tx monitoring. For example, a scaling factor (e.g., multiplying N to periodicity and/or offset of, and/or for use with performing, a level 1 PDCCH Tx monitoring) and/or a difference (e.g., M slots) may be configured. Based on the scaling factor and/or the difference, the WTRU may determine the actual monitoring periodicity/offset of, and/or for use with performing, a level 2 PDCCH Tx monitoring. For example, if the configured periodicity is K slots and offset is L slots for performing, a level 1 PDCCH Tx monitoring, the actual monitoring periodicity and offset of, and/or for use with performing, a level 2 PDCCH Tx monitoring may be K*N and L+M.

Aggregation level (number of CCEs in a PDCCH)/REG bundle size

For example, the WTRU may receive a configuration (e.g., information indicating a configuration) of aggregation level (i.e., number of CCEs in a PDCCH) and/or REG bundle size. Based on the information/configuration, the WTRU may determine to, and/or may, monitor for one or more level 2 PDCCH transmissions. For example, if the configured aggregation level/REG bundle size satisfies (e.g., is less than or equal to) a threshold, the WTRU may determine to, and/or may, monitor for one or more level 2 PDCCH transmissions. If the configured aggregation level/REG bundle size fails to satisfy (e.g., is greater than) the threshold, the WTRU may determine to, and/or may, monitor for one or more level 1 PDCCH transmissions.

The aggregation level/REG bundle size of, and/or for use with performing, a level 2 PDCCH Tx monitoring may be based on a configured aggregation level/REG bundle size of an associated configuration of, and/or for use with performing, a level 1 PDCCH Tx monitoring. For example, a scaling factor (e.g., multiplying A to aggregation level and/or REG bundle size of, and/or for use with performing, a level 1 PDCCH Tx monitoring) and/or a difference (e.g., B slots) may be configured. Based on the scaling factor and/or the difference, the WTRU may determine the actual aggregation level/REG bundle size of, and/or for use with performing, a level 2 PDCCH Tx monitoring.

Associated CORESET IDs/search space IDs for monitoring for level 1 PDCCH transmissions For example, the WTRU may receive a configuration (e.g., information indicating a configuration) of associated CORESET IDs/search space IDs for monitoring for level 1 PDCCH transmissions. Based on the configuration, the WTRU may determine to, and/or may, monitor for one or more level 2 PDCCH transmission. The WTRU may determine to, and/or may, monitor for one or more level 2 PDCCH transmission based on the configuration.

Otherwise, the WTRU may monitor for one or more level 1 PDCCH transmissions based on the information/configuration of CORESET/search space.

In an embodiment, a WTRU may receive one or more BD configuration sets (e.g., information indicating one or more BD configuration sets). Each BD configuration set may include any of: a CORESET configuration and/or information and a search space configuration and/or information.

The CORESET configuration and/or information may include/indicate any of following: one or more frequency domain resources; a duration; a CCE-REG mapping type (interleaved (including REG bundle size, interleaver size and shift index) or non-interleaved); a precoder granularity; one or more TCI states for a PDCCH transmission; enablement of a TCI-Present information element in a DCI; PDCCH DMRS scrambling ID; an RB offset; a CORESET pool index; and a CORESET ID.

The search space configuration and/or information may include/indicate any of the following: a search space ID; a monitoring slot periodicity and/or offset; a duration; a monitoring symbol within slot; a number of candidates for aggregation levels; a search space type, e.g., including DCI formats and/or corresponding aggregation levels; and a control resource set ID (e.g., an associated control resource set ID).

Alternatively, the above information/configurations may be configured as a CORESET and/or a search space.

In an embodiment, a WTRU may receive level 1 PDCCH and level 2 PDCCH transmissions, e.g., for flexible scheduling. For example, the WTRU may receive a level 1 PDCCH transmission which indicates (e.g., dynamically) any of the following information/configurations of, and/or for use with performing, a level 2 PDCCH Tx monitoring (and/or CORESETs/search spaces associated with the level 2 PDCCH transmissions): (i) a scheduling granularity, (ii) a PDCCH monitoring granularity, and (iii) one or more configurations for blind detection of a level 2 PDCCH transmission.

The scheduling granularity may be, e.g., one or more of 1 slot, 2 slots, 4 slots and 8 slots in time domain and/or one or more of 1 PRB, 2 PRBs, 4 PRBs and 8 PRBs in frequency domain. The PDCCH monitoring granularity may be, e.g., X and/or Y.

In an embodiment, a level 1 DCI may enable monitoring a separate search space set with for monitoring one or more level 2 PDCCH transmission with granularity a (a<X). In an embodiment, the WTRU may be (e.g., also) configured for monitoring PDCCH candidates in a first Y (≤X) consecutive slots within a group of X slots. For example, a second search space set dynamically enabled by a level 1 DCI for monitoring for one or more level 2 PDCCH transmission may configured with granularity 1, and one or more level 1 PDCCH transmission may be monitored with granularity X=4. In an embodiment, Y=2 may enable level 2 PDCCH transmission monitoring occasions in a first 2 slots within a group of X=4 slots.

In an embodiment, a level 1 DCI may indicate a scheduling granularity of level 2 DCI. For example, if the WTRU granularity; BD configuration sets 5-8 may be used if the WTRU receives 2 slots as a monitoring/scheduling granularity; and BD configuration sets 9-12 may be used if the WTRU receives 4 slots as a monitoring/scheduling granularity.

TABLE 7

| Dynamically indicated monitoring/scheduling granularity in level 1 DCI for level 2 DCI | DCI bit to indicate an active BD configuration set based on the candidate configuration sets | Candidate BD configuration set for level 2 DCI | Activated candidate BD configuration set if the WTRU receives 10 from a DCI field in a level 1 DCI |
|---|---|---|---|
| slot | 00 | BD configuration set 1 | BD configuration set 3 |
| | 01 | BD configuration set 2 | |
| | 10 | BD configuration set 3 | |
| | 11 | BD configuration set 4 | |
| 2 slots | 00 | BD configuration set 5 | BD configuration set 7 |
| | 01 | BD configuration set 6 | |
| | 10 | BD configuration set 7 | |
| | 11 | BD configuration set 8 | |
| 4 slots | 00 | BD configuration set 9 | BD configuration set 11 |
| | 01 | BD configuration set 10 | |
| | 10 | BD configuration set 11 | |
| | 11 | BD configuration set 12 | | receives an indication with a scheduling granularity of X slots, the WTRU may decode a time domain resource allocation field and/or a frequency domain resource allocation field based on the indicated scheduling granularity of X slots. If the WTRU receives an indication with a scheduling granularity of Y slots, the WTRU may decode a time domain resource allocation field and/or a frequency domain resource allocation field based on the indicated scheduling granularity of Y slots.

The application of the indicated scheduling/monitoring granularity may be used based on a time offset from a slot in which the WTRU received a level 1 PDCCH transmission and/or the WTRU transmits ACK/NACK for a level 1 DCI and/or one or more scheduled PDSCH transmissions by the level 1 DCI. If the time offset satisfies (e.g., is less than or equal to) a threshold, the WTRU may determine to, and/or may, monitor based on a previously indicated scheduling/monitoring granularity. If the time offset fails to satisfy (e.g., is greater than) the threshold, the WTRU may determine to, and/or may, monitor based on a newly indicated scheduling/monitoring granularity.

Representative Configurations for Blind Detection of a Level 2 PDCCH Transmission In an embodiment, a level 1 DCI may indicate (e.g., dynamically) one or more configurations/information for blind detection of a level 2 DCI. The indication may be based on the indicated monitoring (e.g., X and/or Y)/scheduling granularity. For example, the WTRU may activate one BD configuration set among one or more BD configuration sets (e.g., one or more candidate BD configuration sets) associated with the indicated monitoring/scheduling granularity. The indication method may be any of the following:

Based on a configuration/information of candidate BD configuration sets per dynamically indicated monitoring/scheduling granularity in a level 1 DCI. The WTRU may receive an indication of monitoring/scheduling granularity in a level 1 DCI. Based on the indication, the WTRU may determine one or more sets of candidate BD configuration. For example, as set forth in Table 7, BD configuration sets 1-4 may be used if the WTRU receives 1 slot as a monitoring/scheduling Determination of candidate BD configuration sets for the indicated monitoring/scheduling granularity for a level 2 DCI may be based on applicability, for example. In an embodiment, the WTRU may be configured with one or more BD configuration sets (e.g., via one or more RRC messages). Based on the one or more BD configuration sets, the WTRU may determine candidate BD configuration sets for an indication for BD configuration of a level 2 DCI if a set of the one or more BD configuration sets are applicable for the indicated monitoring/scheduling granularity. The WTRU may receive an indication which indicates one of the sets of the one or more BD configuration sets via a level 1 PDCCH transmission. Based on the indicated BD configuration set, the WTRU may monitor and blindly detect one or more level 2 PDCCH transmissions. Based on the detected level 2 PDCCH transmissions, the WTRU may decode a DCI (e.g., for scheduling one or more PDSCHs/PUSCHs). The WTRU may identify applicability of one or more BD configuration sets based on X and Y. For example, when X=4 and Y=2, the WTRU may receive a first BD configuration located in a first slot and a second BD configuration located in a third slot. The WTRU may determine that the first BD configuration is a candidate BD configuration since the first BD configuration is located within first two slots (Y=2). The WTRU may determine that the second BD configuration is not a candidate BD configuration since the second BD configuration is located in the in the third slot (and not the within first two slots). Alternatively, or additionally, the WTRU may identify applicability of one or more BD configuration sets based on SCSs. For example, the WTRU may determine the BD configuration as applicable if a configured SCS of the BD configuration is identical with an indicated SCS.

Alternatively, or additionally, the WTRU may identify applicability of one or more BD configuration sets based on any of a periodicity and an offset. For example, the WTRU may determine a BD configuration as applicable if a configured periodicity and/or an offset of the BD configuration satisfies (e.g., is greater than) the indicated X. Alternatively, the WTRU may determine a BD configuration as applicable if a configured periodicity and/or an offset of the BD configuration fails to satisfy (e.g., is less than or equal to) the indicated X.

Alternatively, or additionally, the WTRU may identify applicability of one or more BD configuration sets based on a duration. For example, the WTRU may determine a BD configuration as applicable if a configured duration of the BD configuration satisfies (e.g., is greater than) a threshold. Alternatively, the WTRU may determine a BD configuration as applicable if a configured duration of the BD configuration is fails to satisfy (e.g., is less than or equal to) a threshold.

Alternatively, or additionally, the WTRU may identify applicability of one or more BD configuration sets based on an aggregation level. For example, the WTRU may determine a BD configuration as applicable if a configured aggregation level of the BD configuration satisfies (e.g., is greater than) a threshold. Alternatively, the WTRU may determine a BD configuration as applicable if a configured aggregation level of the BD configuration fails to satisfy (e.g., is less than or equal to) a threshold.

Alternatively, or additionally, the WTRU may identify applicability of one or more BD configuration sets based on a REG bundle size. For example, the WTRU may determine a BD configuration as applicable if a configured REG bundle size of the BD configuration satisfies (e.g., is greater than) a threshold. Alternatively, the WTRU may determine a BD configuration as applicable if a configured aggregation level of the BD configuration fails to satisfy (e.g., is less than or equal to) a threshold.

In an embodiment, a payload size for an indication of one or more BD configuration sets may be based on a number of candidate BD configurations. A WTRU may determine the payload size based on any of a number of candidate sets for the indicated scheduling/monitoring granularity and a maximum number of candidate sets for all available scheduling/monitoring granularities. In an embodiment, a WTRU may determine the number of candidate sets based on a number of candidate sets for an indicated scheduling/monitoring granularity. For example, if a number of candidate sets is $N_x$ wherein x is the indicated scheduling/monitoring granularity, the payload size may be $\log 2(N_x)$. In an embodiment, a WTRU may determine the number of candidate sets based on a maximum number of candidate sets for all available scheduling/monitoring granularities. For example, if a number of candidate sets is $N_x$ wherein x is the indicated scheduling/monitoring granularity, the payload size may be $$\max_{x=1,\ldots,M} \log 2(N_x)$$

wherein M is a number of available scheduling/monitoring granularities.

Representative Level 2 PDCCH Configuration Determination

In an embodiment, a configuration of, and/or for use with performing, a level 2 PDCCH Tx monitoring may be determined based on one or more level 1 PDCCH transmissions. In an embodiment, a WTRU may receive one or more of level 1 DCIs to determine one or more configurations of level DCI. The WTRU may receive the level 1 DCIs based on any of the following: a group DCI; a group DCI with/ having existing DCI formats (e.g., one or more of DCI formats 2-0, 2-1 and 2-2); a group DCI with/having or a new DCI format; a WTRU specific DCI, e.g.; a WTRU specific DCI; where, e.g., the WTRU specific DCI may include one or more UL and/or DL DCI formats (e.g., one or more of DCI formats 0-0, 0-1, 0-2, 1-0, 1-1 and 1-2); the WTRU specific DCI may schedule one or more PDSCHs and/or PUSCHs; and the WTRU specific DCI may not schedule any PDSCHs/PUSCHs, where, e.g.; DCI fields of the WTRU specific DCI without PDSCH/PUSCH assignment may use one or more fixed information. For example, any of the following DCI fields may be used for the WTRU specific DCI without PDSCH/PUSCH assignments: RV=all '1's; MCS=all '1's; NDI=0; and Set to all '0's for FDRA Type 0, or all '1's for FDRA Type 1, or all '0's for dynamic Switch; and a level 1 DCI may use a specific RNTI to scramble the level 1 DCI. For example, CS-RNTI may be used to scramble the CRC for the DCI. In another example, a new RNTI reserved for level 1 PDCCH may be used to scramble the CRC for the DCI.

In an embodiment, a WTRU may receive/determine one or more configurations of level 2 DCI, including a SS set, a CORESET configuration, an AL, and a DCI format, based on any of explicit or implicit indication by a level 1 DCI. The WTRU may adapt any of the following procedures to identify a configuration of, and/or for use with performing, a level 1 PDCCH Tx monitoring based on one or more of following methods:

The one or more configurations of, and/or for use with performing, a level 2 PDCCH Tx monitoring may be same as the blindly detected one or more configurations of, and/or for use with performing, a level 1 PDCCH Tx monitoring.

The one or more configurations of, and/or for use with performing, a level 2 PDCCH Tx monitoring may be chosen by a predefined set of one or more configurations chosen based on the one or more configurations of, and/or for use with performing, a level 1 PDCCH Tx monitoring (e.g., an AL of, and/or for use with performing, a level 2 PDCCH Tx monitoring may be always lower/higher or equal to AL of, and/or for use with performing, a level 1 PDCCH Tx monitoring). If the one or more configurations of, and/or for use with performing, a level 2 PDCCH Tx monitoring is always lower/higher, the difference between Level 1 and Level 2 PDCCH Tx monitoring may be dynamically indicated by a base station (e.g., a gNB)).

The WTRU may determine the one or more configurations of, and/or for use with performing, a level 2 PDCCH Tx monitoring through explicit indication by RRC signaling and a level 1 PDCCH transmission.

For example, the one or more configurations of, and/or for use with performing, a level 2 PDCCH Tx monitoring may be indicated by reading from a RRC configured table with one or more table entries determined by an index filed in a level 1 PDCCH transmission.

The WTRU may determine the one or more configurations of, and/or for use with performing, a level 2 PDCCH Tx monitoring through implicit indication by RRC signaling and a level 1 PDCCH transmission.

For example, the one or more configurations of, and/or for use with performing, a level 2 PDCCH Tx monitoring may be indicated by reading from a RRC configured table with one or more table entries determined by one or more configurations of level 1 PDCCH transmissions.

The WTRU may select one out of RRC configured configuration sets for performing level 2 PDCCH Tx monitoring based on an indication carried by one or more level 1 PDCCH transmission. For example, the WTRU may receive two or more PDCCH configuration sets via RRC signaling. The WTRU may receive the index of the configuration set to indicate the configuration set of, and/or for use with performing, a level 2 PDCCH Tx monitoring.

The WTRU may select one out of RRC configured configuration sets for level 2 PDCCH Tx monitoring based on one or more configurations of level 1 PDCCH transmissions. For example, the WTRU may receive two or more PDCCH configurations sets via RRC signaling. The WTRU may select the configuration set of, and/or for use with performing, a level 2 PDCCH Tx monitoring based on an AL and DCI format of a preceding level 1 PDCCH transmission.

Representative Scheduling/Resource Allocation Indication

In an embodiment, a scheduling/resource allocation may be indication via a level 2 DCI. A WTRU may determine scheduling and resource allocation (e.g., exclusively) with support of one or more level 2 PDCCH transmissions and RRC signaling/information/transmissions. Alternatively, one or more level 2 PDCCH transmission may be used to overwrite/update scheduling and resource allocation configuration set by one or more level 1 PDCCH transmissions.

For example, a WTRU may determine a TDRA and PDSCH mapping type configuration based on a time domain resource assignment field value indicated by a level 2 DCI to select entries from an RRC configured allocation table (e.g., similar to an existing Rel-16 procedure). As another example, a level 2 DCI may be used to overwrite a TDRA and PDSCH mapping type configuration set by a level 1 DCI. In an embodiment, a dedicated RRC configured allocation table may be defined for level 2 PDCCH transmissions and/or additional entries may be added, e.g., as set forth in Table 8. Table 8 lists examples of valid S and L combinations.

considered as a possible preemption indication and WTRU may monitor for possible DCI format 2_1 reception using INT-RNTI.

In an embodiment, PUSCH and/or PUCCH priority indication may be supported and/or carried out. In an embodiment, one or more level 2 PDCCH transmission may update PUSCH and/or PUCCH priority indications for one or more (e.g., a set of) PUSCH or PUCCH transmissions scheduled by one or more level 1 PDCCH transmission. For example, one or more level 1 PDCCH transmissions may schedule and/or indicate priority indices of scheduled PUSCH and/or PUCCH transmissions in a set of X slots. A level 2 DCI may dynamically update the priority level.

In an embodiment, the priority levels of PUSCH/PUCCH transmissions scheduled in X slots may be set to default values (e.g., without any indication by level 1 PDCCH transmission). The level 2 PDCCH transmissions may be used to dynamically indicate the priority level, e.g., based on scheduling requirements during transmission/reception of the X slots. For example, a PUSCH transmission with semi-persistent CSI report may be configured by a level 1 DCI without indicating the priority. Since priority index is not provided, a WTRU may assume (determine) a priority index of '0' in accordance with existing Rel-16 procedures. One or more level 2 PDCCH transmission may be used update the priority based on scheduling requirements by the base station (e.g., gNB).

FIG. 18 is a flow chart illustrating an example flow 1800 for carrying out dynamic SCS and CP determination according to various embodiments. The flow 1800 and accompanying disclosures herein may be considered a generalization of disclosures above. For convenience and simplicity of exposition, the flow 1800 is described with reference to the architecture of the communications system 100 (FIG. 1). The flow 1800 may be carried out using different architectures as well.

TABLE 8

| PDSCH mapping type | Normal cyclic prefix | | | Extended cyclic prefix | | |
|---|---|---|---|---|---|---|
| | S | L | S + L | S | L | S + L |
| {Type A, Type for Level 2 DCI} | {0, 1, 2, 3}, {set of S value for level 2 DCI} (Note 1) | {3, ..., 14}, {set of L value for level 2 DCI} | {3, ..., 14}, {set of S + L value for level 2 DCI} | {0, 1, 2, 3}, {set of S value for level 2 DCI} (Note 1) | {3, ..., 12}, {set of L value for level 2 DCI} | {3, ..., 12}, {set of S + L value for level 2 DCI} |
| {Type B, Type for Level 2 DCI} | {0, ..., 12}, {set of S value for level 2 DCI} | {2, ..., 13}, {set of L value for level 2 DCI} | {2, ..., 14}, {set of S + L value for level 2 DCI} | {0, ..., 10}, {set of S value for level 2 DCI} | {2, 4, 6}, {set of L value for level 2 DCI} | {2, ..., 12}, {set of S + L value for level 2 DCI} |

(Note 1):
S = 3 is applicable only if dmrs-TypeA-Position = 3

In an embodiment, a preemption indication using level 2 PDCCH transmission may be supported and/or carried out. In an embodiment, one or more Level 2 PDCCH transmissions may be used to indicate a preemption indication for PDSCH transmissions scheduled by a level 1 PDCCH transmission. In an embodiment, when a WTRU is indicated that one possible format of a level 2 DCI is format 2_1, WTRU may monitor level 2 PDCCH transmission with INT-RNTI for possible preemption indication. In an embodiment, configuring level 2 PDCCH Tx monitoring may be Referring to FIG. 18, a WTRU 102 may receive a DCI indicating an MCS, a time domain resource assignment, and a frequency domain resource assignment (1802). The WTRU may obtain an SCS and a CP length based on the MCS (1804). The WTRU 102 may determine the time and frequency domain resource assignments based on the SCS and the CP length (1806). The WTRU may receive a downlink transmission at time and frequency resources associated with the time and frequency domain resource assignments (1808).

In an embodiment, the MCS may be a higher order MCS. In an embodiment, the MCS may satisfy an MCS threshold. In an embodiment, the time and frequency resources may be within a slot supporting a plurality of numerologies.

In an embodiment, the WTRU 102 may receive information indicating a value for the MCS threshold. In an embodiment, the WTRU 102 may obtain the SCS and the CP length at least in part by receiving one or more transmissions including information indicating the SCS, the CP length and an association between the MCS and the SCS and CP length.

In an embodiment, the WTRU 102 may receive one or more transmissions including information indicating a plurality of SCSs, a plurality of CP lengths, and a plurality of indexes. In an embodiment, each of the plurality of indexes may associate an MCS with one of the plurality of SCSs and one of the plurality of CP lengths. In an embodiment, the WTRU 102 may obtain the SCS and the CP length based on the MCS at least in part by selecting the SCS and the CP length from the plurality of SCSs and the plurality of CP lengths using the MCS.

In an embodiment, the time and frequency resources may be within a slot supporting a plurality of numerologies. In an embodiment, the SCS is a first SCS, wherein the CP length is a first CP length, and the DCI may be received on time and frequency resources having a second SCS and a second CP length. In an embodiment, the DCI may indicate a time offset, and the WTRU may, prior to obtaining the SCS and the CP length, determine that the time offset satisfies a time threshold and the MCS satisfies an MCS threshold.

FIG. 19 is a flow chart illustrating an example flow 1900 for carrying out dynamic SCS and CP determination according to various embodiments. The flow 1900 and accompanying disclosures herein may be considered a generalization of disclosures above. For convenience and simplicity of exposition, the flow 1900 is described with reference to the architecture of the communications system 100 (FIG. 1). The flow 1900 may be carried out using different architectures as well.

Referring to FIG. 19, a WTRU 102 may receive information indicating an MCS threshold, a time threshold, a first SCS), a first CP length, a second SCS and a second CP length (1902). The WTRU 102 may receive a DCI including information indicating a MCS, a time domain resource assignment, and a frequency domain resource assignment, and a time offset (1904). The WTRU 102 may determine the time and frequency domain resource assignments based on (i) the first SCS and the first CP length on condition that the MCS satisfies the MCS threshold and the time offset satisfies the time threshold, or (ii) the second SCS and the second CP length based on any of the MCS failing to satisfy the MCS threshold and the time offset failing to satisfy the time threshold (1906). The WTRU 102 may receive a downlink transmission at time and frequency resources associated with the time and frequency domain resource assignments (1908).

In an embodiment, the first SCS and the first CP length may correspond to a higher order MCS. In an embodiment, the second SCS and the second CP length may correspond to a lower order MCS. In an embodiment, the second SCS and the second CP length may be one of one or more default SCSs and CP lengths for downlink transmission reception in a slot supporting predetermined SCSs and CP lengths.

In an embodiment, the time and frequency resources may be within a slot supporting a plurality of numerologies. In an embodiment, the DCI may be received at time and frequency resources having a third SCS and a third CP length. In an embodiment, at least one of (i) the third SCS is the same as the second SCS, and (ii) the third CP length is the same as the second CP length.

FIG. 20 is a flow chart illustrating an example flow 2000 for providing acknowledgement information for multiple transmission scheduled by a single DCI according to various embodiments. The flow 2000 and accompanying disclosures herein may be considered a generalization of disclosures above. For convenience and simplicity of exposition, the flow 2000 is described with reference to the architecture of the communications system 100 (FIG. 1). The flow 2000 may be carried out using different architectures as well.

Referring to FIG. 20, a WTRU 102 may receive a single DCI including information indicating a plurality of downlink scheduling assignments for a respective plurality of downlink transmissions (2002). The WTRU 120 may transmit acknowledgement information for the plurality of downlink transmissions in one of a single uplink transmission and a plurality of uplink transmission (2004). For example, the WTRU 120 may transmit the acknowledgement information in a plurality of uplink transmission based, at least in part, on the downlink control information including information indicating a plurality uplink time domain resource assignments. Alternatively, and/or additionally, the WTRU 120 may transmit the acknowledgement information in a single uplink transmission based, at least in part, on the downlink control information including information indicating at most a single uplink time domain resource assignment.

In an embodiment, the information indicating a plurality of downlink scheduling assignments may include information indicating at least one downlink frequency domain resource assignment and a plurality of downlink time domain resource assignments. In an embodiment, each of the plurality of downlink time domain resource assignments indicates a time offset. In an embodiment, the single uplink time domain resource assignment and each of the plurality of uplink time domain resource assignments may indicates a time offset.

In an embodiment, each of the plurality of downlink transmissions may be a PDSCH transmission. In an embodiment, the single uplink transmission may be any of a PUCCH transmission and a PUSCH transmission. In an embodiment, each of the plurality of uplink transmissions may be any of a PUCCH transmission and a PUSCH transmission.

In an embodiment, the acknowledgement information may include an acknowledgement of reception or a non-acknowledgement of reception for one or more of the plurality of downlink transmissions. In an embodiment, the acknowledgement information may be hybrid automatic repeat request (HARQ) acknowledgement (HARQ-ACK) information.

In an embodiment, the WTRU may receive one or more of the plurality of transmissions.

FIG. 21 is a flow chart illustrating an example flow 2100 for carrying out multiple reception scheduling based on a scaling factor according to various embodiments. The flow 2100 and accompanying disclosures herein may be considered a generalization of disclosures above. For convenience and simplicity of exposition, the flow 2100 is described with reference to the architecture of the communications system 100 (FIG. 1). The flow 2100 may be carried out using different architectures as well.

Referring to FIG. 21, a WTRU 102 may receive a DCI (e.g., a single DCI) including information indicating a plurality of scheduling assignments for a respective plurality of transmissions (2102). The WTRU 102 may determine a scaling factor (2104). The WTRU 102 may modify and/or determine at least one component of at least one scheduling assignment of the plurality of scheduling assignments based on the scaling factor (2106). and the WTRU 102 may receive at least one of the plurality of transmission based on the at least one scheduling assignment (2108).

In an embodiment, the plurality of scheduling assignments may include at least one frequency domain resource assignment and a plurality of time domain resource assignments.

In an embodiment, the information indicating a plurality of downlink scheduling assignments may include information indicating at least one downlink frequency domain resource assignment and a plurality of downlink time domain resource assignments.

FIG. 22 is a flow chart illustrating an example flow 2200 for carrying out multiple transmission scheduling based on a scaling factor according to various embodiments. The flow 2200 and accompanying disclosures herein may be considered a generalization of disclosures above and is similar to the flow 2100 of FIG. 21, except that it is directed to multiple transmission scheduling instead of multiple reception scheduling.

FIG. 23 is a flow chart illustrating an example flow 2300 for carrying out channel state information (CSI) reporting for indication of SCS according to various embodiments. The flow 2300 and accompanying disclosures herein may be considered a generalization of disclosures above. For convenience and simplicity of exposition, the flow 2300 is described with reference to the architecture of the communications system 100 (FIG. 1). The flow 2300 may be carried out using different architectures as well.

Referring to FIG. 23, a WTRU 102 may receive a CSI report configuration and an associated CSI-RS resource set configuration (2302). The CSI-RS resource set configuration may include a SCS configuration. The WTRU 102 may receive an activation of a CSI reporting configuration (2304). The WTRU 102 may, on condition that an SCS being used by the WTRU is the same as the SCS in the received CSI-RS resource set configuration, measure demodulation reference signal (DM-RS) ports and may transmit CSI (2306).

INCORPORATION BY REFERENCE

The following references may have been referenced hereinabove and are incorporated herein fully by reference.

3GPP TS 38.213, "NR Physical layer procedures for control", v16.1.0

3GPP TS 38.321, "Medium Access Control (MAC) protocol specification", v16.0.0

3GPP TS 38.331, "Radio Resource Control (RRC) protocol specification", v16.0.0

3GPP TR 38.805, "Study on New Radio access technology; 60 GHz unlicensed spectrum"

3GPP TR 38.807, "Study on requirements for NR beyond 52.6 GHz", v16.0.0

3GPP TR 38.913, "Study on New Radio access technology; Next Generation Access Technologies"

3GPP RP-181435, "New SID: Study on NR beyond 52.6 GHz"

3GPP RP-193259, "New SID: Study on supporting NR from 52.6 GHz to 71 GHz"

3GPP RP-193229, "New WID on Extending current NR operation to 71 GHz"

US Published Patent Application No. 2019/0081832.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plus-function claim format, and any claim without the terms "means for" is not so intended.

The invention claimed is:

1. An apparatus comprising:

circuitry, including any of a transmitter, receiver, processor and memory, configured to receive information indicating an MCS threshold, a time threshold, a first subcarrier spacing (SCS), a first cyclic prefix (CP) length, a second SCS and a second CP length;

receive downlink control information including information indicating a modulation and coding scheme (MCS), a time domain resource assignment, and a frequency domain resource assignment, and a time offset;

determine the time and frequency domain resource assignments based on (i) the first SCS and the first CP length on condition that the MCS satisfies the MCS threshold and the time offset satisfies the time threshold, or (ii) the second SCS and the second CP length based on any of the MCS failing to satisfy the MCS threshold and the time offset failing to satisfy the time threshold; and receive a downlink transmission at time and frequency resources associated with the time and frequency domain resource assignments.

2. The apparatus of claim 1, wherein the MCS is a higher order MCS.

3. The apparatus of claim 1, wherein the circuitry is configured to receive information indicating a value for the MCS threshold.

4. The apparatus of claim 1, wherein the time and frequency resources are within a slot supporting a plurality of numerologies.

5. The apparatus of claim 1, wherein the downlink control information is received at time and frequency resources associated with the second SCS and the second CP length.

6. A method implemented in a wireless transmit receive unit (WTRU), the method comprising:

receiving information indicating an MCS threshold, a time threshold, a first subcarrier spacing (SCS), a first cyclic prefix (CP) length, a second SCS and a second CP length;

receiving downlink control information including information indicating a modulation and coding scheme (MCS), a time domain resource assignment, and a frequency domain resource assignment, and a time offset;

determining the time and frequency domain resource assignments based on (i) the first SCS and the first CP length on condition that the MCS satisfies the MCS threshold and the time offset satisfies the time threshold, or (ii) the second SCS and the second CP length based on any of the MCS failing to satisfy the MCS threshold and the time offset failing to satisfy the time threshold; and receiving a downlink transmission at time and frequency resources associated with the time and frequency domain resource assignments.

7. The method of claim 6, wherein the MCS is a higher order MCS.

8. The method of claim 6, comprising receiving information indicating a value for the MCS threshold.

9. The method of claim 6, wherein the time and frequency resources are within a slot supporting a plurality of numerologies.

10. The method of claim 6, wherein the downlink control information is received at time and frequency resources associated with the second SCS and the second CP length.

* * * * *